(12) United States Patent
Finke et al.

(10) Patent No.: US 12,123,284 B2
(45) Date of Patent: Oct. 22, 2024

(54) SELECTIVE ELECTRODE USAGE FOR DIRECTIONAL PULSE POWER DRILLING

(71) Applicants: Halliburton Energy Services, Inc., Houston, TX (US); SDG LLC, Minden, NV (US)

(72) Inventors: Michael D. Finke, Houston, TX (US); Boguslaw Wiecek, Houston, TX (US); William M. Moeny, Albuquerque, NM (US); Daniel D. Gleitman, Houston, TX (US)

(73) Assignees: Halliburton Energy Services, Inc., Houston, TX (US); SDG LLC, Minden, NV (US)

( * ) Notice: Subject to any disclaimer, the term of this patent is extended or adjusted under 35 U.S.C. 154(b) by 0 days.

(21) Appl. No.: 17/982,789

(22) Filed: Nov. 8, 2022

(65) Prior Publication Data

US 2023/0144083 A1    May 11, 2023

Related U.S. Application Data

(60) Provisional application No. 63/263,782, filed on Nov. 9, 2021.

(51) Int. Cl.
*E21B 41/00* (2006.01)
*E21B 4/04* (2006.01)
(Continued)

(52) U.S. Cl.
CPC ............ *E21B 41/0085* (2013.01); *E21B 4/04* (2013.01); *E21B 7/067* (2013.01); *E21B 7/068* (2013.01); *E21B 7/15* (2013.01); *E21B 17/1014* (2013.01)

(58) Field of Classification Search
CPC .. E21B 41/0085; E21B 17/1014; E21B 7/067; E21B 9/068; E21B 7/15
See application file for complete search history.

(56) References Cited

U.S. PATENT DOCUMENTS

2007/0137893 A1   6/2007  Moeny et al.
2008/0245568 A1   10/2008 Jeffryes
(Continued)

FOREIGN PATENT DOCUMENTS

CN        111119739      5/2020
EP        0497420        8/1992
(Continued)

OTHER PUBLICATIONS

"PCT Application No. PCT/US2022/079577, International Search Report and Written Opinion", Mar. 9, 2023, 11 pages.
(Continued)

*Primary Examiner* — Yong-Suk (Philip) Ro
(74) *Attorney, Agent, or Firm* — DeLizio, Peacock, Lewin & Guerra, LLP

(57) ABSTRACT

An apparatus comprises an electrode assembly positioned at a bottom end of a pulse power drill string to be positioned in a borehole formed in a subsurface formation. The electrode assembly comprises multiple electrodes, wherein at least a subset of the multiple electrodes is to periodically emit a pulse of an electrical discharge into the subsurface formation to drill the borehole. The electrode assembly comprises a controller configured to alter a direction of
(Continued)

drilling of the borehole based on selection of the subset from the multiple electrodes, wherein an effective attribute of at least one electrode of the multiple electrodes is different than the effective attribute of other electrodes of the multiple electrodes, wherein the effective attribute comprises at least one of a shape and a size.

26 Claims, 22 Drawing Sheets

(51) Int. Cl.
| | | |
|---|---|---|
| *E21B 7/06* | (2006.01) | |
| *E21B 7/15* | (2006.01) | |
| *E21B 17/10* | (2006.01) | |

(56) References Cited

U.S. PATENT DOCUMENTS

| | | |
|---|---|---|
| 2016/0326806 A1 | 11/2016 | Lund et al. |
| 2018/0148981 A1 | 5/2018 | Moeny |
| 2018/0287533 A1 | 10/2018 | Rajagopalan |
| 2019/0316419 A1 | 10/2019 | Bayol et al. |
| 2020/0370375 A1 | 11/2020 | Gleitman et al. |
| 2023/0143504 A1 | 5/2023 | Finke et al. |
| 2023/0144083 A1 | 5/2023 | Finke et al. |
| 2023/0144439 A1 | 5/2023 | Finke et al. |

FOREIGN PATENT DOCUMENTS

| | | |
|---|---|---|
| EP | 3739163 | 11/2020 |
| WO | 2020236189 | 11/2020 |
| WO | 2023086841 | 5/2023 |
| WO | 2023086844 | 5/2023 |
| WO | 2023086845 | 5/2023 |
| WO | 2023086846 | 5/2023 |

OTHER PUBLICATIONS

"PCT Application No. PCT/US2022/079580, International Search Report and Written Opinion", Mar. 15, 2023, 14 pages.
"PCT Application No. PCT/US2022/079581, International Search Report and Written Opinion", Mar. 15, 2023, 12 pages.
"PCT Application No. PCT/US2022/079583, International Search Report and Written Opinion", Mar. 10, 2023, 12 pages.
"U.S. Appl. No. 17/982,589, Non-Final Office Action", Dec. 29, 2023, 12 pages.
"U.S. Appl. No. 17/982,739, Non-Final Office Action", 10 pages.
"U.S. Appl. No. 17/982,739, Final Office Action", Jun. 12, 2024, 10 pages.

SELECTIVE ELECTRODE USAGE FOR DIRECTIONAL PULSE POWER DRILLING

TECHNICAL FIELD

The disclosure generally relates to downhole operations and, more particularly, to directional pulse power drilling.

BACKGROUND

Electrocrushing drilling uses pulsed power technology to drill a borehole in a rock formation. Pulsed power technology repeatedly applies a high electric potential across the electrodes of an electrocrushing drill bit, which ultimately causes the surrounding rock to fracture. The fractured rock is carried away from the bit by drilling fluid and the bit advances downhole.

BRIEF DESCRIPTION OF THE DRAWINGS

Embodiments of the disclosure may be better understood by referencing the accompanying drawings.

DESCRIPTION OF EMBODIMENTS

Figure 1:
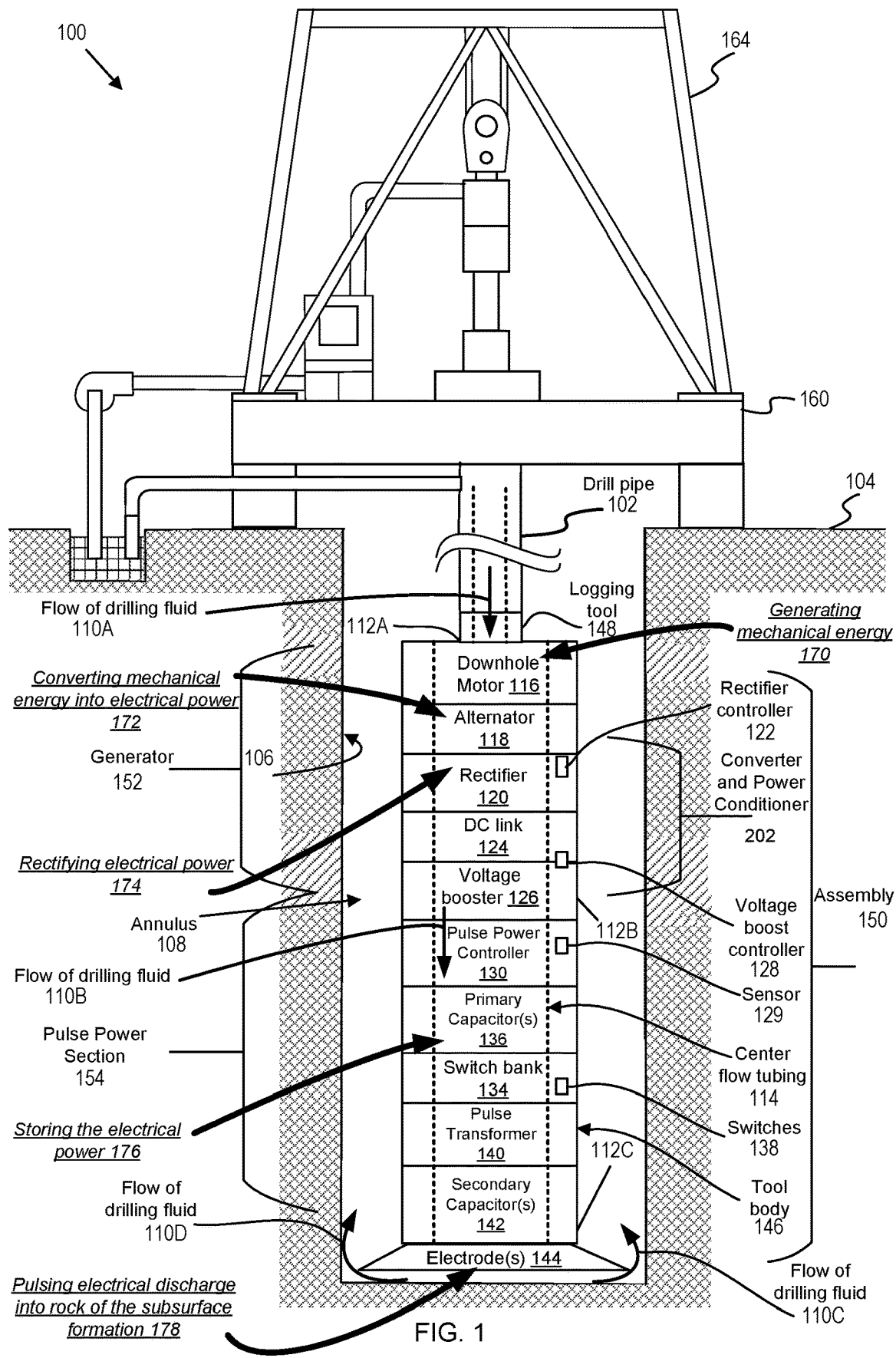
FIG. 1 depicts an example pulse power drilling assembly, according to some embodiments.

The description that follows includes example systems, methods, techniques, and program flows that embody embodiments of the disclosure. However, it is understood that this disclosure may be practiced without these specific details. For instance, this disclosure refers to pulse power drilling in illustrative examples. Embodiments of this disclosure can instead be applied to power generation for conventional drilling. In other instances, well-known instruction instances, protocols, structures, and techniques have not been shown in detail in order not to obfuscate the description.

Example embodiments include supplying intermittent power downhole in a borehole based on a flow of fluid through the borehole. For example, the flow of fluid can include drilling mud delivered downhole as part of a drilling operation. The intermittent power can be used for any of a number of downhole operations. For example, the power can be used to power actuators to open/close valves, extend/contract arms for stabilization, steering, etc. In other examples, the power can be used to power an electric motor, a hammer, various types of sensors (e.g., sensors for formation evaluation such as resistivity sensors), nuclear magnetic resonance devices, etc.

In some embodiments, the intermittent power supplied can be used to perform pulse power drilling. In particular, conventional wellbore drilling includes rotary drilling using a drill bit having cutting elements that is rotated to cause a cutting (fracturing or crushing) of rock. In contrast, pulse power drilling drills the wellbore using discharges of electric pulses that can include short duration, periodic, high-voltage pulses that are discharged through the rock in a surrounding formation. Such discharges can create high internal pressure to break or fracture the rock from the inside based on tension. Pulse power drilling can create a plasma in a drilling fluid or rock downhole which functions as a high-energy discharge. The creation of the plasma downhole can involve injecting large amounts of energy into the subsurface formation. Thus, pulse power drilling can require substantial amounts of both voltage and current for successful breakage or fracturing of rock in a downhole environment.

Various embodiments can include techniques for generating energy for pulse power drilling operations on the order of magnitude which provides for creation of plasma upon discharging pulses of electrical energy into the formation. In contrast to conventional drilling, embodiments use electrical current to break rock to create the borehole. A challenge of pulse power drilling is needing to supply enough power downhole such that an electrical discharge emitted into the formation creates a sufficient amount of high internal pressure to destroy the rock from the inside (rock is breaking in tension). Example embodiments provide a drill string configuration to provide the necessary power such that an electrical discharge emitted into the formation creates a sufficient amount of high internal pressure to destroy the rock from the inside. As further described below, in some implementations, the power can be provided based on fluid flow from the surface of the borehole to downhole. For example, a downhole motor that converts hydraulic energy into mechanical energy may be used to generate a mechanical energy from the fluid flow. Examples of such a downhole motor may include a turbine, a positive displacement motor (PDM), etc. A generator may be coupled to receive this downhole motor to convert the mechanical energy into an electrical energy. Examples of such a generator may include an alternator. This generated electrical energy may then be used to power one or more downhole operations. For example, this generated electrical energy may be used to power one or more of the following: pulse power drilling operations, nuclear magnetic resonance (NMR) operations, mud pulsing, etc.

Pulse power drilling operations can include various operations. For example, such an operation can include pulsing of an electrical discharge to breaking of rock to continue to drill the borehole (e.g., electrocrushing). Another example operation can include pulsing of an electrical discharge while the drill string is off bottom for testing, formation evaluation, etc. Another example operation can include pulsing of an electrical discharge for communication.

Because electrical transmission from the surface to storage in capacitors integrated in a pulse power drill string can be inefficient, some embodiments can generate electrical power downhole based on a flow of drilling fluid or mud that is also used to remove cuttings from downhole during the drilling operations. Thus, such embodiments can reduce transmission losses and improve electrical efficiency. In some implementations, the pulse power drill string can include a downhole motor (to convert a hydraulic energy into a mechanical energy) and generator. For example, a turbine can generate mechanical energy based on a flow of the drilling mud. The generator can then generate electrical power based on this mechanical energy.

The generated electrical power can be an alternating current (AC) power. This AC power can be rectified to convert the AC power into direct current (DC) power. Additionally, in some embodiments, the electrical power can be conditioned before storage in primary capacitors in the pulse power drill string (as stored energy). This stored energy can be used to emit the electrical discharge into the subsurface formation for drilling of the borehole. This stored energy can periodically be discharged in response to at least one discharge or load criteria being satisfied. For example, a discharge or load criteria can be that a defined amount of energy has been stored. As an example, this criteria can be satisfied when the primary capacitors are fully charged. In another example, this criteria can be satisfied when the amount of energy that has been stored is sufficient to break the rock in the current subsurface formation. Accordingly, the amount of energy needed can vary depending on the type of rock. In another example, the criteria can be that a bottom of the pulse power drill string is in contact with a bottom of the borehole. This can include any contact or some defined amount of surface area of the bottom of the pulse power drill string being in contact. In another example, the discharge criteria can be a defined amount of time since a prior electrical discharge.

In some implementations, the generated DC electrical power can be stored in primary capacitors (e.g., capacitors) of the pulse power drill string prior to the discharge criteria being satisfied. The power can continue to be generated based on the flow of the drilling mud even after the primary capacitors are fully charged. In some implementations, a switch can be positioned in the pulse power drill string. After the amount of energy stored in the primary capacitors exceeds a defined amount (e.g., fully charged), the switch can be opened to prevent additional storage of energy in the primary capacitors until the energy is discharged therefrom to generate a pulse of electrical discharge emitted into the subsurface formation. The switch can then be closed to again allow for storage of energy in these primary capacitors. In some implementations, while the switch is open and the power continues to be generated based on the flow of the drilling mud, the generated power can be stored in different capacitors, for example capacitors in the generator, until the switch is again closed.

In some embodiments, the pulse power drill string may be required to advance a borehole at some angle or orientation other than a vertical orientation relative to the surface where the borehole opening is located. Thus, one or more mechanisms may be required to allow the electrode assembly to advance the borehole in an off-center axis orientation relative to the longitudinal axis of the borehole at the present location where the pulse power drill string is operating at the bottom face of the borehole. Such directional drilling can be mechanically and/or electrically based. Examples of mechanically based directional drilling include different mechanical movements of parts of the electrode assembly of the pulse power drill string. For example, the electrode assembly can include a bent housing, an articulation of the ground ring, and/or an articulation of the electrode. Examples of electrically based directional drilling include the electrode assembly having multiple electrodes that are individually controlled for emitting the electrical energy and/or the electrode assembly having a ground ring separated into multiple segments that are individually controlled for providing a return electrical path for the emitted electrical energy.

Example System

FIG. 1 depicts an example pulse power drilling assembly, according to some embodiments. FIG. 1 illustrates an example drilling apparatus 100. FIG. 1 also depicts a number of example pulse power drilling operations 170-178 that can be performed by the example drilling apparatus 100. The pulse power drilling operations 170-178 are described in more detail below (after the description of the different parts of the example drilling apparatus 100).

The example pulse power drilling apparatus 100 can include a pulse power drilling assembly (hereinafter "assembly") 150 positioned in a borehole 106 and secured to a length of drill pipe 102 coupled to a drilling platform 160 and a derrick 164. While depicted on the land 104 as an onshore drilling operation, example embodiments can also be performed as an offshore drilling operation. The assembly 150 can be configured to further the advancement of the borehole 106 using pulse electrical power generated by the assembly 150 and provided to electrodes 144 in a controlled manner to emit an electrical discharge through formation material of a subsurface formation along the bottom face of the borehole 106 and in the nearby proximity to the electrodes 144.

As illustrated in FIG. 1, the assembly 150 includes multiple sub-assemblies, including, in some embodiments, a downhole motor 116 at a top of the assembly 150 where the top of the assembly is a face of the assembly 150 furthest from a drilling face of the assembly 150 (which contains the electrodes 144). The downhole motor 116 is coupled to multiple additional sub-sections or components. The downhole motor 116 can be any type of device or machine that may convert hydraulic energy into mechanical energy from a flow of fluid. Examples of such a downhole motor may include a turbine, a positive displacement motor (PDM), etc. These additional sub-sections or components may include various combinations of an alternator sub-section or component of the assembly (hereinafter "alternator") 118, a rectifier 120, a rectifier controller 122, a direct current (DC) link 124, a voltage booster (alternatively referred to as an output power converter) 126, a voltage boost controller 128, a pulse power controller 130, a switch bank 134 (including one or more switches 138), one or more primary capacitor(s) 136, a pulse transformer 140, one or more secondary capacitors 142, and the electrodes 144. While described as a voltage booster, other power converters may be used in place of the voltage booster 126.

The assembly 150 can be divided into a generator 152 and a pulse power section 154. The generator 152 can include the downhole motor 116 and a converter and power conditioner 202. The converter and power conditioner 202 can include the alternator 118, the rectifier 120, the rectifier controller 122, the DC link 124, the voltage booster 126, and the voltage boost controller 128, and is depicted in more detail below in reference to FIGS. 2-4. The pulse power section 154 can include the pulse power controller 130, the switch bank 134 (and switch(es) 138), the one or more primary capacitor(s) 136, the pulse transformer 140, the one or more secondary capacitors 142, and the electrodes 144. Components can be divided between the generator 152 and the pulse power section 154 in other arrangements, and the order of the components can be other than shown.

In some embodiments, the rectifier 120, the DC link 124, and the voltage booster 126 may be referred to as a "power conditioning system", or PCS, and are included in the converter and power conditioner 202. These additional sub-assemblies of the PCS may be electrically coupled to receive the electrical power output generated by the alternator 118 and to provide further processing of the received electrical power in order to provide a conditioned electrical power output comprising conditioned electrical power. This further processing of the electrical power output received at the PCS may include rectification, voltage boosting, and frequency and/or waveform smoothing or regulating of the received electrical power. In operation, the rectifier controller 122 may control rectification functions performed by the PCS, while the voltage boost controller 128 may control voltage boosting functions being performed by the PCS. In some embodiments, a single controller may control both the rectifier 120 and the voltage booster 126.

The assembly 150 may be comprised of multiple sub-sections, with a joint used to couple each of these sub-sections together in a desired arrangement to form the assembly 150. Field joints 112A-C can be used to couple the generator 152 and the pulse power section 154 to construct the assembly 150 and to couple the assembly 150 to the drill pipe 102. In some embodiments, the assembly 150 may include one or more additional field joints coupling various components of the assembly 150 together. Field joints may be places where the assembly 150 is assembled or disassembled in the field, for example at the drill site. In addition, the assembly 150 may require one or more joints referred to as shop joints that are configured to allow various sub-sections of the assembly 150 to be coupled together (for example at an assembly plant or at a factory). For example, various components of the assembly 150 may be provided by different manufacturers, or assembled at different locations, which require assembly before being shipped to the field.

Regardless of whether a joint in the assembly 150 is referred to as a field joint or a shop joint, the center flow tubing 114 extends through any of the components that include the center flow tubing 114. A joint between separate sections of the center flow tubing 114 or a hydraulic seal capable of sealing the flow of the drilling fluid within the center flow tubing 114 may be formed to prevent leaking at the joints.

A flow of drilling fluid (illustrated by the arrow 110A pointing downward within the drill pipe 102) can be provided from the drilling platform 160, and flow to and through the downhole motor 116, exiting the downhole motor 116 and flowing on into other sub-sections or components of the assembly 150, as indicated by the arrow 110B. For example, the downhole motor 116 can be a turbine such that the flow of drilling fluid through the device 116 can cause the downhole motor 116 to be mechanically rotated. This mechanical rotation can be coupled to the alternator 118 in order to generate electrical power. The PCS can further process and controllably provide the electrical power to the rest of the downstream assembly 150. The stored power can then be output from the electrodes 144 in order to perform the advancement of the borehole 106 via periodic electrical discharges.

The drilling fluid can flow through the assembly 150, as indicated by arrow 110B, and flow out and away from the electrodes 144 and back toward the surface to aid in the removal of the debris generated by the breaking up of the formation material at and nearby the electrodes 144. The fluid flow direction away from the electrodes 144 is indicated by arrows 110C and 110D. In addition, the flow of drilling fluid may provide cooling to one or more devices and to one or more portions of the assembly 150. In various embodiments, it is not necessary for the assembly 150 to be rotated as part of the drilling process, but some degree of rotation or oscillations of the assembly 150 may be provided in various embodiments of drilling processes utilizing the assembly 150, including internal rotations occurring at the downhole motor 116, in the alternator sub-section, etc.

The flow of drilling fluid passing through the downhole motor 116 can continue to flow through one or more sections of a center flow tubing 114, which thereby provides a flow path for the drilling fluid through one or more sub-sections or components of the assembly 150 positioned between the downhole motor 116 and the electrodes 144, as indicated by the arrow 110B pointing downward through the cavity of the sections of the center flow tubing 114. Once arriving at the electrodes 144, the flow of drilling fluid can be expelled out from one or more ports or nozzles located in or in proximity to the electrodes 144. After being expelled from the assembly 150, the drilling fluid can flow back upward toward the surface through an annulus 108 created between the assembly 150 and walls of the borehole 106.

The center flow tubing 114 may be located along a central longitudinal axis of the assembly 150 and may have an overall outside diameter or outer shaped surface that is smaller in cross-section than the inside surface of a tool body 146 in cross-section. As such, one or more spaces can be created between the center flow tubing 114 and an inside wall of the tool body 146. These one or more spaces may be used to house various components, such as components which make up the alternator 118, the rectifier 120, the rectifier controller 122, the DC link 124, the voltage booster 126, the voltage boost controller 128, the sensor 129, the pulse power controller 130, the switch bank 134, the one or more switches 138, the one or more primary capacitor(s) 136, the pulse transformer 140, and the one or more secondary capacitors 142, as shown in FIG. 1. The sensor 129 can be located in different locations within the assembly. As depicted in FIG. 1, the sensor 129 is positioned near the pulse power controller 130. However, the sensor 129 can be in any location within the assembly 150 and may include more than a single sensor (depending on the size and particular sensor measurement). Other components may be included in the spaces created between the center flow tubing 114 and the inside wall of the tool body 146.

The center flow tubing 114 can seal the flow of drilling fluid within the hollow passageways included within the center flow tubing 114 and at each joint coupling sections of the center flow tubing 114 together to prevent the drilling fluid from leaking into or otherwise gaining access to these spaces between the center flow tubing 114 and the inside wall of the tool body 146. Leakage of the drilling fluid outside the center flow tubing 114 and within the assembly 150 may cause damage to the electrical components or other devices located in these spaces and/or may contaminate fluids, such as lubrication oils, contained within these spaces, which may impair or completely impede the operation of the assembly 150 with respect to drilling operations.

The example pulse power drilling apparatus 100 can include one or more logging tools 148. The logging tools 148 are shown as being located on the drill pipe 102, above the assembly 150, but can also be included within the assembly 150 or joined via shop joint or field joint to assembly 150. The logging tools 148 can include one or more logging with drilling (LWD) or measurement while drilling (MWD) tool, including resistivity, gamma-ray, nuclear magnetic resonance (NMR), etc. The logging tools 148 can include one or more sensors to collect data downhole. For example, the logging tools 148 can include pressure sensors, flowmeters, etc. The example pulse power drilling apparatus 100 can also include directional control, such as for geosteering or directional drilling, which can be part of the assembly 150, the logging tools 148, or located elsewhere on the drill pipe 102.

Communication from the pulse power controller 130 to the voltage boost controller 128 allows the pulse power controller 130 to transmit data about and modifications for pulse power drilling to the generator 152. Similar, communication from the voltage boost controller 128 to the pulse power controller 130 allows the generator 152 to transmit data about and modifications for pulse power drilling to the pulse power section 154. The pulse power controller 130 can control the discharge of the pulse power stored for emissions out from the electrodes 144 and into the formation, into drilling mud, or into a combination of formation and drilling fluids. The pulse power controller 130 can measure data about the electrical characteristics of each of the electrical discharges—such as power, current, and voltage emitted by the electrodes 144. Based on information measured for each discharge, the pulse power controller 130 can determine information about drilling and about the electrodes 144, including whether or not the electrodes 144 are firing into the formation (i.e., drilling) or firing into the formation fluid (i.e., electrodes 144 are off bottom). The generator 152 can control the charge rate and charge voltage for each of the multiple pulse power electrical discharges. The PCS, together with the downhole motor 116 and alternator 118, can create an electrical charge in the range of 16 kilovolts (kV) which the pulse power controller 130 delivers to the formation via the electrodes 144.

When the pulse power controller 130 can communicate with the generator 152, the generator 152 and the alternator 118 can ramp up and ramp down in response to changes or electrical discharge characteristics detected at the pulse power controller 130. Because the load on the downhole motor 116, the alternator 118, and the generator 152 is large (due to the high voltage), ramping up and ramping down in response to the needs of the pulse power controller 130 can protect the generator 152 and associated components from load stress and can extend the lifetime of components of the pulse power drilling assembly. If the pulse power controller 130 cannot communicate with the generator 152, then the generator 152 may apply a constant charge rate and charge voltage to the electrodes 144 or otherwise respond slowly to downhole changes—which would be the case if the generator 152 is controlled by the drilling mud flow rate adjusted at the surface or another surface control mechanism.

In instances where the assembly 150 is off bottom, electrical power input to the system can be absorbed (at least partially) by drilling fluid, which can be vaporized, boiled off, or destroyed because of the large power load transmitted in the electrical pulses. In instances where the assembly 150 is not operating correctly, such as when one or more switch experiences a fault or requires a reset, application of high power to the primary and/or secondary capacitors 136/142 or the electrodes 144 can damage circuitry and switches when applied at unexpected or incorrect times. In these and additional cases, communications or messages between the pulse power controller 130 and the generator 152 allow the entire assembly to vary charge rates and voltages, along with other adjustments further discussed below. In cases where the pulse power controller 130 and generator 152 are autonomous, i.e., not readily in communication with the surface, downhole control of the assembly 150 can improve pulse power drilling function.

Example pulse power drilling operations 170-178 are now described. A first operation 170 includes generating mechanical energy. For example if the downhole motor 116 is a turbine, the mechanical energy can be generated by rotation of the turbine caused by the flow of drilling mud being delivered downhole. A second operation 172 includes converting the mechanical energy into electrical power. For example, the alternator 118 can convert the mechanical energy being generated by the downhole motor 116 into electrical power. A third operation 174 includes conditioning the electrical power. For example, the rectifier 120 can rectify and smooth the electrical power being output by the alternator 118 and the voltage booster 126 can increase a voltage of the electrical power.

Figure 2:
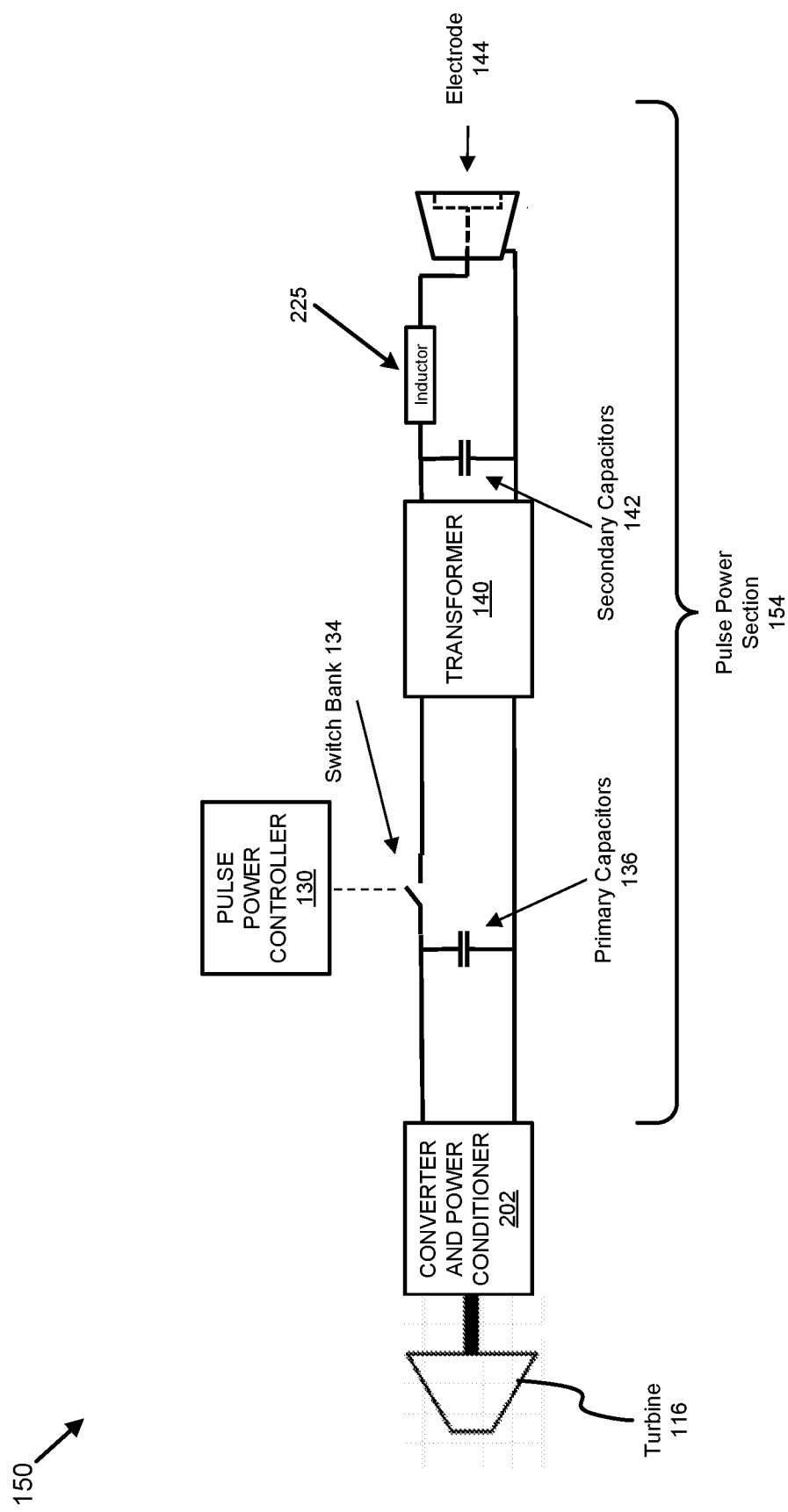
FIG. 2 depicts an example electrical configuration for storing of direct current (DC) electrical power for the pulse power section of the pulse power drilling assembly of FIG. 1, according to some embodiments.

A fourth operation 176 includes storing the conditioned electrical power. To help illustrate, FIG. 2 depicts an example electrical configuration for storing of electrical power for the pulse power section 154 of the pulse power drilling assembly of FIG. 1, according to some embodiments. The electrical power can be stored in a primary capacitor 136 ("primary capacitor") of the pulse power section 154. In some implementations, the electrical power stored in the primary capacitor 136 may have a variance that is greater than a variance threshold. For example, the variance threshold may be defined in terms of peak to average ratio of the power. For instance, the variance threshold may be a peak to average ratio of 4 or 5 to 1. In some other implementations, the variance threshold may be a different peak to average ratio (such as 3 to 1, 2 to 1, 8 to 1, etc.). The downhole motor 116 is coupled to output a mechanical energy to a converter and power conditioner 202. In reference to FIG. 1, the converter and power conditioner 202 can include the alternator 118, the rectifier 120, the DC link 124, and the voltage booster 126. As described above, components of the converter and power conditioner 202 can convert the mechanical energy into electrical power. The electrical power can be stored in the primary capacitor(s) 136 while switch(es) in the switch bank 134 are open. For simplicity, FIG. 2 depicts only one switch in the switch bank 134. However, the number and configuration of switches can differ.

As further described below, a pulse of electrical discharge can be periodically output from the electrode(s) 144 to perform pulse power drilling. Switch(es) of the switch bank 134 can remain open until a sufficient amount of power has been stored in the primary capacitors 136. After a sufficient amount of power has been stored in the primary capacitors 136, the switch(es) can be closed to supply power to the pulse transformer 140 and the secondary capacitors 142 (through an inductor 225), which is then emitted from the electrode(s) 144 as a pulse of electrical discharge into the subsurface formation for pulse power drilling. For example, the switch(es) can be closed when the primary capacitor(s) 136 storing the energy are fully charged. Alternative or additional criteria can be used to determine when to close the switch(es) (as further described below). Additionally, electrical power can continue to be generated by the flow of drilling mud. This electrical power can be stored in generator capacitors (e.g., DC link capacitors) in order to prevent damage to the downhole motor 116, the alternator 118, etc. For example, electrical power can be stored in DC link capacitors of the DC link 124.

A fifth operation 178 includes pulsing an electrical discharge into the rock of the subsurface formation. For example, the pulse power controller 130 can determine whether at least one discharge criteria has been satisfied. The discharge criteria can be a criteria that a defined amount of energy has been stored in the primary capacitor(s) 136. For example, the discharge criteria can be that the primary capacitor(s) 136 are fully charged, charged more than a defined percentage of the full storage capacity (e.g., 99%, 95%, 90%, 50%, etc.), etc. Another example criteria can be that a bottom of the drill string is in contact with a bottom of the borehole. For example, the criteria can be that at least a minimum amount of surface area of the bottom of the drill string in in contact with a bottom of the borehole. Another example criteria can be that a defined amount of time has elapsed since a prior pulsing of the electrical discharge. This defined amount of time can help ensure that the bottom of the drill string is in contact with a bottom of the borehole prior to pulsing of the electrical discharge. In response to the discharge criteria being satisfied, the pulse power controller 130 can cause the primary capacitor(s) 136 to release the stored energy from the primary capacitor(s) 136 through the electrode(s) 144—resulting in the pulse of electrical discharge into the surrounding subsurface formation. This pulsing of the electrical discharge can continue to occur periodically in response to the discharge criteria being satisfied.

Figure 3:
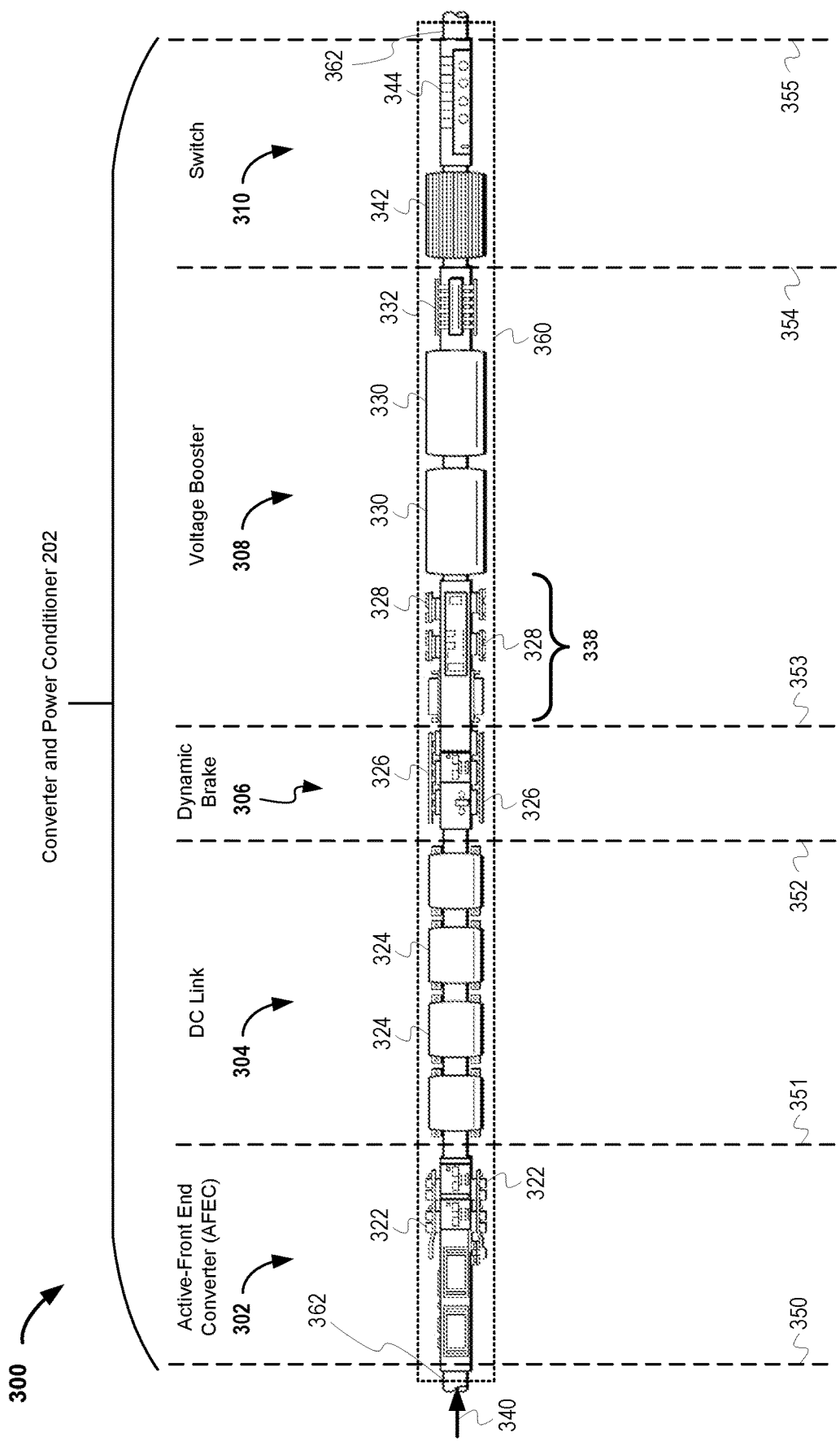
FIG. 3 illustrates a power conditioning system for use during pulse power drilling, according to some embodiments.

FIG. 3 illustrates a power conditioning system for use during pulse power drilling, according to some embodiments. A power conditioning system ("PCS") 300 can be physically part of a pulsed power drilling assembly. For example, with reference to FIG. 1, the rectifier 120, the DC link 124, and the voltage booster 126 can be included as part of a PCS. In some embodiments, the PCS 300 can be configured to receive electric power generated by a turbine and alternator combination of the pulse power drilling assembly. For example, with reference to FIG. 1, the PCS can receive electrical power generated by the downhole motor 116 and the alternator 118. The PCS 300 can electrically condition the received electrical power and provide a conditioned electrical output to additional components of the pulsed power drilling assembly that include one or more electrodes for storage in primary and/or secondary capacitors. Conditioning of the electrical power that may be performed by the PCS 300 may include altering or controlling one or more electrical parameters associated with the received electrical power. Example electrical parameters include voltage, current, phase, and frequency. In some embodiments, the PCS 300 can modulate and/or filter frequencies of a waveform associated with the received electrical power. Additionally, components of the PCS 300 can condition power prior to delivering the conditioned electrical power to one or more other components of the pulse power assembly.

The PCS 300 may include multiple modules that modulate the received electrical power in various ways. As illustrated in FIG. 3, the PCS 300 includes an active front-end converter (AFEC) 302, a direct current (DC) link 304, a dynamic brake 306, a voltage booster (or "output power converter") 308, and an output inductor and switch 310. The AFEC 302 includes components positioned between dashed lines 350 and 351, the DC link 304 includes components positioned between dashed lines 351 and 352, the dynamic brake 306 includes components positioned between dashed lines 352 and 353, the voltage booster 308 includes components positioned between dashed lines 353 and 354, and the output inductor and switch 310 include components positioned between dashed lines 354 and 355. With reference to FIG. 1, the PCS 300 may be an example arrangement of components of the converter and power conditioner 202.

The components of the PCS 300 as illustrated in FIG. 3 are demarcated by the dashed lines 350-355 as separate modules. However, some components of one or more of these modules may share space, and/or components of one or more modules may overlap. In some embodiments the PCS 300 may be a separate component of the pulse power drilling assembly that is physically and electrically connected to an alternator at a first end and to additional modules of the pulse power assembly at a second end by respective field or shop joints. For example, with reference to FIG. 1, the PCS 300 may be coupled to the alternator 118 and the pulse power section 154 as the converter and power conditioner 202.

Modules of the PCS 300 can be arranged along a center flow tube 362 that extends along a longitudinal axis of the pulse power assembly. The center flow tube 362 can define a passage extending through the PCS 300 to permit a flow of drilling fluid 340 to pass through the PCS 300 without exposing components of the PCS 300 to the drilling fluid 340. Further, the flow of drilling fluid 340 through the PCS 300 may aid in cooling of components of the PCS 300 as heat dissipated by the components of the PCS 300 is transferred to the drilling fluid 340 as it flows through the center flow tube 362.

In some embodiments, components of the PCS 300 may be insulated to protect components of the PCS 300 from physical, electrical, and/or thermal shock downhole. In some embodiments, components of the PCS 300 may be immersed in an insulating fluid. For example, an annulus defined between the center flow tube 362 and an outer surface 360 of the PCS 300 may be filled with a dielectric fluid. In other embodiments, the annulus between the center flow tube 362 and the outer surface 360 may be filled with one or more solid materials. For example, the annulus between the center flow tube 362 and the outer surface 360 may be filled with insulating wool or fiberglass. Alternatively or in addition, an outer surface of the center flow tube 362 may be wrapped with insulating tape.

In various embodiments, the AFEC 302 of the PCS 300 can receive electrical power from an alternator of the pulse power drilling assembly and output rectified electrical power to the DC link 304. The AFEC 302 may include a plurality of controllable transistors 322 capable of performing in high temperature, high switching frequency, and high power density applications. For example, the transistors 322 may be silicon carbine (SiC) field effect transistors (FETs).

In some embodiments, the AFEC 302 can include a controller that controls the transistors 322 to regulate a voltage and/or current output from the AFEC 302. For example, the AFEC 302 can be controlled to limit the amplitude of the output current to protect circuitry of the PCS 300 and other components of the pulse power assembly from large spikes in current or voltage caused by operation of the turbine and alternator. Further, the AFEC 302 can be controlled to limit the output voltage provided to the DC link 304. The DC link 304 can receive the rectified electrical power from the AFEC 302 and output filtered electrical power. One or more generator capacitors 324 (and in some embodiments, inductive elements) of the DC link 304 can absorb and store power output from the AFEC 302.

In addition to the active control of the AFEC 302, the dynamic brake 306 can further protect the circuitry of the PCS 300, including the AFEC 302, DC link capacitors of the DC link 304, and the voltage booster 308, from high voltage loads. Particularly, control of one or more transistors 326 of the dynamic brake 306 can allow for discharging of excess power by providing a path for current flow through one or more resistive elements of the dynamic brake 306.

In some embodiments, control of the dynamic brake 306 can be based on a detected characteristic of the electrical power as it is conditioned by the PCS 300. For example, in response to detection of high voltages of the filtered electrical power output from the DC link 304, a controller can modify one or more of the transistors 326 of the dynamic brake 306 to flow current to a resistive element to dissipate the electrical energy as heat. A high voltage may be a voltage, such as a peak to peak voltage level, that exceeds a pre-defined maximum threshold level.

Active control of controllable transistors of the voltage booster 308 can further aid in insulation of the turbine and alternator during discharging. The voltage booster 308 can receive the output filtered electrical power from the DC link 304 and output a boosted electrical power having a voltage that is greater than the voltage of the filtered electrical power received as an input. In some embodiments, the voltage booster 308 can include a single-active bridge (SAB) 338 having controllable transistors 328, one or more transformers 330, and a diode bridge having one or more diodes 332. In some embodiments, the transformers 330 may be solid-state transformers arranged in parallel. The transistors 328 of the SAB 338 condition the filtered electrical power to generate parallel square wave electrical outputs, reducing current ripples at the output of each of the transformers 330. Generation of the parallel signals can reduce the electrical power level carried by each individual signal, which enables the use of smaller and more compact transformers.

A boosted voltage output from the voltage booster 308 can then be supplied to other components of the pulse power assembly via the output inductor and switch 310, which can include at least one inductor 342 and a switch 344. In some embodiments, the switch 344 may not be present. The inductor 342 can filter the boosted voltage output prior to storage in primary capacitors and/or secondary capacitors of the pulse power assembly. The switch 344 can be controlled with a controller to electrically couple and decouple the PCS 300 from other components of the pulse power assembly, providing another means of protecting the turbine, alternator, and PCS 300 from load shocks during pulse power operations.

During operation of the pulse power assembly, particularly during discharging of the assembly, the turbine and alternator can suffer electrical and mechanical damage if exposed to large impulse changes in the electrical power load of the system. Active control of transistors of the AFEC 302 and the voltage booster 308 enables insulation of the turbine and alternator during a discharging cycle. This can prevent back-feeding of large variations in current and/or voltage loads from the PCS 300 to the alternator and/or turbine, thereby insulating the alternator and turbine from high frequency load shocks generated during discharging of the pulse power assembly.

Figure 4:
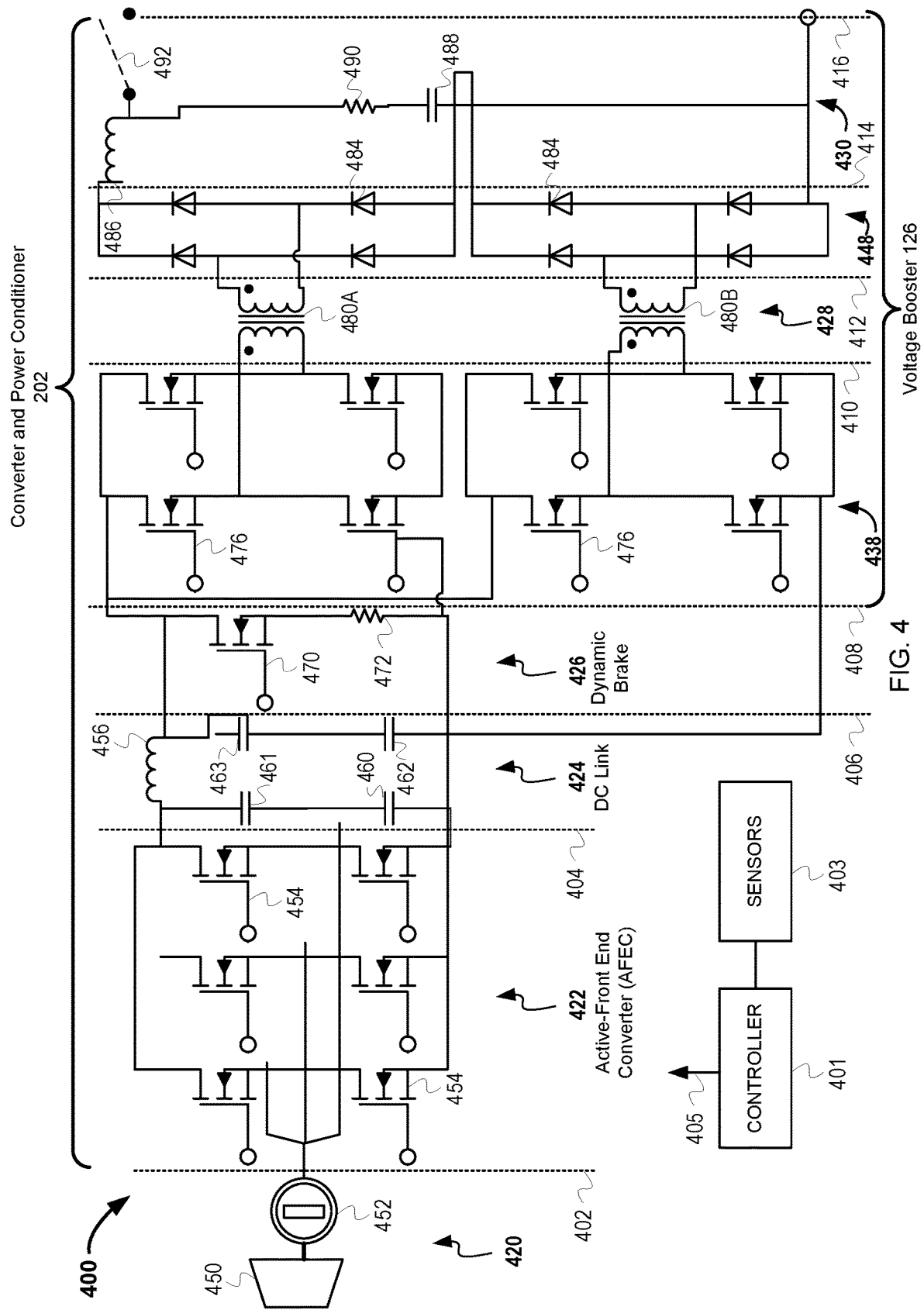
FIG. 4 depicts an example circuit diagram for the power conditioning system, according to some embodiments.

FIG. 4 depicts an example circuit diagram for the power conditioning system, according to some embodiments. Operations and components illustrated in FIG. 4 are described in reference to the embodiment(s) of the power conditioning system 300 of FIG. 3. A circuit diagram 400 depicts electrical components and circuitry of the PCS as divided into modules by dashed lines 402, 404, 406, 408, 410, 412, 414, and 416. Modules defined between the dashed lines 402 and 404, 404 and 406, 406 and 408, 408 and 410, 410 and 412, 412 and 414, and 414 and 416 respectively correspond to the AFEC 302, the DC link 304, the dynamic brake 306, the booster converter 308, and the output inductor and switch 310 of the PCS 300 of FIG. 3. However, these divisions are non-limiting, and individual electrical components, such as resistors, capacitors, FETs, controllers, processors, etc. can be shared between components or in a different order from that shown in FIG. 4. In some embodiments, components of FIG. 4 can instead be replaced by other components or by additional hardware, firmware, software, etc.

The circuit diagram 400 of FIG. 4 includes a power generation unit 420 and the converter and power conditioner 202. The converter and power conditioner 202 includes an AFEC 422, a DC link 424, a dynamic brake 426, and the voltage booster (or output power converter) 126 having a single active bridge 438, a set of transformers 428 (two transformers 480A and 480B), and a diode bridge 448, and an output inductor and switch 430 corresponding to the PCS 300 of FIG. 3. The power generation unit 420 can include a turbine 450 and an alternator 452, which outputs electrical power converted from mechanical energy that is generated by a flow of drilling fluid through the turbine 450. While depicted as tri-phasic, the alternator 452 can output triphasic, biphasic, or other, including single phase, alternating current (AC) to the AFEC 422.

The AFEC 422 can include one or more controllable transistors 454 which function as switches to aid in rectification of the electrical current output from the alternator 452. The transistors 454 can be controlled by a controller 401 of the generator. Rectification performed by the AFEC 422 may include rectifying the electrical current from the alternator 452 to output a rectified current. The rectified current may be rectified AC or quasi-direct current (DC) (i.e., a square wave, sawtooth, etc. waveform). As depicted, the AFEC 422 is a full wave rectifier.

Figure 5A:
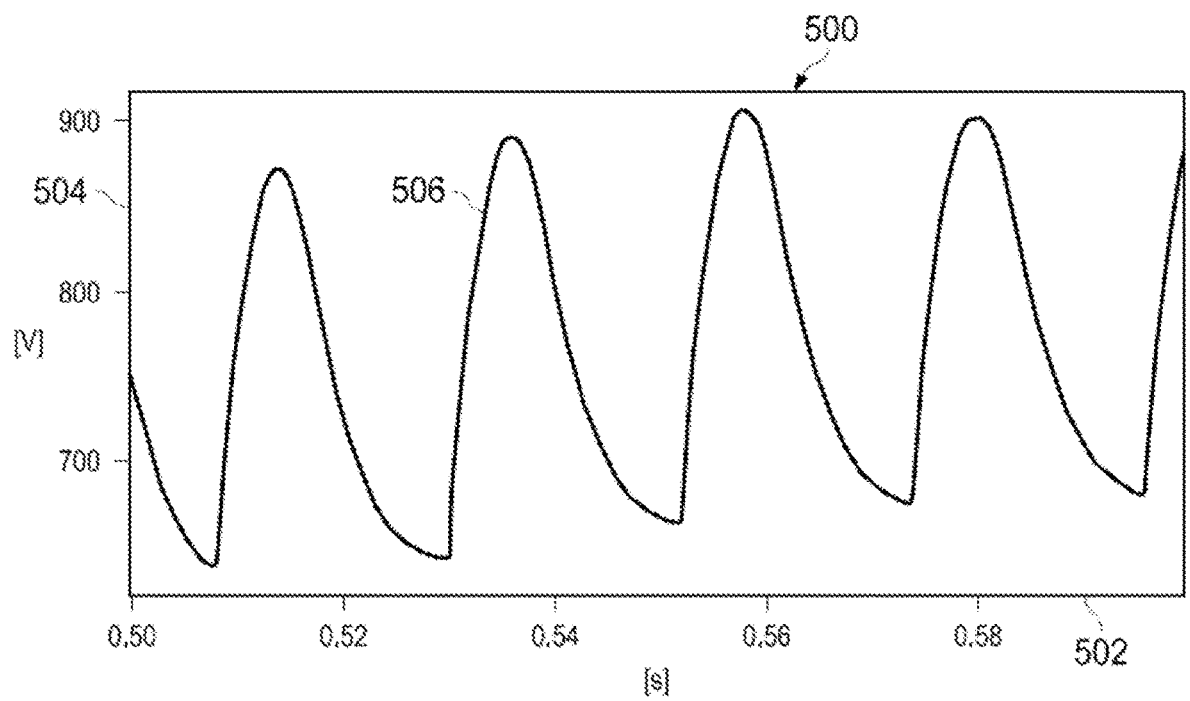
FIGS. 5A-5B depict graphs of active front-end converter (AFEC) voltage and current output, according to some embodiments.
Figure 5B:
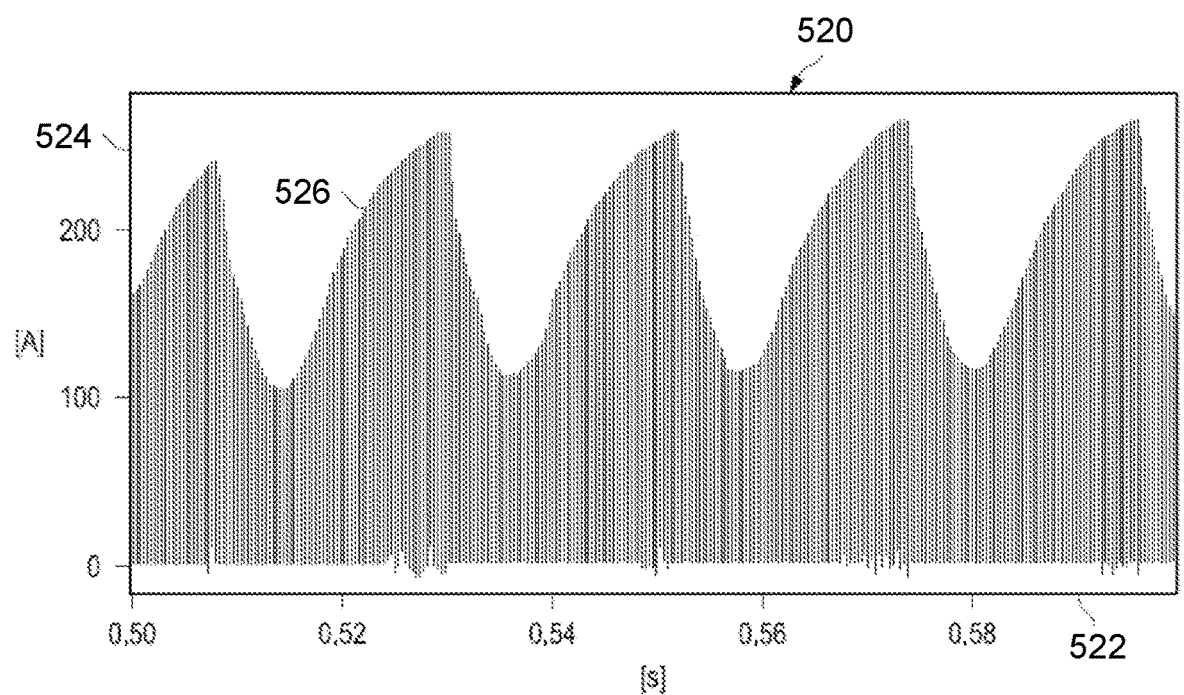

To illustrate, FIGS. 5A-5B depict graphs of AFEC voltage and current output, according to some embodiments. FIGS. 5A-5B depict graphs 500 and 520. Operations of FIGS. 5A-5B are described in reference to the example power conditioning system 300 of FIG. 3 and the circuit diagram 400 of FIG. 4.

FIG. 5A contains the graph 500, depicting a voltage signal 506 (as measured at the dashed line 404 of FIG. 4) output from the AFEC 422 as a function of time (on an x-axis 502) and voltage (on a y-axis 504). The voltage displays periodicity on the order of approximately 0.02 sec. Voltage ranges from approximately 600 to 950 V. The voltage signal 506 is a positive, AC or quasi-DC signal that exhibits periodicity in amplitude at a substantially steady frequency.

FIG. 5B contains the graph 520, depicting a current signal 526 (as measured at the dashed line 404 of FIG. 4) output from the AFEC 422 as a function of time (on an x-axis 522) and current (on a y-axis 524). The current displays periodicity on the order of approximately 0.02 sec (as shown in the sawtooth nature of the wave envelope) and higher frequency periodicity as shown by the lines within the wave envelope. Current ranges from approximately 0 A to 250 A and is positive.

Figure 5C:
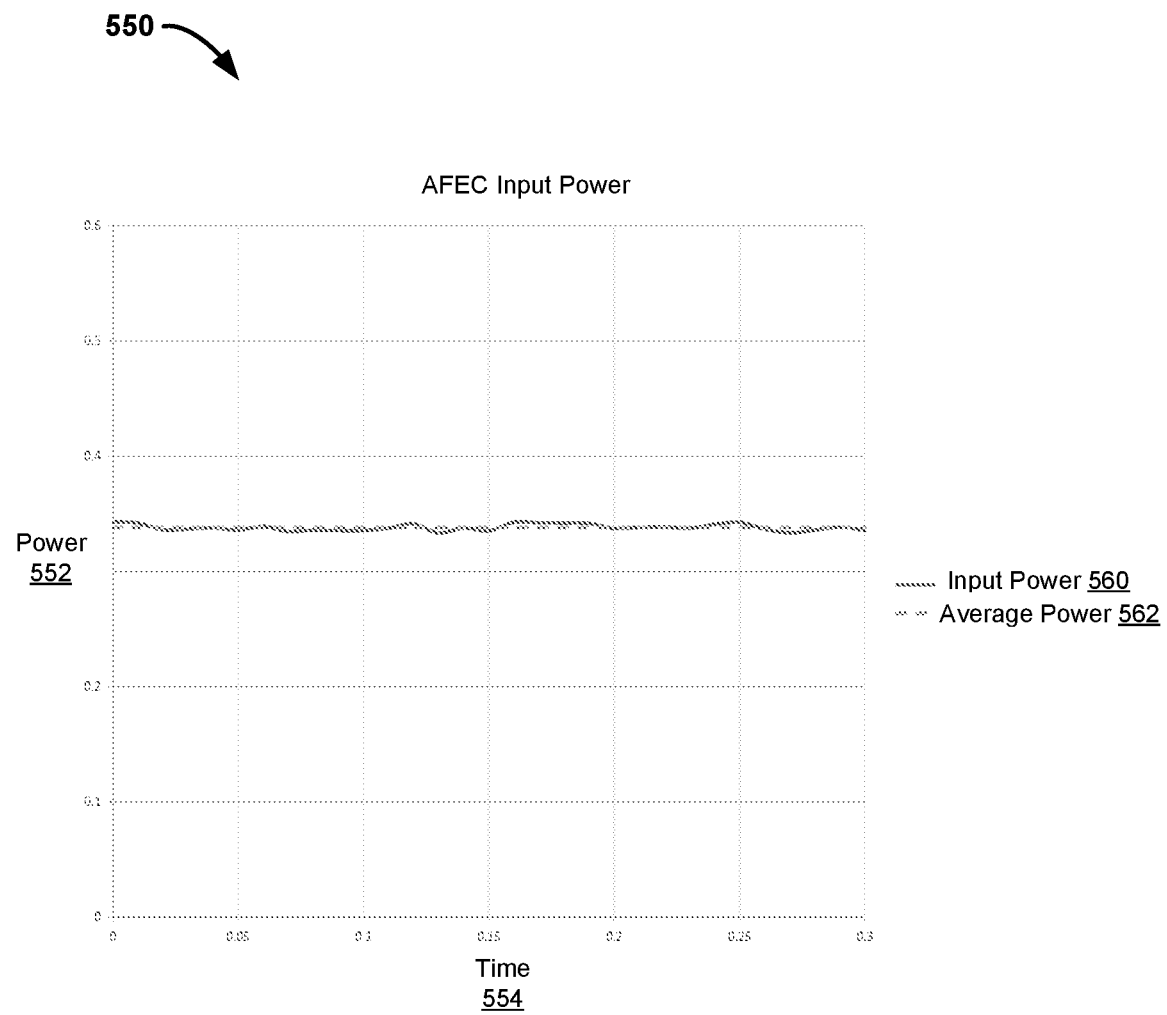
FIG. 5C depicts a graph of AFEC power input which is relatively constant, according to some embodiments.

FIG. 5C depicts a graph of AFEC power input which is relatively constant, according to some embodiments. FIG. 5C depicts a graph 550 that includes a y-axis 554 (power) as a function of time (along an x-axis 554). The graph 550 depicts how closely the AFEC input power can track an average input power. As shown, the graph 550 includes a solid line 560 (the AFEC input power) and a dashed line 562 (an average input power).

Returning to the circuit diagram 400 of FIG. 4, the DC link 424 can receive the voltage and current output by the AFEC 422 (as shown in FIGS. 5A-5B). Generator capacitors 460, 461, 462, and 463 of the DC link 424 can store rectified electrical energy, remove resonant frequencies, and smooth current and voltage waveforms to provide a filtered electrical output to the dynamic brake 426. The DC link capacitors 460 and 461 are arranged in series with each other and the DC link capacitors 462 and 463 are arranged in series with each other. The set of the DC link capacitors 460 and 461 is arranged in parallel with the set of the DC link capacitors 462 and 463, with the two parallel series connected DC link capacitors coupled by an inductor 456. In some embodiments, the DC link capacitors 460 and 461 can optionally be replaced by a single capacitor, as can the DC link capacitors 462 and 463. Alternatively, the DC link capacitors 460, 461, 462, and 463 can be replaced by an alternate arrangement of capacitors or a bank of capacitors. The inductor 456 can be an air coil, a coil surrounding a non-dielectric material or a soft magnetic material, a length of wire formed around a coil or toroidal core, a length of wire formed around a metallic or semi-metallic core, etc. The DC link 424 can optionally include one or more resistors in parallel with each of the DC link capacitors 460, 461, 462, and 463 in order to improve equitable voltage distribution between the sets of DC link capacitors in series.

Together the DC link capacitors 460, 461, 462, and 463 and the inductor 456 can block high frequency currents from passing from the AFEC 422 to the other elements of the PCS 300. In various embodiments, AFEC 422 operates at a first switching frequency, such as 40 kHz, while the SAB 438 may operate at a second switching frequency, which can be 80 kHz, 100 kHz, or another value based on the characteristics of one or more controllable transistors 476 of the SAB 438. The output of the DC link 424 is measured at the dashed line 406.

Figure 6A:
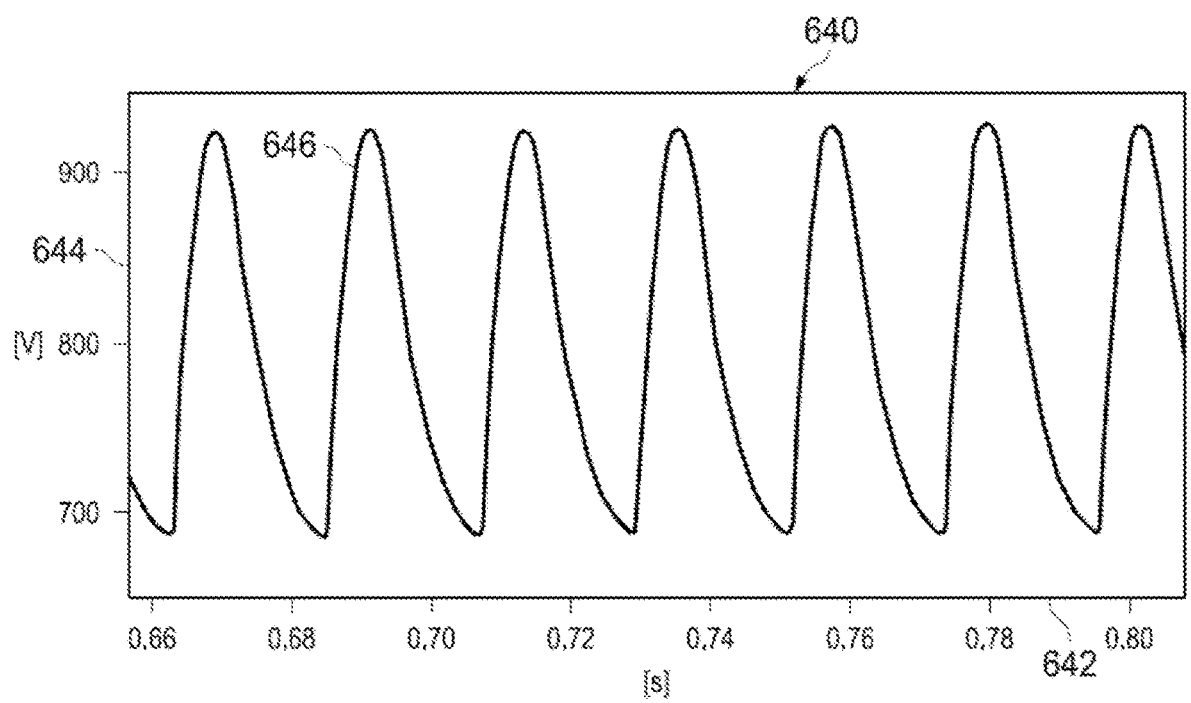
FIGS. 6A-6B depict graphs of DC link voltage and current output, according to some embodiments.
Figure 6B:
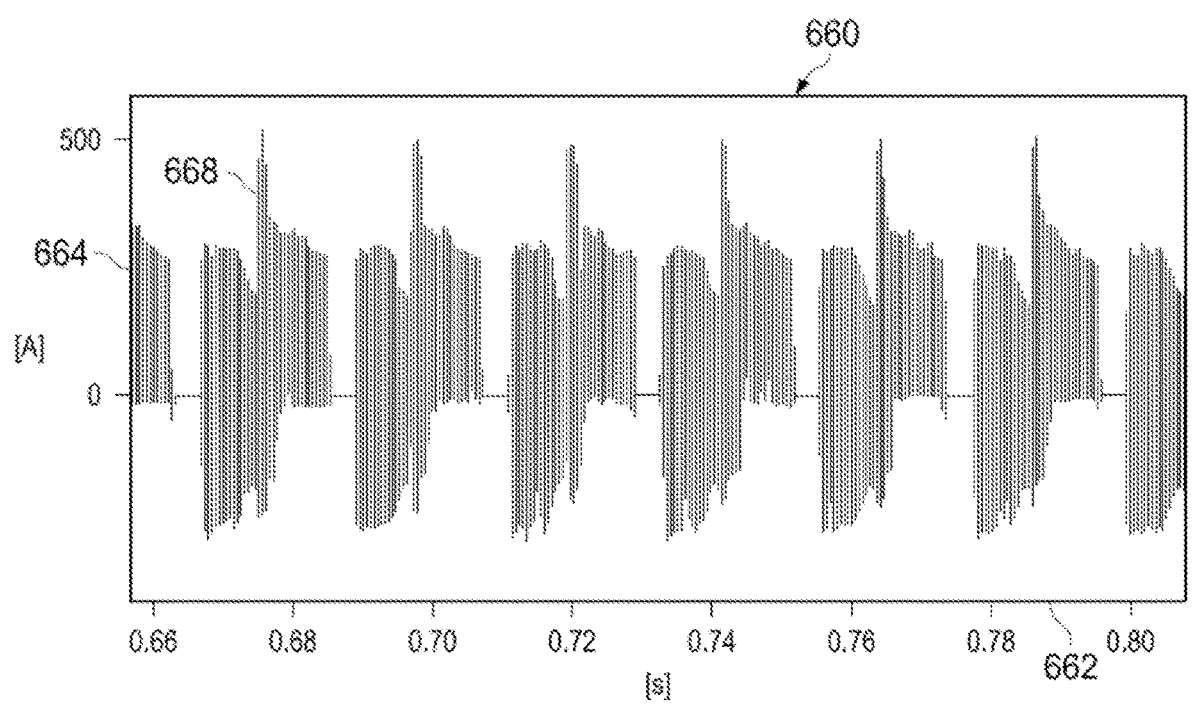
Figure 6C:
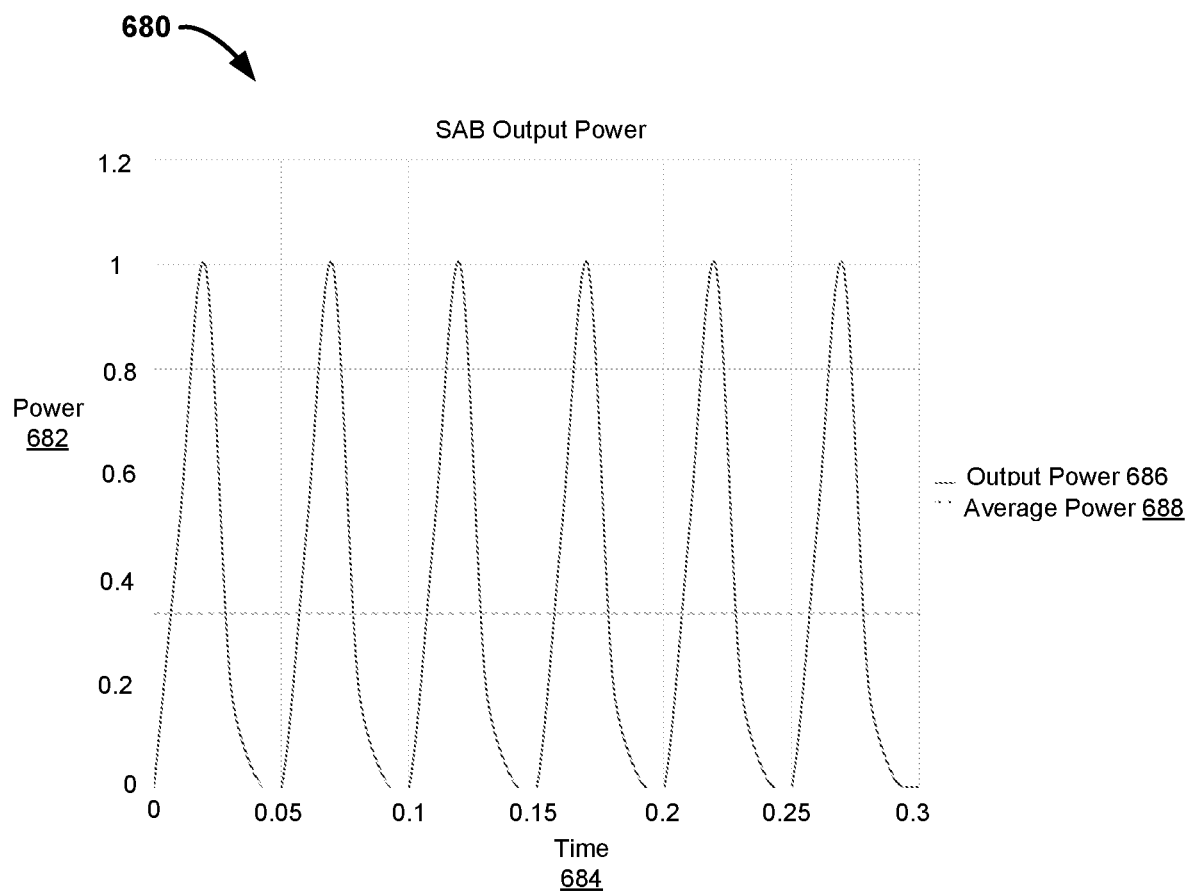
FIG. 6C depicts graph of single-active bridge (SAB) power output with high peak-to-average ratio, according to some embodiments.

To illustrate, FIGS. 6A-6B depict graphs of DC link voltage and current output, according to some embodiments. FIG. 6C depicts graph of SAB power output with high peak-to-average ratio, according to some embodiments. FIGS. 6A-6C depict graphs 640, 660, and 680, respectively. Operations of FIGS. 6A-6C are described in reference to the example power conditioning system 300 of FIG. 3 and the circuit diagram 400 of FIG. 4.

FIG. 6A contains the graph 640, which shows DC link 424 output voltage. The graph 640 shows a voltage signal 646 (as measured at the dashed line 406 of FIG. 4) as a function of time (on an x-axis 642) and voltage (on a y-axis 644). The voltage displays periodicity on the order of approximately 0.02 sec. Voltage ranges from approximately 650 to 950 V. The voltage signal 646 is a positive, quasi-DC signal that exhibits periodicity in amplitude at a substantially steady frequency.

FIG. 6B contains the graph 660, which shows DC link 424 output current. The graph 660 shows a current signal 668 (as measured at the dashed line 406 of FIG. 4) as a function of time (on an x-axis 662) and current (on a y-axis 664). The current displays periodicity on the order of approximately 0.02 sec (and at other harmonic frequencies), which appears as a step function in the wave envelope and higher frequency periodicity as shown by the lines within the wave envelope. Current ranges from approximately −500 A to 500 A and is both positive and negative. The wave envelopes that appear on the order of every 0.02 sec are separated by sections where the current is zero, also occurring in periods of approximately 0.02 sec.

FIG. 6C includes the graph 680, which shows the SAB power output with high peak-to-average ratio. The graph 680 shows an output power 686 and an average power 688 as a function of time (on an x-axis 684) and power (on a y-axis 682). FIG. 6C depicts the system high peak-to-average ratio power output generated from constant average power input at AFEC. The changes in the output power 686 is caused by the intermittent operation of the load (which is the primary capacitors of the pulse power system).

Returning to the circuit diagram 400 of FIG. 4, the dynamic brake 426 receives the filtered electrical current from the DC link 424. As depicted, the dynamic brake 426 includes one or more controllable transistors 470 and at least one resistor 472, where the transistor 470 can be controlled to route current through the resistor(s) 472, as described above in reference to FIG. 3.

When the dynamic brake 426 is not active, the current and voltage output of the dynamic brake 426 measured at dashed line 408 is substantially the same as the current and voltage input of the dynamic brake 426, which is the current and voltage output of the DC link 424, as measured at the dashed line 406. When the dynamic brake 426 is active, current and voltage flowing to the SAB 438 are reduced, and in some cases output negligible current or an output of zero voltage. In some cases, when the dynamic brake 426 is active, the current and voltage flowing to the SAB 438 can be truncated or limited.

Together, the SAB 438, the transformer 428, and the diode bridge 448 make up the voltage booster 308 of FIG. 3, which outputs a current having a boosted voltage, and operates similar to the voltage booster 308 of FIG. 3, as previously described. The SAB 438 includes controllable transistors 476 arranged in parallel banks. The SAB 438 receives a quasi-DC input from the DC link 424 and outputs an AC output to the transformers 428. The transformers 428 are configured to convert an AC input (from the SAB 438) into a boosted AC output having a higher voltage than the filtered output from the DC link 424. The boosted AC output of the transformers 428 is then rectified by the diode bridge 448 into a boosted DC or quasi-DC output. As depicted, the diode bridge 448 includes two full wave rectifiers arranged in parallel. Diodes 484 of the diode bridge 448 function as junctions to provide the boosted output from the transformers 428 to the pulse power assembly through an inductor 486 of the output inductor and switch 430. As depicted in FIG. 4, a resistor 490 and a voltage booster capacitor 488 are in parallel with the diode bridge 448. The resistor 490 and the voltage booster capacitor 488 can function to filter and smooth the voltage output from the diode bridge 448. The resulting power output of the SAB is illustrated in FIG. 6C.

In some embodiments, a switch 492 may be positioned downstream of the inductor 486 to control the electrical coupling between the electrical outputs from the PCS 300 and the additional downstream modules of the pulse power drilling assembly, which includes one or more electrodes. As depicted in FIG. 4, the switch 492 is coupled in series with the output of the inductor 486. In some embodiments, the switch 492 can remain closed unless a fault condition, such as a short circuit, over voltage, etc., is detected by sensors 403 of the PCS 300 or other circuitry. In that case, a detected fault may be used as a trigger to cause the controller 401 to generate a signal 405 to open the switch 492.

Further, the switch 492 may be controlled to open when the circuitry powering the one or more electrodes of the pulse power drilling assembly are fully charged in order to protect the PCS 300 from discharge effects of the pulse power electrodes. If the pulse power electrodes are discharged when in electrical contact with the PCS 300, the PCS 300 may suffer electrical load shock or upstream capacitive discharge. Alternatively or in addition, the switch 492 may be configured to open based a predetermine time interval. In some embodiments, the switch 492 may be configured to default to an open position, and to close when a difference in voltage is detected between the output of the output inductor 486 and (for example) the primary and/or secondary capacitors of the pulsed power unit used to control the pulse power applied to the electrode(s) of the pulse power drilling assembly.

Some or all of the transistors 454, 470, and 476 can be field-effect transistors (FETs), power metal-oxide-semiconductor FETs (MOSFETs), or any other controllable transistor or combination thereof appropriate for high frequency switching. Active control of the switching of the transistors 454, 470, and 476 can allow for the modulation and/or adjustment of various characteristics of the electrical power as it is converted and conditioned by the PCS 300.

In addition to providing relatively constant power to the voltage booster 126, active rectification enables active control of the power level transmitted from the alternator 452 to the pulse power section in that the AFEC 422 can act as a controllable load on the alternator 452. At steady-state operation (e.g., once the turbine is rotating at a constant speed) the AFEC 422 draws relatively constant power from the alternator 452. However, the controller 401 can control switching of the transistors 454 to adjust the power level transmitted to the pulse power section from the AFEC 422. For example, with reference to FIG. 1, the controller 401 can be the rectifier controller 122 and can control the transistors 454 by modifying the time between switching of the transistors 454 coupled to each phase of the alternator 452 to control the voltage and current levels of the electrical power provided to the DC link 424 and the voltage booster. Further, rectification using active switching elements, such as the transistors 454, can decrease voltage losses in comparison to rectification with passive elements, such as diodes.

Similar to the transistors 454 of the AFEC 422, the transistors 476 of the SAB 438 can be controlled. In some embodiments, the controller 401 may control switching of the transistors 476 in addition to the transistors 454. Alternatively, switching of the transistor 476 may be controlled by a separate controller from the controller 401 that controls switching of the transistors 454. For example, with reference to FIG. 1, the voltage boost controller 128 can control the switching of the transistors 476 of the SAB 438. During operation, the voltage booster 126 transmits power to primary and/or secondary capacitors of the pulse power assembly to charge them. For example, with reference to FIG. 1, the voltage booster 126 can transmit power from the rectifier 120 and/or the DC link 124 to the primary capacitors 136 until the primary capacitors 136 are charged to a desired level. Once the primary capacitor 136 storing energy to be emitted into the formation through electrodes of the pulse power assembly are charged, one or more of the transistors 476 can be activated to stop the supplying of power from the AFEC 422 to the pulse power section while power stored in the primary and/or secondary capacitors of the pulse power assembly (such as the primary capacitors 136 of FIG. 1) is emitted into the formation through the electrodes.

During pulsing of electrical discharges from the electrodes, the AFEC 422 still draws constant power from the alternator 452 which can be stored in the DC link capacitors 460, 461, 462, and 463 of the DC link 424. Because the duration of the pulsing is short (on the magnitude of microseconds), DC link capacitors 460, 461, 462, and 463 of the DC link 424 can be smaller than the primary or secondary capacitors of the pulse power assembly. Once the pulsing is completed, the transistors 476 can be closed and the primary capacitors can begin charging using power stored in the DC link capacitors 460, 461, 462, and 463 of the DC link 424 and provided by the AFEC 422.

In addition to providing active control, controllable transistors of the AFEC 422, the dynamic brake 426, and the SAB 438 allows for pulsing of electrical discharges at high voltages without exposing the alternator 452 to high electrical loads. During pulsing, the peak power draw can be magnitudes higher than the average power draw during charging, resulting in a large variance in the power draw from the alternator 452. For example, with reference to FIG. 1, during charging of the primary capacitors 136 the load on the alternator may be 15 kV. However, during pulsing the power draw can be as large as 150 kV. Active control of the transistors 476 of the SAB 438 can protect the alternator 452 from a power surge that would damage or destroy the power generation unit 420 during pulsing. This allows for the use of a more compact power generation unit 420, as the power generation unit 420 does not have to be capable of weathering the high voltage loads during pulsing. If the power generation unit 420 were to need to withstand such high loads, the size of the power generation unit 420 would need to be much larger, making downhole power generation both impractical and costly.

Figure 6D:
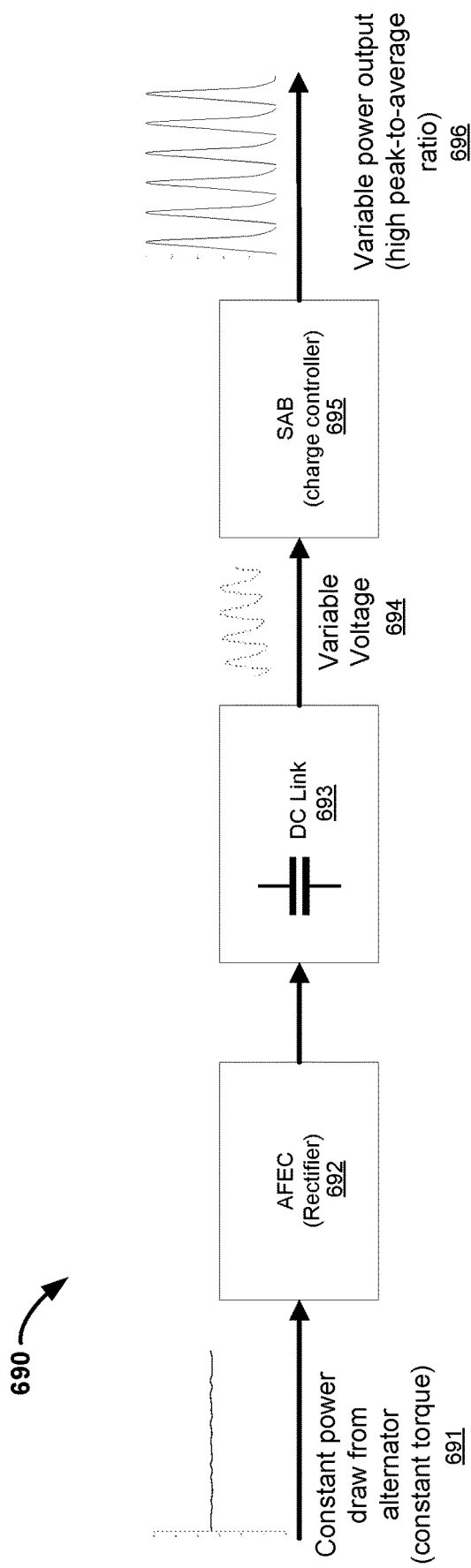
FIG. 6D depicts an example of the overall power conditioning system operations as described above, according to some embodiments.

To further illustrate, FIG. 6D depicts an example of the overall power conditioning system operations as described above, according to some embodiments. In FIG. 6D, a system 690 includes an input of essentially constant power draw from the alternator (constant torque) (691). The input 691 is input into an AFEC (rectifier) (692) to output a rectified signal that is input into a DC link 693. The DC link output a variable voltage 694 that is input into the SAB (charge controller) (695). The SAB 695 then outputs a variable power output (high peak-to-average ratio) (696).

Example Configurations for Pulse Power Directional Drilling

Example electrode assemblies for pulse power directional drilling are now described with reference to FIGS. 7-12. While depicted separately, multiple of these example electrode assemblies can be combined in a same assembly.

Figure 7:
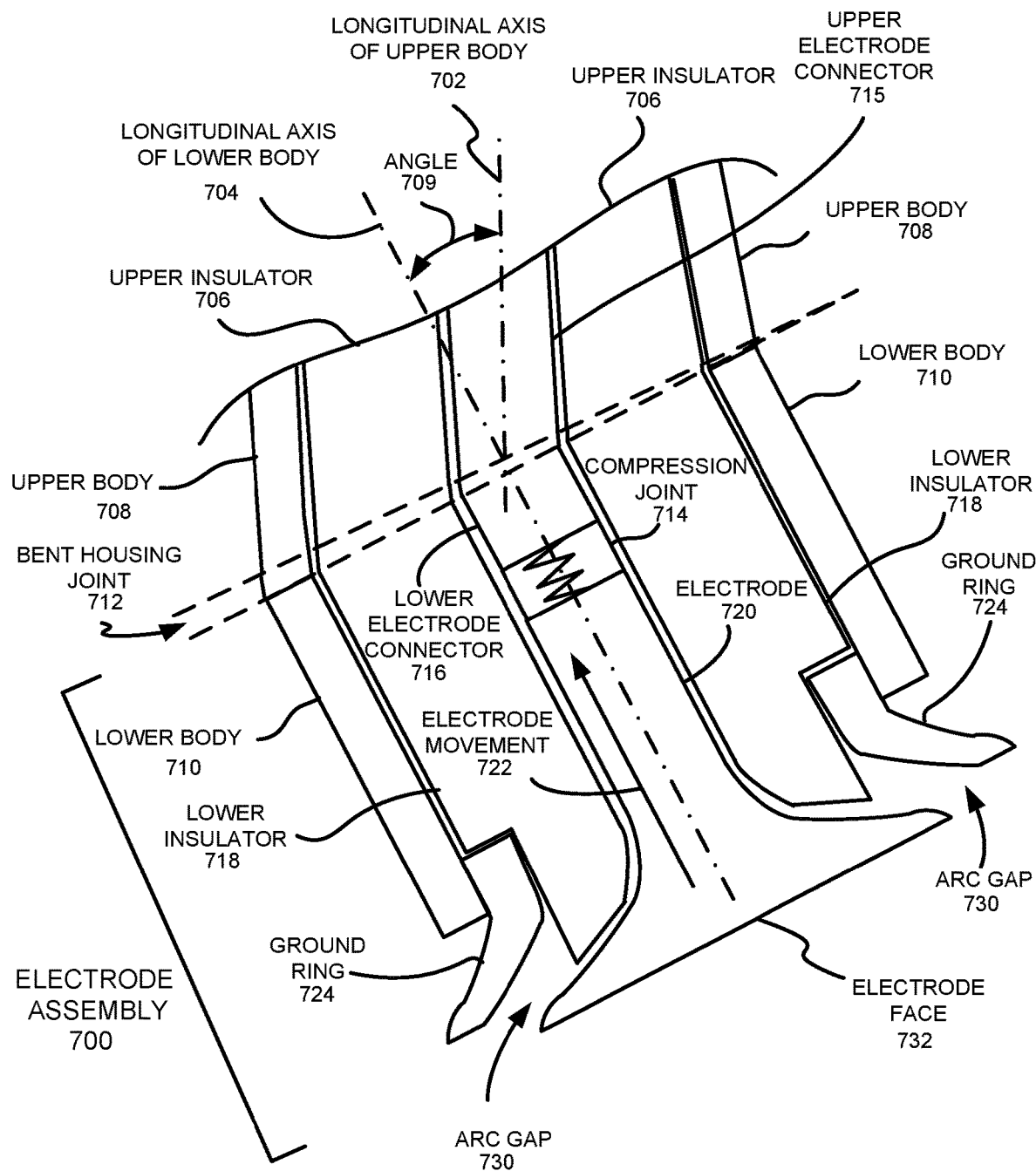
FIG. 7 depicts an example electrode assembly having a bent housing for pulse power directional drilling, according to some embodiments.

FIG. 7 depicts an example electrode assembly having a bent housing for pulse power directional drilling, according to some embodiments. In FIG. 7, an electrode assembly 700 having a lower body 710, an electrode 720 with an electrode face 732, and a ground ring 724. The lower body 710 is joined to an upper body 708 at a bent housing joint 712. For example, the upper body 708 can be part of the tool body 146 and the electrode assembly 700 can be the electrode(s) of the assembly 150 of FIG. 1.

A longitudinal axis 702 of the upper body 708 extends in a non-parallel orientation relative to a longitudinal axis 704 for the lower body 710. The difference in the relative orientations of these two longitudinal axes may for example be one-degree of angle, or a faction of a degree of angle, or up to multiple degrees of angle, such as one to five degrees inclusive.

The upper body 708 encloses an upper insulator 706 encircling an upper electrode connector 715. The upper electrode connector 715 can be formed from a conductive material that provides an electrical path for electrical energy generated and controllably provided to the electrode assembly 700 by one or more other devices coupled to the upper body 708. The upper body 708 itself can also act as a return path for the electrical energy discharged from the electrode 720 and flowing to the ground ring 724 of the electrode assembly 700. Thus, the upper insulator 706 can provide electrical isolation between the upper electrode connector 715 and the upper body 708 itself. The bent housing joint 712 can be constructed so that the angle of orientation of the longitudinal axis 702 of the upper body 708 is offset by an angle 709 relative to the angle of orientation of the longitudinal axis 704 of the lower body 710.

The lower body 710 includes a lower electrode connector 716 coupled to a compression joint 714, which in turn is coupled to the electrode 720 of the electrode assembly 700. The lower electrode connector 716 and the compression joint 714 can provide an electrical path for the electrical energy to travel from the upper electrode connector 715 positioned within the upper body 708 to the electrode 720. The ground ring 724 is electrically coupled to the lower body 710 and can provide a return path for electrical energy discharged from the electrode face 732 of the electrode 720. In some embodiments, electrical energy discharged from the electrode 720 can be used to break up formation material surrounding a borehole in the vicinity of the electrode face 732.

In some embodiments, the ground ring 724 may have a generally ring or torrid shape and encircle a lower portion of the electrode 720. A lower insulator 718 positioned in the lower body 710 can provide electrical isolation between the lower body 710 and the lower electrode connector 716, the compression joint 714, and a portion of the electrode 720 that is not the electrode face 732.

In addition to providing part of the electrical path for the flow of electrical energy provided to the electrode 720, the compression joint 714 may also allow the electrode 720 to move upward, in the direction of an electrode movement 722, when the electrode face 732 is brought into contact with a formation present at the bottom face of a borehole where the pulse power drill string is positioned. The upward movement of the electrode 720 moves the electrode 720 in closer proximity to the ground ring 724, which does not move relative to the lower body 710 when the electrode 720 moves, and thus lessens the space present in an arc gap 730 between the electrode 720 and the ground ring 724. In some embodiments, this lessening of the space present in the arc gap 730 can be a trigger that allows the electrical energy present at the electrode face 732 to "jump" or arc across the arc gap 730 and flow to the ground ring 724, where it can then travel through the lower body 710 and the upper body 708 to the source of the electrical energy.

In some embodiments, tilting or orientating the angle 709 of the electrode face 732 relative to the longitudinal axis 702 can steer the electrode assembly 700 to direct the orientation of the advancement of the borehole going forward. For example, the angle 709 of the electrode face 732 can define a direction of advancement for the borehole being advanced by the operation of the electrode assembly 700 in a direction parallel to the electrode face 732. As such, the general direction of the advancement of the borehole may be "steered" based on the orientation of the electrode face 732 created by the bent housing joint 712.

In addition, overall rotational orientation of the upper body 708 may be changed, that is, the pulse power drill string may be rotated around the longitudinal axis 702 of the upper body 708, and thus re-direct and/or control of the relative orientation of the bent housing joint 712 and thus the orientation of the electrode face 732. This rotational capability allows the control of the angle 709 of radial orientation of the electrode face 732 relative to the longitudinal axis 702, and thus control the direction of the advancement of a borehole in any angular orientation relative to the longitudinal axis 702.

Figure 8:
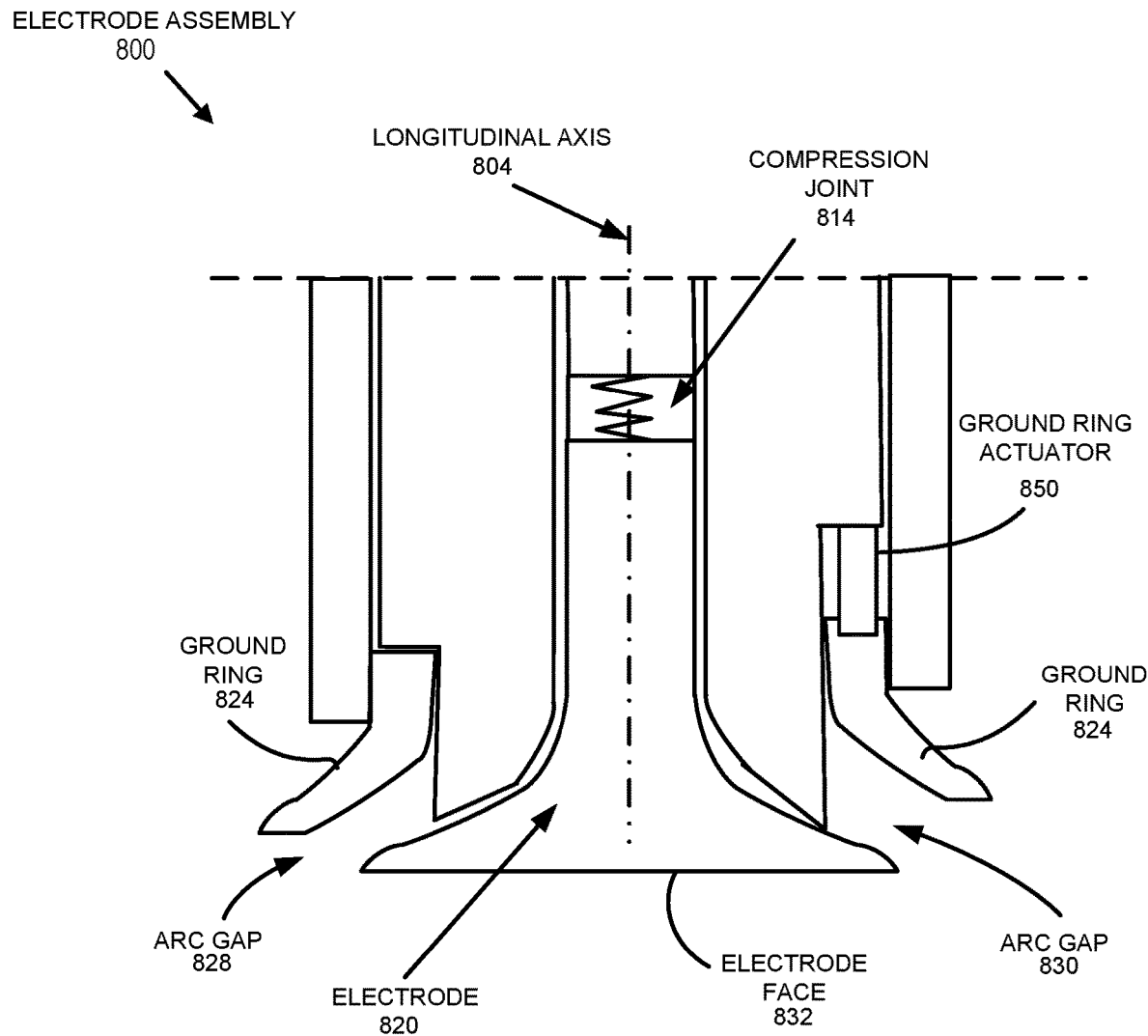
FIG. 8 depicts an example electrode assembly having an adjustable ground ring for pulse power directional drilling, according to some embodiments.

FIG. 8 depicts an example electrode assembly having an adjustable ground ring for pulse power directional drilling, according to some embodiments. In FIG. 8, an electrode assembly 800 includes an electrode 820 (having a compression joint 814 and an electrode face 832), a ground ring 824, and a ground ring actuator 850. The electrode assembly 800 enables controlling of the orientation of the ground ring 824 relative to a longitudinal axis 804 of the electrode assembly 800 using the ground ring actuator 850 in order to provide for steering the electrode assembly 800 in a borehole advancement operation. The ground ring actuator ("actuator") 850 can be coupled to at least some portion of the ground ring 824. In some embodiments, the electrode assembly 800 can include multiple ground ring actuators, where each ground ring actuator is coupled to a respective portion of the ground ring 824.

The actuator 850 may be an electrically powered device, such as a motor, such as a stepper motor or servo motor, or may be a hydraulic or pneumatically actuated device. The actuator 850 can be configured to control raising and/or lowering a portion of the ground ring 824. Alternatively or in addition, the actuator 850 can be configured to tilt a portion of the ground ring 824 relative to the longitudinal axis 804. This can change the relative space between that portion of the ground ring 824 and the electrode 820 relative to an arc gap 830. Because the actuator 850 is positioned on only a portion of the electrode 820, the arc gap on other portions of the electrode 820 can be different. For example, the arc gap 830 can increase while the arc gap 828 increase less or not at all.

By changing the relative spacing between a portion of the ground ring 824 and the electrode face 832, the ability of the electrode 820 to induce a flow of electrical energy in the direction of the manipulated portion of the ground ring 824 may be increased or decreased. For example, if the actuator 850 is used to raise the portion of the ground ring 824 to a position as shown in FIG. 8 that is higher, and thus further away from the electrode face 832, the electrical energy flowing from the electrode face 832 will be more susceptible to flow across the small arc gap present between the electrode face 832 and the non-manipulated (unraised) portion of the ground ring 824. As another example, if the actuator 850 is used to tilt the portion of the ground ring 824 toward the electrode 820, electrical energy flowing from the electrode face 832 will be more susceptible to flow across the smaller arc gap present between the tilted portion of the ground ring 824 and the electrode face 832. Thus, the relative position of the ground ring 824 at different radial positions around the electrode 820 may be used to directionally control the concentration of the electrical energy jumping or arching across to different portions of ground ring 824. This directional control of the electrical energy discharging from the electrode 820 may then steer the direction of the advancement of the borehole as the electrode assembly 800 operates to break up the formation material adjacent to the electrode face 832.

Figure 9:
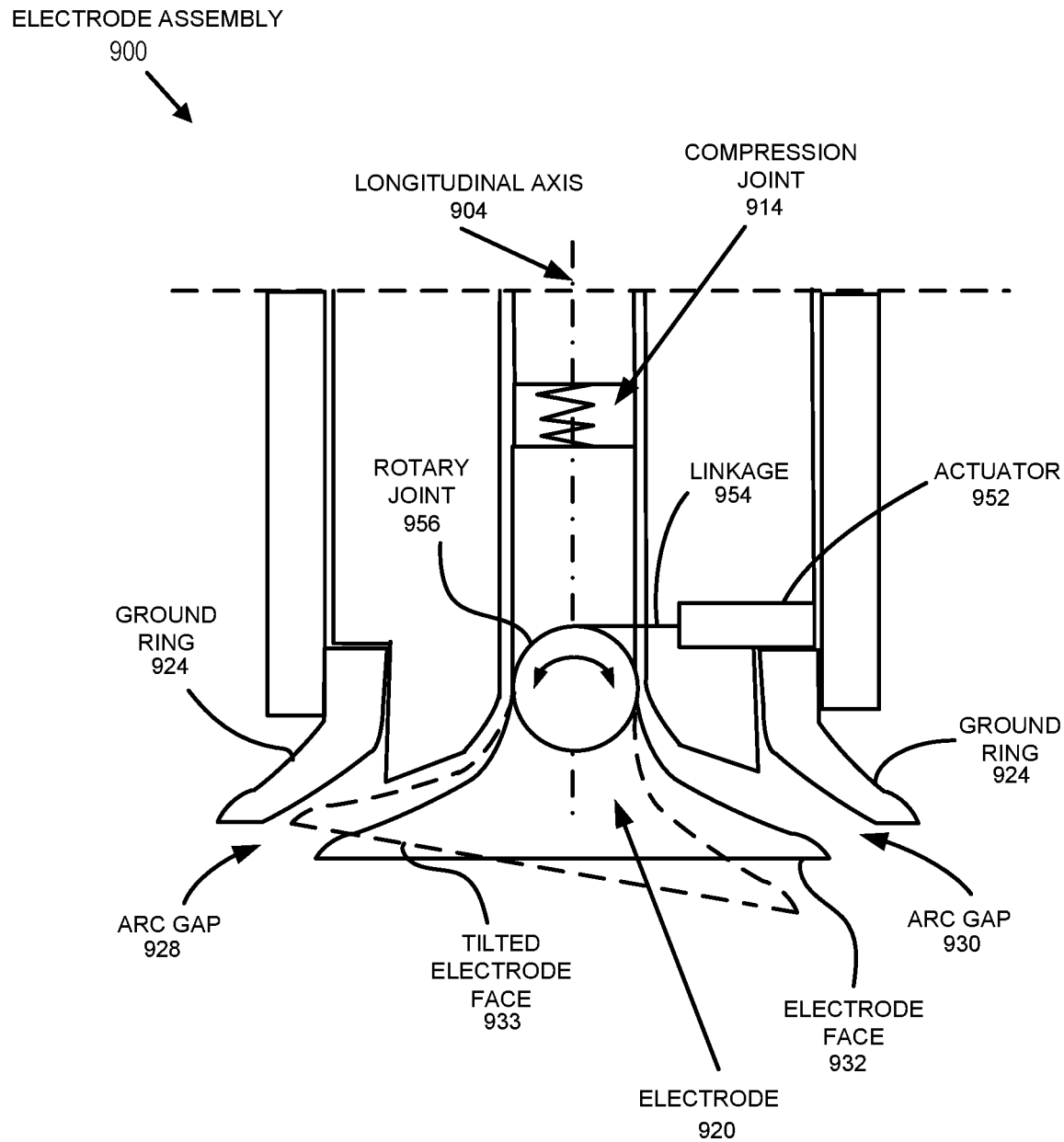
FIG. 9 depicts an example electrode assembly having an electrode face with an adjustable rotational orientation for pulse power directional drilling, according to some embodiments.

FIG. 9 depicts an example electrode assembly having an electrode face with an adjustable rotational orientation for pulse power directional drilling, according to some embodiments. In FIG. 9, an electrode assembly 900 includes an electrode 920 (having a compression joint 914 and an electrode face 932), a ground ring 924, a rotary joint 956, an actuator 952, and a linkage 954. The electrode assembly 900 is configured to control the rotational orientation of the end portion of the electrode 920, and thus the orientation of the electrode face 932 relative to a longitudinal axis 904 of the electrode 920 and the ground ring 924 in order to provide a mechanism for steering the electrode assembly 900 in a borehole advancement operation.

As shown in FIG. 9, the lower portion of the electrode 920 is coupled to the rotary joint 956 configured to allow the lower portion of the electrode 920, and thus the orientation of the electrode face 932, to be "tilted" relative to a longitudinal axis 904. An example of a tilted positioning of the lower portion of the electrode assembly 900 relative to a standard vertical positioning is illustrated by the dashed outline of the lower portion of the electrode assembly 900 in FIG. 9 (see a tilted electrode face 933).

The rotary joint 956 may be coupled to the actuator 952 through the linkage 954. The actuator 952 may be an electrically powered device, such as a motor, such as a stepper motor or servo motor, or may be a hydraulic or pneumatically articulated device. The actuator 952 is configured to control, for example by extending or retracting the linkage 954, the rotational position of the rotary joint 956, and thus control movements that allow for rotational positioning of the bottom portion of the electrode 920.

By controlling the rotational positioning of the rotary joint 956, the angle of the electrode face 932 relative to the longitudinal axis 904, can be controlled. By controlling the relative angle of orientation of the lower portion of the electrode assembly 900, the assembly or pulse power drill string can be "steered" to direct the orientation of the advancement of the borehole. For example, by changing the relative orientation of the electrode face 932, the spacing between some portions of the electrode face 932 may be decreased, and thus provide a shorter distance within the arc gap 928 separating that portion of the electrode face 932 (e.g., tilted upward in FIG. 9 and depicted as the tilted electrode face 933) compared to portions of the electrode face 932 that are tilted downward, and thus moved further away from the ground ring 924 due to the rotational positioning of the lower portion of the electrode 920. Thus, an arc gap 930 is greater than the arc gap 928 in this tilted position.

Embodiments may also be able to rotate the lower portion of the electrode 920 from the centered position to a position tilting the lower portion of the electrode 920 closer to the portion of the ground ring 924 on the right-hand side of FIG. 9. Thus, the rotational positioning of the lower portion of the electrode 920 may be used to directionally control the concentration of the electrical energy jumping or arching across from different portions of electrode face 932 relative to the radial position of the ground ring 924. This directional control of the electrical energy being discharged from the electrode 920 may then steer the direction of the advancement of the borehole as the electrode assembly 900 operates to break up the formation material adjacent to the electrode face 932. In some embodiments, the rotational motion provided by the rotary joint 956 may be limited to rotary motion in a plane intersecting the longitudinal axis 904, and thus providing rotational movement in one directional plane, for example to the right or left of the longitudinal axis 904 in a single plane. In various embodiments, a small amount of rotation of the Assembly, for example up to 90 degrees of rotation of the Assembly around the longitudinal axis 904, may allow for further "steering" of the advancement of the borehole by the electrode assembly 900 in any radial direction around the longitudinal axis 904 using a combination of rotational positioning of the lower portion of the electrode assembly 900 in conjunction with rotational positioning of the Assembly.

Figure 10:
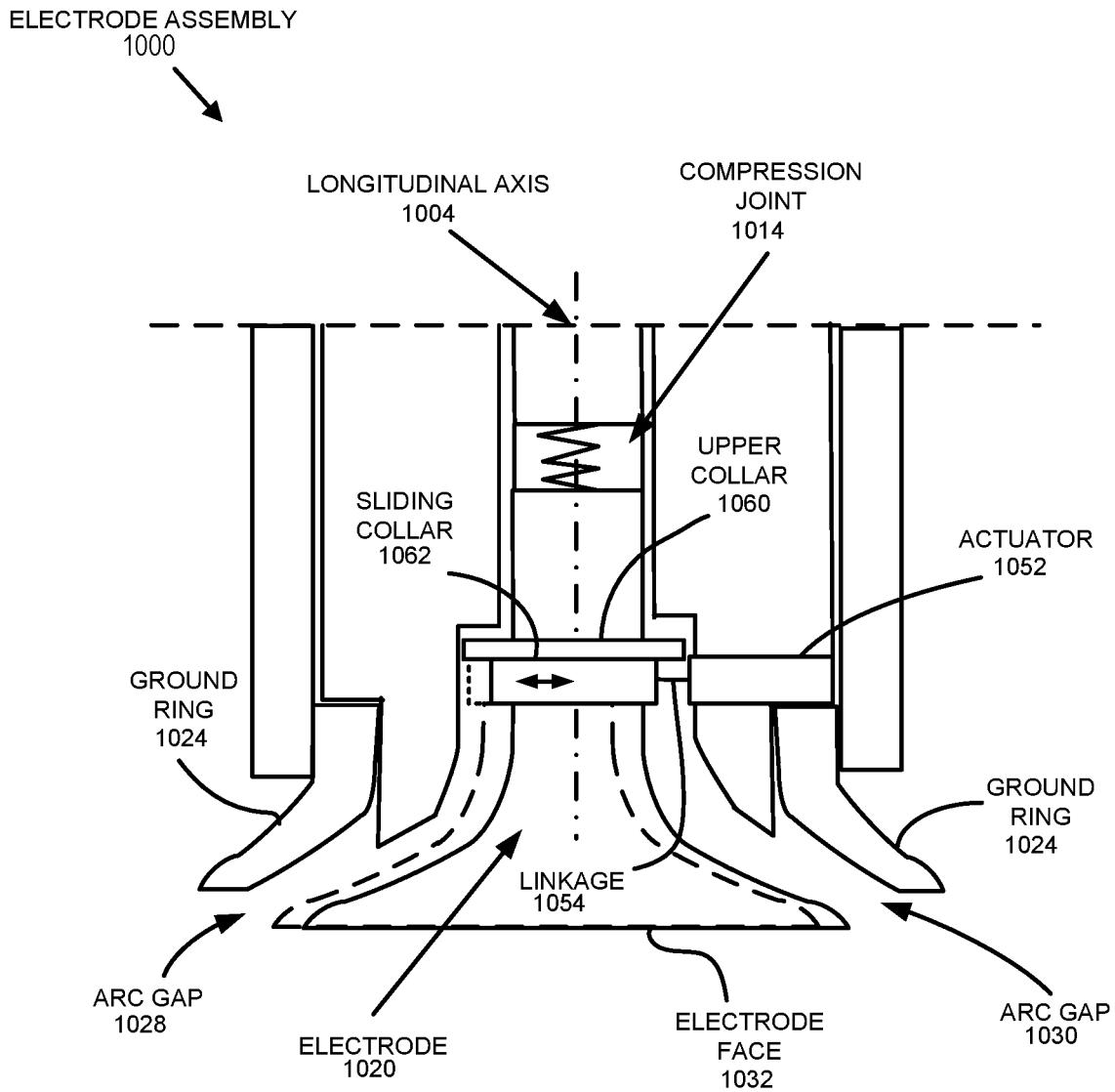
FIG. 10 depicts an example electrode assembly having an electrode face that is laterally adjustable for pulse power directional drilling, according to some embodiments.

FIG. 10 depicts an example electrode assembly having an electrode face that is laterally adjustable for pulse power directional drilling, according to some embodiments. In FIG. 10, an electrode assembly 1000 includes an electrode 1020 (having a compression joint 1014 and an electrode face 1032), a ground ring 1024, an actuator 1052, a sliding collar 1062, an upper collar 1060, and a linkage 1054. The electrode assembly 1000 is configured to control a lateral positioning of a lower portion of the electrode 1020, and thus the lateral positioning of the electrode face 1032 relative to a longitudinal axis 1004 of the electrode assembly 1000 and the ground ring 1024 in order to provide a mechanism for steering the electrode assembly 1000 in a borehole advancement operation.

As shown in FIG. 10, the lower portion of the electrode 1020 is coupled to the sliding collar 1062, where the sliding collar 1062 is coupled to the upper collar 1060 of the electrode 1020. The sliding collar 1062 can be configured to allow the lower portion of the electrode 1020, and thus the relative spacing between opposite sides of the electrode face 1032 and the ground ring 1024, to be varied. An example of a shifted lateral positioning of the lower portion of the electrode 1020 relative to a standard positioning of the electrode 1020 (e.g., the electrode 1020 centered on the longitudinal axis 1004) is illustrated by the dashed outline of the lower portion of the electrode assembly 1000.

As shown by the dashed outline, the lower portion of the electrode 1020 has been "shifted" to the left in FIG. 10 relative the centered position for the electrode assembly 1000, and thus has moved closer to the portion of the ground ring 1024 on the left side of FIG. 10. Embodiments may include also being able to "shift" the lower portion of the electrode 1020 from the centered position to a position placing the lower portion of the electrode 1020 closer to the portion of the ground ring 1024 on the right-hand side of FIG. 10.

As shown in FIG. 10, the sliding collar 1062 may be coupled to the actuator 1052 through the linkage 1054. The actuator 1052 may be an electrically powered device, such as a motor, such as a stepper motor or servo motor, or may be a hydraulic or pneumatically articulated device. The actuator 1052 can be configured to control, for example by extending or retracting the linkage 1054, the lateral position of the sliding collar 1062 relative to the longitudinal axis 1004, and thus control movements that allow for lateral positioning of the lower portion of the electrode 1020. By controlling the lateral positioning of the sliding collar 1062, the lateral positioning of the lower portion of the electrode 1020 with respect to an off-set relative to the longitudinal axis 1004 can be controlled.

By controlling the lateral positioning of the lower portion of the electrode 1020, the Assembly or pulse power drill string may be "steered" to direct the orientation of the advancement of the borehole going forward. For example, by changing the lateral positioning of the lower portion of the electrode 1020, the spacing between some portions of the electrode face 1032 may be brought into closer spacing, and thus provide a shorter distance within arc gaps 1028-1030 separating that portion of the electrode face 1032 from the ground ring 1024 compared to other portions of the electrode face 1032. The discharge of the electrical energy may favor and/or be directed in the direction of the portion of the electrode face 1032 positioned closest to the ground ring 1024. Thus, the lateral positioning of the lower portion of the electrode 1020 may be used to directionally control the concentration of the electrical energy jumping or arching across from different portions of the electrode face 1032 relative to the radial position of the ground ring 1024. This directional control of the electrical energy being discharged from the electrode 1020 may then steer the direction of the advancement of the borehole as the electrode assembly 1000 operates to break up the formation material adjacent to the electrode face 1032. In some embodiments, the lateral motion provided by the sliding collar 1062 may be limited to lateral motion perpendicular to longitudinal axis 1004, for example to the right or left of the longitudinal axis 1004 as shown in FIG. 10.

In various embodiments, a small amount of rotation of the Assembly itself, for example up to 90 degrees of rotation of the Assembly around the longitudinal axis 1004, may allow for further "steering" of the advancement of the borehole by the Assembly in any radial direction around the longitudinal axis 1004 using a combination of lateral positioning of the lower portion of the electrode 1020 in conjunction with rotational positioning of the Assembly.

Figure 11:
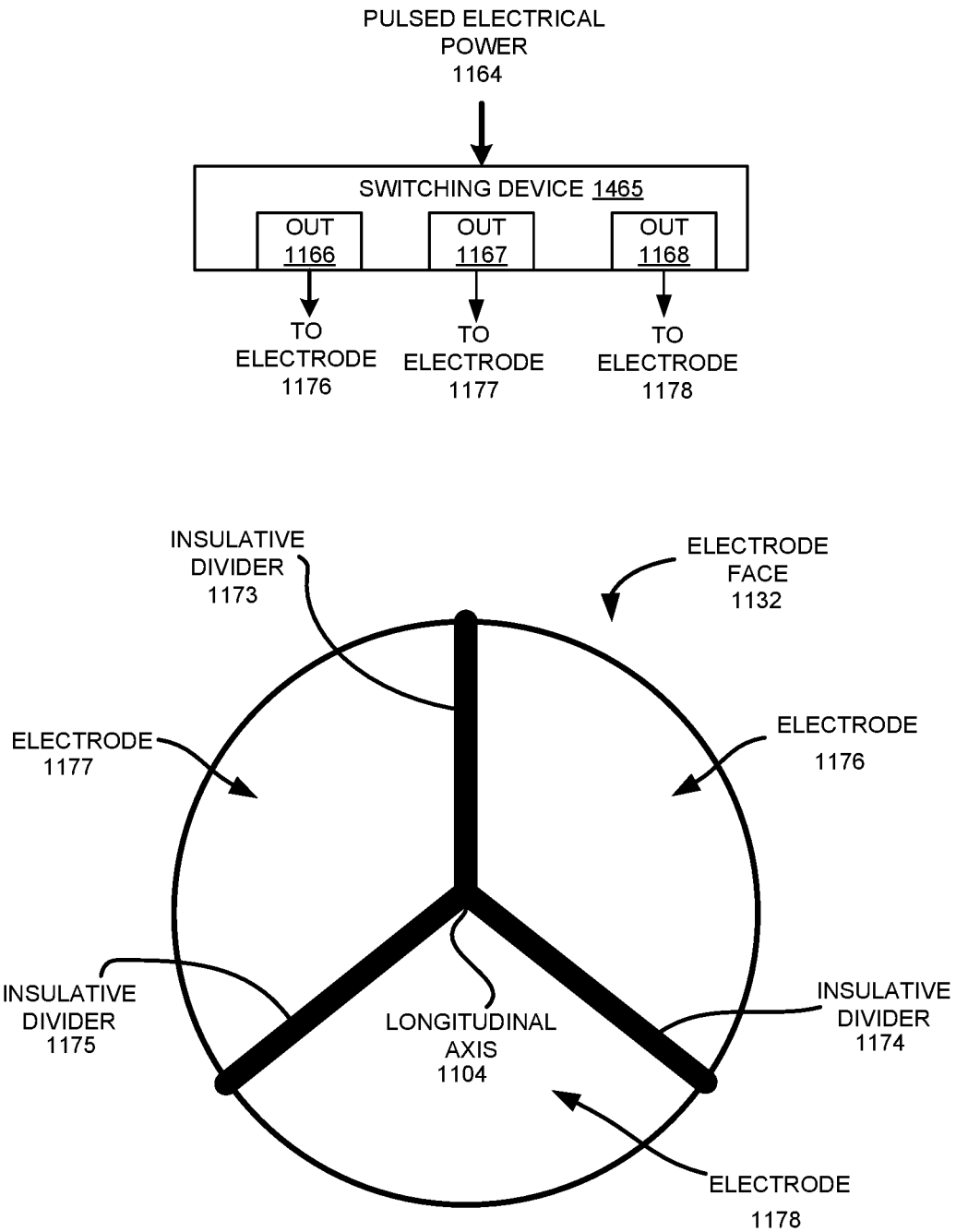
FIG. 11 depicts an example electrode assembly with multiple electrodes for adjustable power emission for pulse power directional drilling, according to some embodiments.

FIG. 11 depicts an example electrode assembly with multiple electrodes for adjustable power emission for pulse power directional drilling, according to some embodiments. As shown in FIG. 11, an electrode face 1132 is positioned along a longitudinal axis 1104 that can represent the longitudinal axis of the Assembly or pulse power drill string. The electrode face 1132 includes an electrode 1176, an electrode 1177, and an electrode 1178. Each of the electrodes 1176-1178 are electrically isolated from one another by respective insulative dividers providing electrical isolation between the individual electrodes. An insulative divider 1173 is positioned between the electrode 1176 and the electrode 1177. An insulative divider 1174 is positioned between the electrode 1176 and the electrode 1178. An insulative divider 1175 is positioned between the electrode 1177 and the electrode 1178.

The application of electrical energy to the electrodes 1176-1178 may be controlled individually or in some combination to provide and control the discharge of the electrical energy used to break up formation material in proximity to the electrode face 1132. For example, as illustrated in FIG. 11, a switching device 1165, which may include solid-state switches, may receive pulsed electrical power 1164 at an input, and be controllably operated to selectively switch ON and OFF outputs OUT 1166, OUT 1167, and OUT 1168 in order to selectively apply the pulsed electrical power 1164 to individual electrodes or to some combination of the electrodes in a predefined pattern. In this example, the OUT 1166 is coupled to the electrode 1176, the OUT 1167 is coupled to the electrode 1177, and the OUT 1168 is coupled to the electrode 1178.

In some embodiments, the pulsed electrical power 1164 can be output to any combination of the electrodes 1176-1178. In some embodiments, the pulsed electrical power 1164 can output to a subset of the electrodes 1176-1178, wherein a subset is defined as at least one but not all of the electrodes 1176-1178. For example, the switching device 1165 can output the pulsed electrical power 1164 to the electrode 1176 and not to the electrodes 1177-1178. In another example, the switching device 1165 can output the pulsed electrical power 1164 to the electrode 1176 and the electrode 1178 and not to the electrode 1177. In some embodiments, the switching device 1165 can be configured to output the pulsed electrical power to a plurality of the electrodes 1176-1178 but at varying levels. For example, the switching device 1165 can output 10% of the pulsed electrical power 1164 to the electrode 1176, output 70% of the pulsed electrical power 1164 to the electrode 1177, and output 20% of the pulsed electrical power 1164 to the electrode 1178. Thus, the switching device 1165 can control which electrodes are to receive the pulsed electrical power 1164 and can control the amount of the pulsed electrical power 1164 that each electrode is to receive.

In various embodiments, the number of electrodes present may be a number of electrodes other than three electrodes, such as only two electrodes or more than three individual electrodes. Further, while the surface area and shape of the first, second and third electrodes as shown in FIG. 11 are illustrated as being the same, embodiments of the multi-electrode electrode face may include having either one or more electrodes that are have different effective attributes (such as shape and/or size relative to one another). In some embodiments, the effective attributes of one or more of the electrodes can change dynamically during downhole operations. For example, the electrode assembly can be moved (tilted, shifted laterally or longitudinally, etc.) to alter the effective size and/or shape of an electrode. In another example, some type of (conductive or nonconductive) component can be moved relative to the face of the electrode to alter the level of current emitted into the formation. For instance, a nonconductive component can be moved to at least partially cover the face of the electrode, thereby effectively alter the size and/or shape of the electrode. By controlling the pattern of the electrical energy provided to the electrodes 1176-1178 individually or in some combination and/or in a particular pattern of application, the area of the formation material being broken up adjacent to the electrodes may be controlled, and thereby in turn controlling the overall direction of the borehole being advanced by the pulse power operation. Additionally, as described, example embodiments can use a same power source to provide selective power to different electrodes. In other words, a separate power source is not required to selectively power an electrode or subset of electrodes.

In some implementations, each of the electrodes 1176-1178 can be independently movable relative to each other. For example, each of the electrodes 1176-1178 can be movable to different positions relative to each other longitudinally, laterally, tilted, etc. Such implementations can be used for directional drilling. For instance, if the intended direction of the drilling of the borehole is closest to the electrode 1177, the electrode 1177 can longitudinally be positioned further down in the borehole as compared to the electrodes 1176 and 1178.

Figure 12:
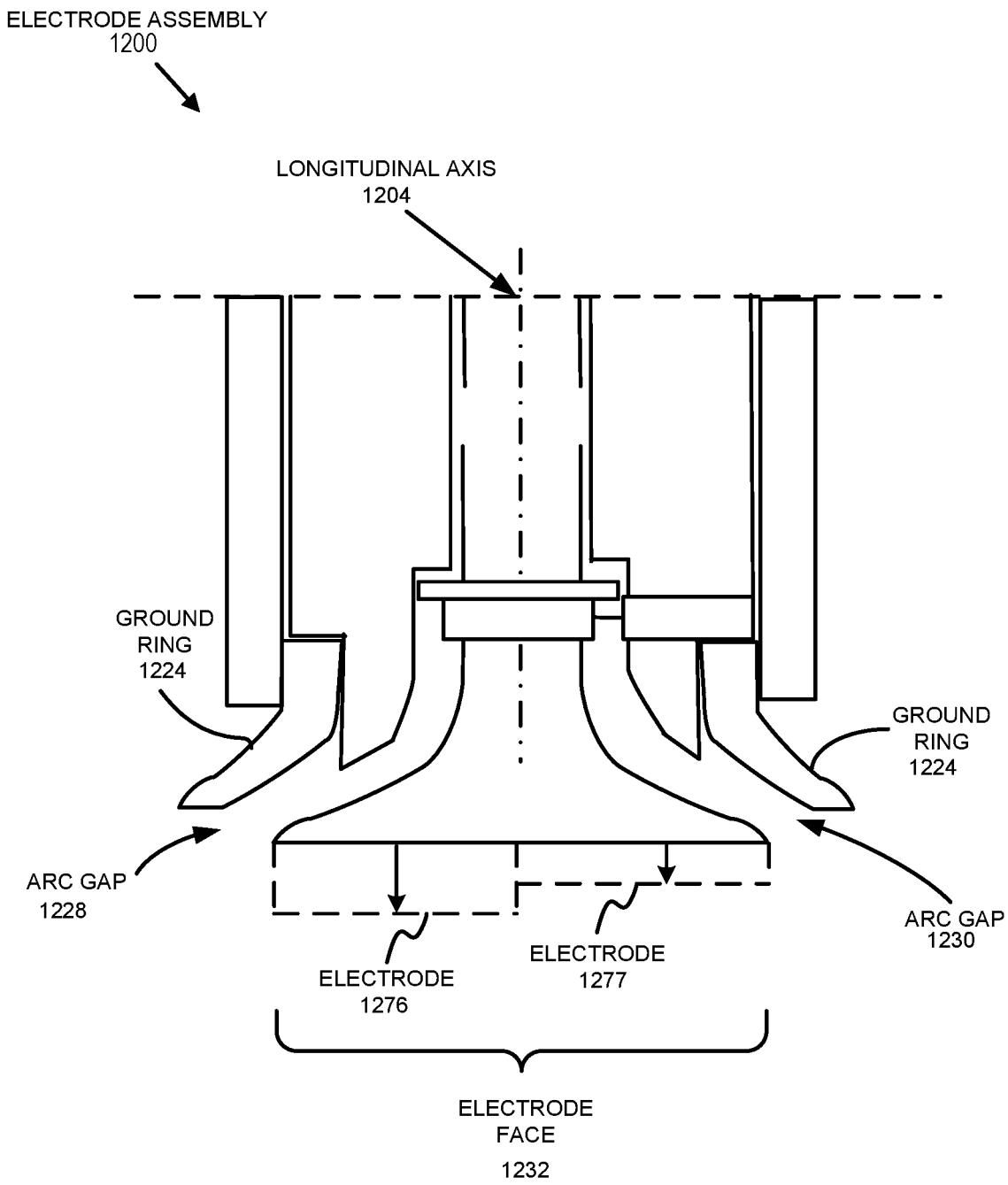
FIG. 12 depicts an example electrode assembly with multiple electrodes that are independently movable for pulse power directional drilling, according to some embodiments.

To help illustrate, FIG. 12 depicts an example electrode assembly with multiple electrodes that are independently movable for pulse power directional drilling, according to some embodiments. In this example, FIG. 12 depicts an electrode assembly wherein each of the multiple electrodes independently move longitudinally. However, in some implementations, such independent movement can be one or more of longitudinal, lateral, tilt or any other type of movement to assist in the directional drilling. In FIG. 12, an electrode assembly 1200 includes an electrode face 1232 that is positioned along a longitudinal axis 1204 that can represent the longitudinal axis of the Assembly or pulse power drill string. In this example, the electrode face 1232 includes an electrode 1276 and an electrode 1277. Not shown, the electrode face 1232 may include additional electrodes. For example, the electrode face 1232 may be configured similar to the electrode face 1132 of FIG. 11—which insulative dividers positioned between the electrodes. The electrode assembly 1200 also includes a ground ring 1224.

As shown by the dashed outlines of the lower portion of the electrode assembly 1200, the electrode assembly 1200 is configured to control a longitudinal movement of individuals electrodes (independent of each other). Such independent movement of the individual electrodes may provide an additional mechanism for steering the electrode assembly 1200 in a borehole advancement operation. The dashed outlines of the electrode 1276 and the electrode 1277 illustrate example longitudinal movements of the electrode 1276 and the electrode 1277, respectively. In this example, the longitudinal movement of the electrode 1276 is greater than the longitudinal movement of the electrode 1277 such that the electrode 1276 is positioned further down the borehole as compared to the electrode 1277.

The independent movement of the individual electrodes may be performed by one or more actuators coupled to the electrodes. For example, the actuators may be an electrically powered device, such as a motor, such as a stepper motor or servo motor, or may be a hydraulic or pneumatically articulated device. The actuators may be configured to extend or retract each electrode independently of each other, relative to the electrode face 1232. By controlling the positioning of each electrode independently, the Assembly or pulse power drill string may be "steered" to direct the orientation of the advancement of the borehole going forward. For example, extending the electrode 1276 further relative to the other electrodes may steer the direction of the borehole in the direction of the electrode 1276.

In some implementations, the electrode face 1232 can be similar to the electrode face 1132 of FIG. 11. A wedge with a central mandrel can be positioned in the center of the electrode face 1232. The wedge can be configured to cause movement or deviation of one or more of the electrodes independent of the other electrodes. In some other implementations, there can be multiple wedges, wherein each wedge includes a central mandrel. Each wedge/central mandrel can be independently movable relative to the other wedges/central mandrels. Each wedge/central mandrel can be associated with one electrode. Movement of the wedge/central mandrel can cause lateral movement of the associated electrode (independent of the other electrodes).

In various embodiments, a small amount of rotation of the Assembly itself, for example up to 90 degrees of rotation of the Assembly around the longitudinal axis 1004, may allow for further "steering" of the advancement of the borehole by the Assembly in any radial direction around the longitudinal axis 1204 using a combination of independent positioning of each of the electrodes in conjunction with rotational positioning of the Assembly.

Figure 13:
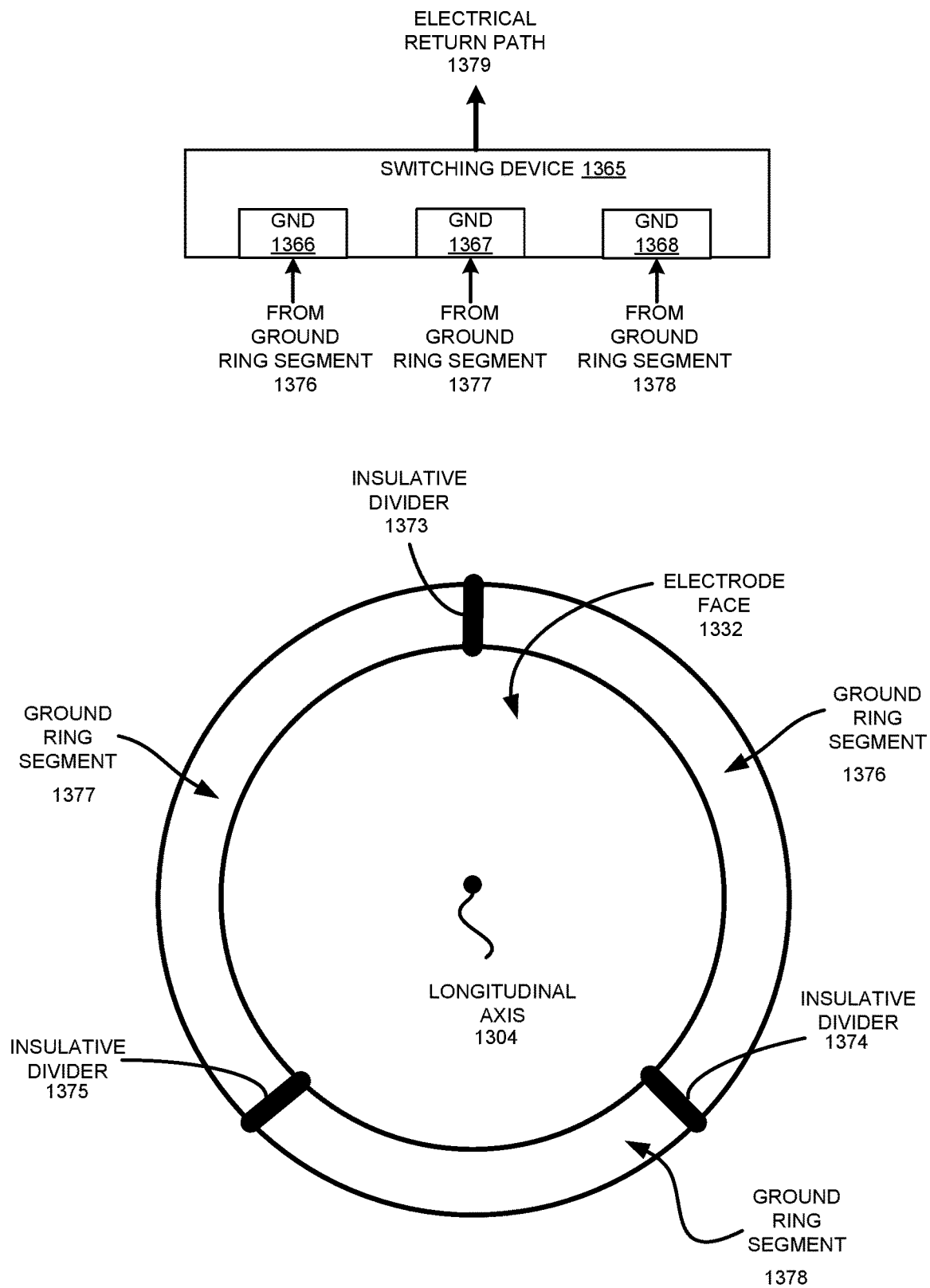
FIG. 13 depicts an example electrode assembly having a ground ring divided into multiple segments that are configurable for providing an electrical return path for pulse power directional drilling, according to some embodiments.

FIG. 13 depicts an example electrode assembly having a ground ring divided into multiple segments that are configurable for providing an electrical return path for pulse power directional drilling, according to some embodiments. As shown in FIG. 13, a ground ring surrounds an electrode face 1332 that is positioned along a longitudinal axis 1304 that can represent the longitudinal axis of the assembly or pulse power drill string. The ground ring includes multiple segments (a ground ring segment 1376, a ground ring segment 1377, and a ground ring segment 1378). Each of the ground ring segments 1376-1378 is electrically isolated from one another by respective insulative dividers providing electrical isolation between the individual ground ring segments. An insulative divider 1373 is positioned between the ground ring segment 1376 and the ground ring segment 1377. An insulative divider 1374 is positioned between the ground ring segment 1376 and the ground ring segment 1378. An insulative divider 1375 is positioned between the ground ring segment 1377 and the ground ring segment 1378.

The multiple segments of the ground ring may be individually coupled and disconnected so that these individual portions either provide or do not provide an electrical return path for the electrical energy being discharged from the electrode(s) of the electrode assembly. In a similar manner to that described above with respect to the to the multiple electrodes of FIG. 11, the individually controllable segments of the ground ring may be switched into and out of the electrical return path being provided for return of the electrical energy being discharged from the electrode back to the electrical source of the pulsed electrical energy for the Assembly.

For example, as illustrated in FIG. 13, a switching device 1365, which may include solid-state switches, may be controllable to selectively couple and to disconnect the grounds GND 1366, GND 1367, and GND 1368 to an electrical return path 1379 provided to complete the electrical circuit for the electrical energy being discharged by the electrode(s) in order to selectively control and direct the pulsed electrical power being discharged from the individual electrodes or to some combination of the electrodes in a predefined pattern. In this example, the GND 1366 is coupled to the ground ring segment 1376, the GND 1367 is coupled to the ground ring segment 1377, and the GND 1368 is coupled to the ground ring segment 1378.

In some embodiments, the switching device 1365 can control which ground ring segments 1376-1378 are configured to provide a return path for the electrical energy discharged by the electrode(s). The switching device 1365 can configure any combination of the ground ring segments 1376-1378 for providing a return path for the electrical energy. In one example, the switching device 1365 can enable a return path for the electrical energy through the ground ring segment 1376 but not through the ground ring segments 1377-1378. In another example, the switching device 1365 can enable a return path for the electrical energy through the ground ring segment 1376 and the ground ring segment 1377 but not through the ground ring segment 1378.

By controlling the switching of these individual segments of the ground ring, the general direction of the electrical energy being discharged from the electrode across the arc gap may be controlled, and thus the area where the formation material is being broken up and also the general direction of the advancement of the borehole may be steered.

In some embodiments, adjustable stabilizers can be used for creating directional bias of the drilling. In particular, the diameter of the stabilizer on the drill string can be changed in order to change the force balance on a portion of the drill string (lower portion), which can directly affect the directional tendency of the drill bit. Such embodiments can be effective in making inclination changes as it is gravitational force that can pull the drill string toward the low side of the borehole until a stabilization point makes contact with the bottom of the borehole. These adjustable stabilizers can also be used for azimuthal corrections where drill bits are interfacing boundaries between hard and soft formations. The unbalance of lateral forces created by the differing formation strengths can be enhanced or offset with the introduction of a stabilization change to adjust the force balance of the drill string.

Figure 14:
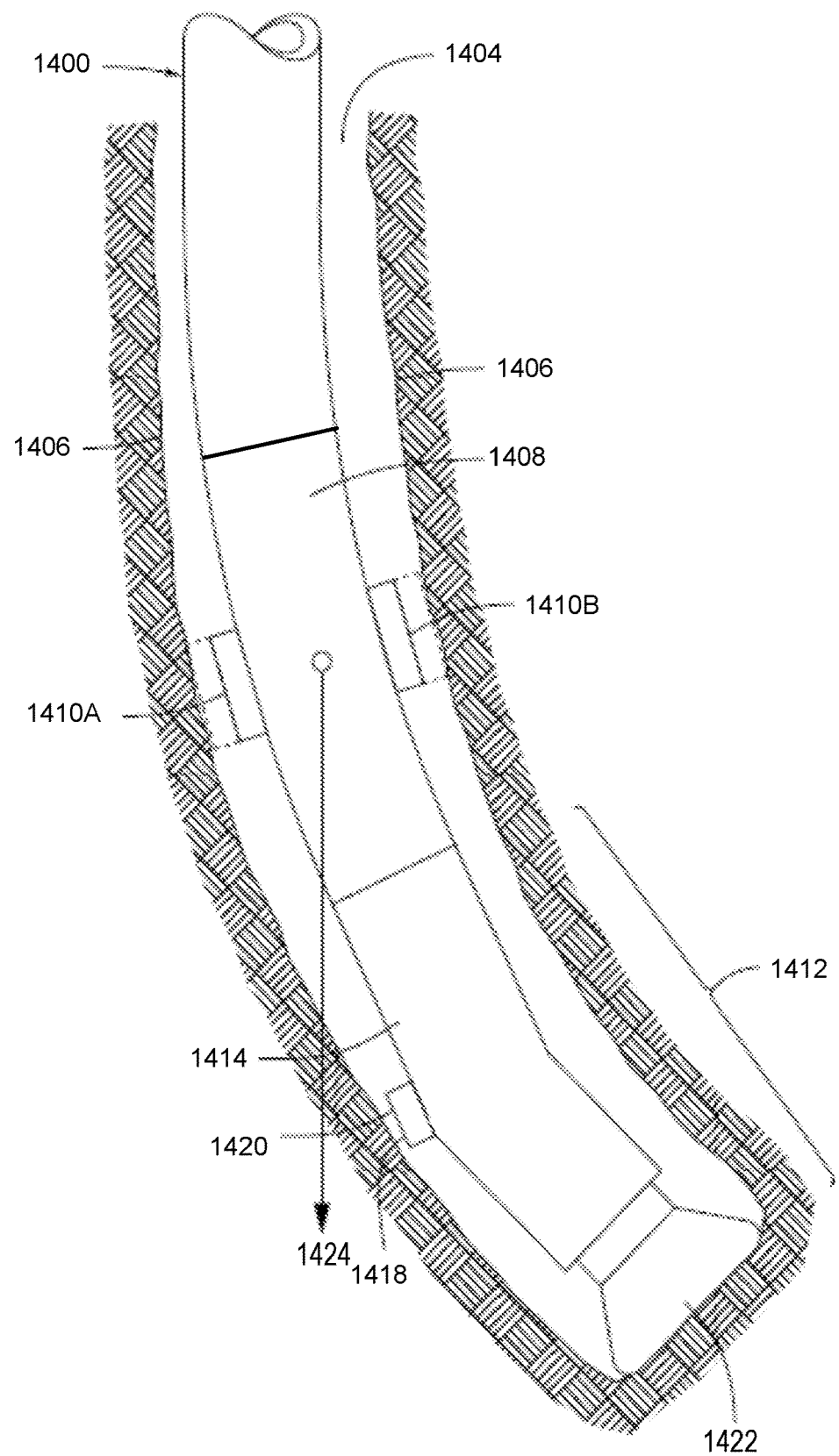
FIG. 14 depicts an example pulse power drill string with fixed and adjustable stabilizers and a bent housing for pulse power directional drilling, according to some embodiments.
Figure 15:
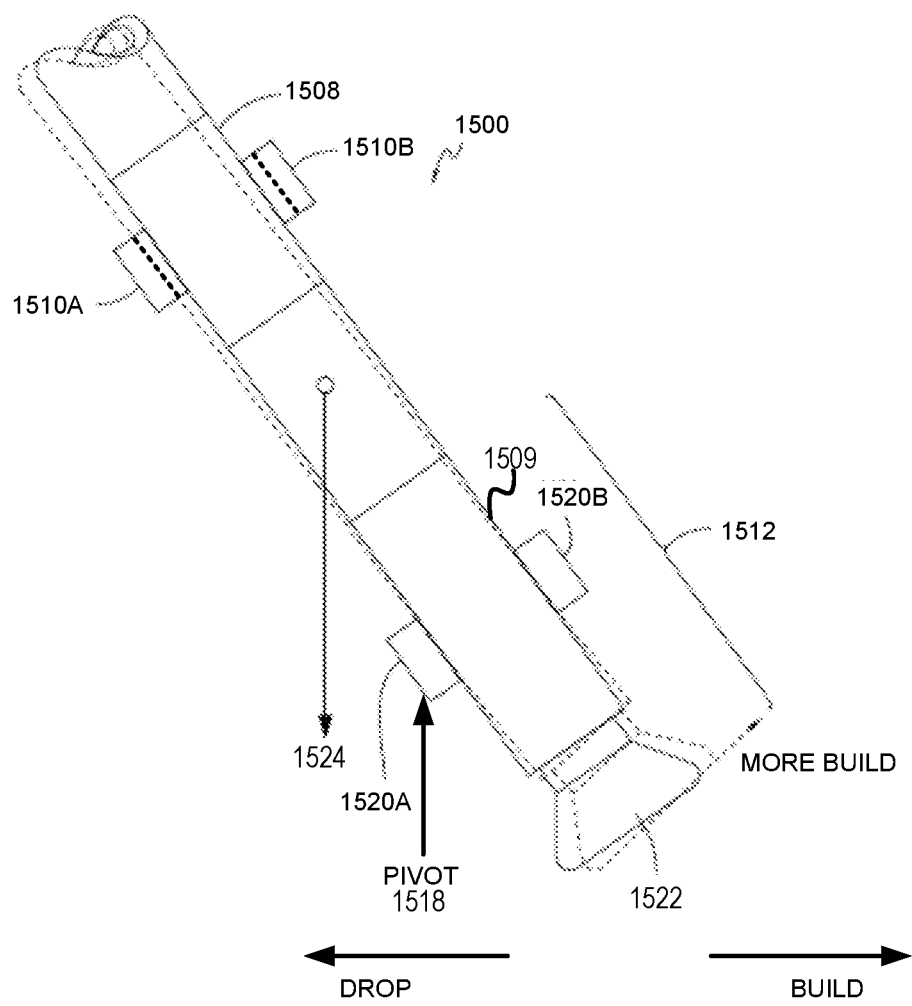
FIG. 15 depicts an example pulse power drill string in a fulcrum configuration with fixed and adjustable stabilizers for pulse power directional drilling, according to some embodiments.
Figure 16:
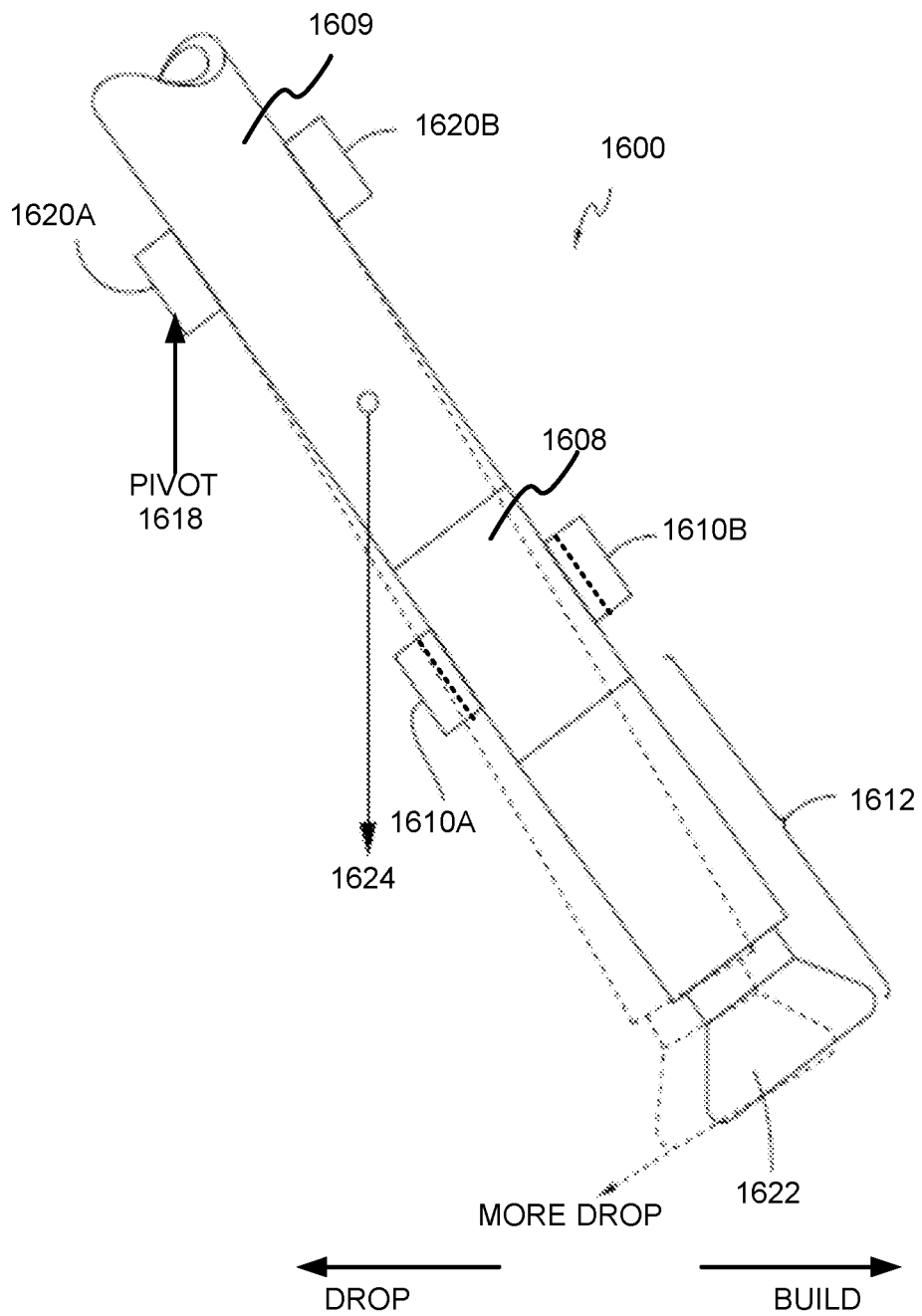
FIG. 16 depicts an example pulse power drill string in a pendulum configuration with fixed and adjustable stabilizers for pulse power directional drilling, according to some embodiments.

In some implementations, fixed and adjustable stabilizers and optionally a bent housing can be incorporated into the pulse power drill string for directional drilling. FIGS. 14-16 depicts three such examples.

FIG. 14 depicts an example pulse power drill string with fixed and adjustable stabilizers and a bent housing for pulse power directional drilling, according to some embodiments. FIG. 14 depicts a pulse power drill string 1400 positioned in a wellbore 1404 (that includes a wellbore wall 1406). The pulse power drill string 1400 includes an adjustable stabilizer assembly 1408 positioned above a pulse power assembly 1412. In this example, the adjustable stabilizer assembly 1408 includes one or more adjustable stabilizer blades. For this example, two stabilizer blades (1410A-B) are depicted. During downhole operations, one or both of the adjustable stabilizer blades 1410A-B can move from a closed position to an expanded position (outward to the wellbore wall 1406). This is further illustrated in FIG. 14 by the solid outline versus the dashed outline of the stabilizer blades. As shown by the solid line, there will be more build when the adjustable stabilizer blades 1410A-B are in a closed position. Conversely, there will be less build when the adjustable stabilizer blades 1410A-B are in an expanded position as shown by the dotted line.

The pulse power assembly 1412 includes a bent housing 1414 and an electrode assembly 1422 positioned below the bent housing 1414. As shown, the bent housing 1414 is bent to cause the pulse power drill string 1400 to directionally drill the wellbore 1404 to the right. A fixed kick pad 1420 is positioned just above the outward bend of the bent housing 1414. While FIG. 14 depicts the fixed kick pad 1420 just above the outward bend of the bent housing 1414, the fixed kick pad 1420 could be positioned at any point along the outward bend (e.g., below the outward bend, on the outward bend, further above its depicted position, etc.). As shown, the fixed kick pad 1420 can be a pivot point 1418 for the pulse power directional drilling in this example. Also, a gravity force 1424 is the downward force being applied to the pulse power drill string 1400 by the Earth.

FIG. 15 depicts an example pulse power drill string in a fulcrum configuration with fixed and adjustable stabilizers for pulse power directional drilling, according to some embodiments. FIG. 15 depicts a pulse power drill string 1500 in a fulcrum configuration. The pulse power drill string 1500 includes an adjustable stabilizer assembly 1508 positioned above a pulse power assembly 1512. The adjustable stabilizer assembly 1508 may include one or more stabilizer blades. In this example, the adjustable stabilizer assembly 1508 includes two adjustable stabilizer blades (1510A-B).

The pulse power assembly 1512 includes a fixed stabilizer assembly 1509 and an electrode assembly 1522 positioned below the fixed stabilizer assembly 1509. The fixed stabilizer may include one or more fixed stabilizer blades. In this example, two fixed stabilizer blades 1520A-B are positioned on the fixed stabilizer assembly 1509. In this fulcrum configuration, the fixed stabilizer blade 1520A serves as a pivot 1518 for the pulse power directional drilling. Also, a gravity force 1524 is the downward force being applied to the pulse power drill string 1500 by the Earth.

During downhole operations, one or both of the adjustable stabilizer blades 1510A-B can move from a closed position to an expanded position (outward to a wall of the wellbore). There will be more build when the adjustable stabilizer blades 1510A-B are in a closed position. Conversely, there will be less build (possibly drop) when the adjustable stabilizer blades 1510A-B are in an expanded position. This is further illustrated in FIG. 15 by the solid outline versus the dashed outline of the pulse power drill string 1500. As shown by the solid outline of the pulse power drill string 1500, if the adjustable stabilizer blades 1510A-1510B are in an expanded position, there is less build (less rate of directional change). Conversely as shown by the dashed outline, if the adjustable stabilizer blades 1510A-1510B are in a closed position, there is more build (increased rate of directional change).

FIG. 16 depicts an example pulse power drill string in a pendulum configuration with fixed and adjustable stabilizer blades for pulse power directional drilling, according to some embodiments. FIG. 16 depicts a pulse power drill string 1600 in a pendulum configuration. The pulse power drill string 1600 includes a fixed stabilizer assembly 1609 positioned above an adjustable stabilizer assembly 1608 that is positioned above a pulse power assembly 1612. The pulse power assembly 1612 includes an electrode assembly 1622. The fixed stabilizer assembly 1609 may include one or more stabilizer blades. In this example, the fixed stabilizer assembly 1609 includes two adjustable stabilizer blades (1620A-B). The adjustable stabilizer assembly 1608 may include one or more adjustable stabilizer blades. In this example, the adjustable stabilizer assembly 1608 includes two adjustable stabilizer blades (1610A-B).

In this pendulum configuration, the fixed stabilize blade 1620A serves as a pivot 1618 for the pulse power directional drilling. Also, a gravity force 1624 is the downward force being applied to the pulse power drill string 1600 by the Earth.

During downhole operations, one or both of the adjustable stabilizer blades 1610A-B can move from a closed position to an expanded position (outward to a wall of the wellbore). There will be less drop when the adjustable stabilizer blades 1610A-B are in an expanded position. Conversely, there will be more drop when the adjustable stabilizer blades 1610A-B are in a closed position. This is further illustrated in FIG. 16 by the solid outline versus the dashed outline of the pulse power drill string 1600. As shown by the solid outline of the pulse power drill string 1600, if the adjustable stabilizer blades 1610A-1610B are in an expanded position, there is less drop. Conversely as shown by the dashed outline, if the adjustable stabilizer blades 1610A-1610B are in a closed position, there is more drop.

In some embodiments, two or more of these different directional drilling configurations described above can be combined. For example, the bent housing of FIG. 7 can be combined with the selective use of electrodes of FIG. 11. Such a combination would allow for a modified curvature of the directional change provided by the bent housing. For example, selective use of an electrode where the bent housing is angling away from the longitudinal axis of the borehole could increase the curvature of that angling to allow for a quicker directional change. In another example, selective use of an electrode opposite of where the bent housing is angling way could decrease the curvature of that angling to allow for a more gradual directional change. Any combination of the adjustable stabilizer and bent housing configuration shown in FIGS. 14-16 can be combined with any of the configurations of FIGS. 7-13.

Example Operations

Figure 17:
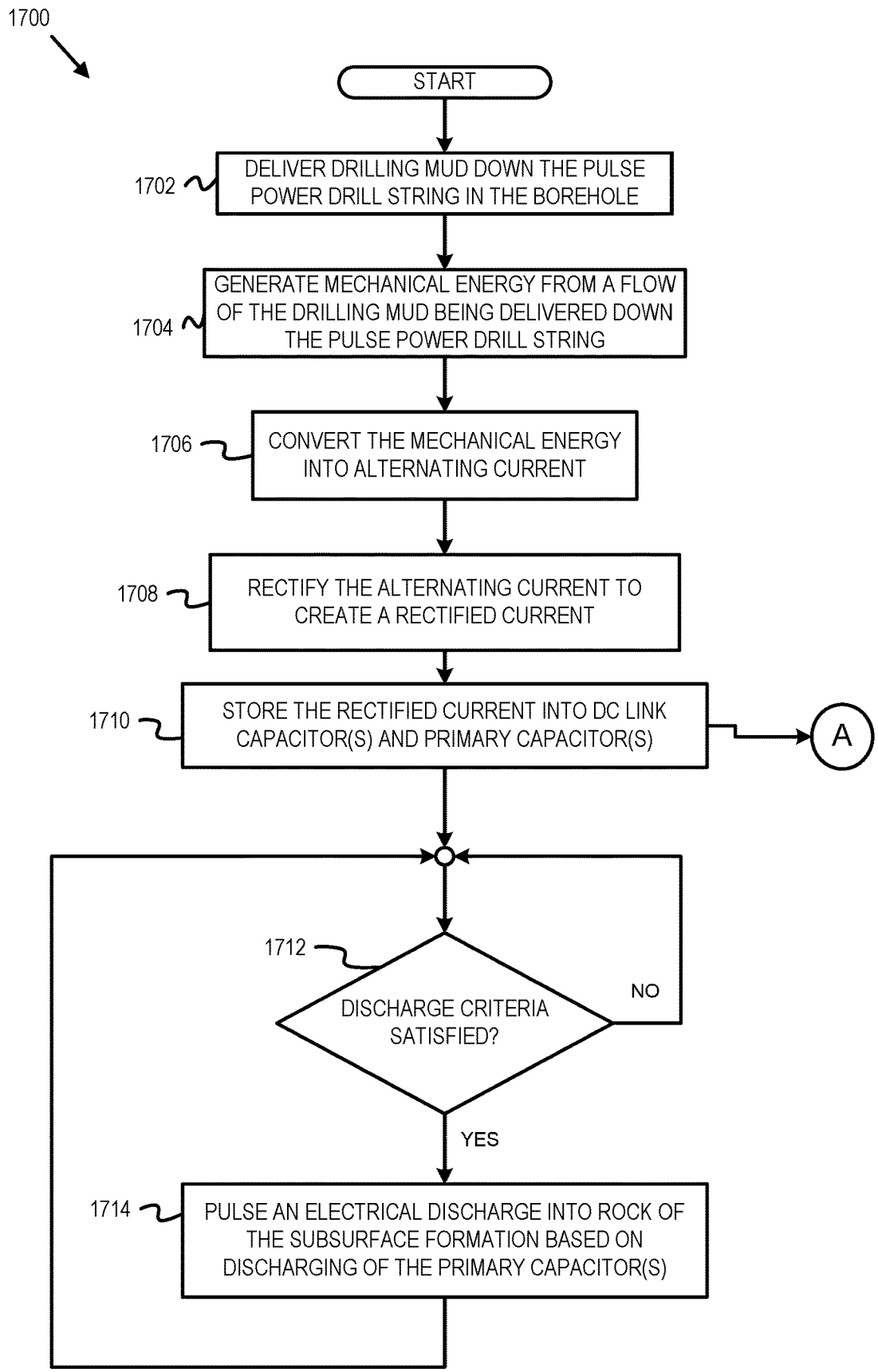
FIGS. 17-18 depict flowcharts of example operations for pulse power drilling, according to some embodiments.
Figure 18:
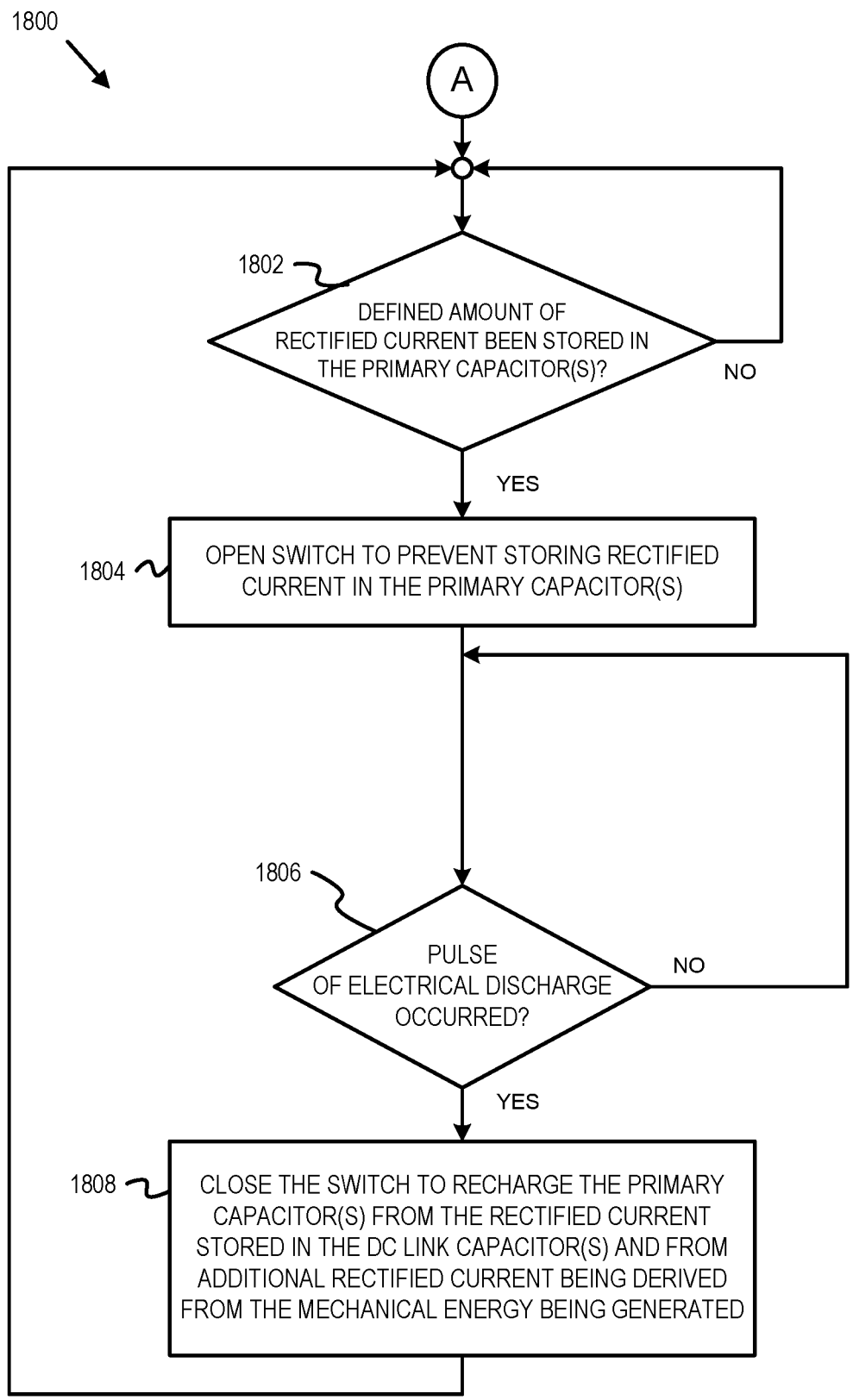
Figure 19:
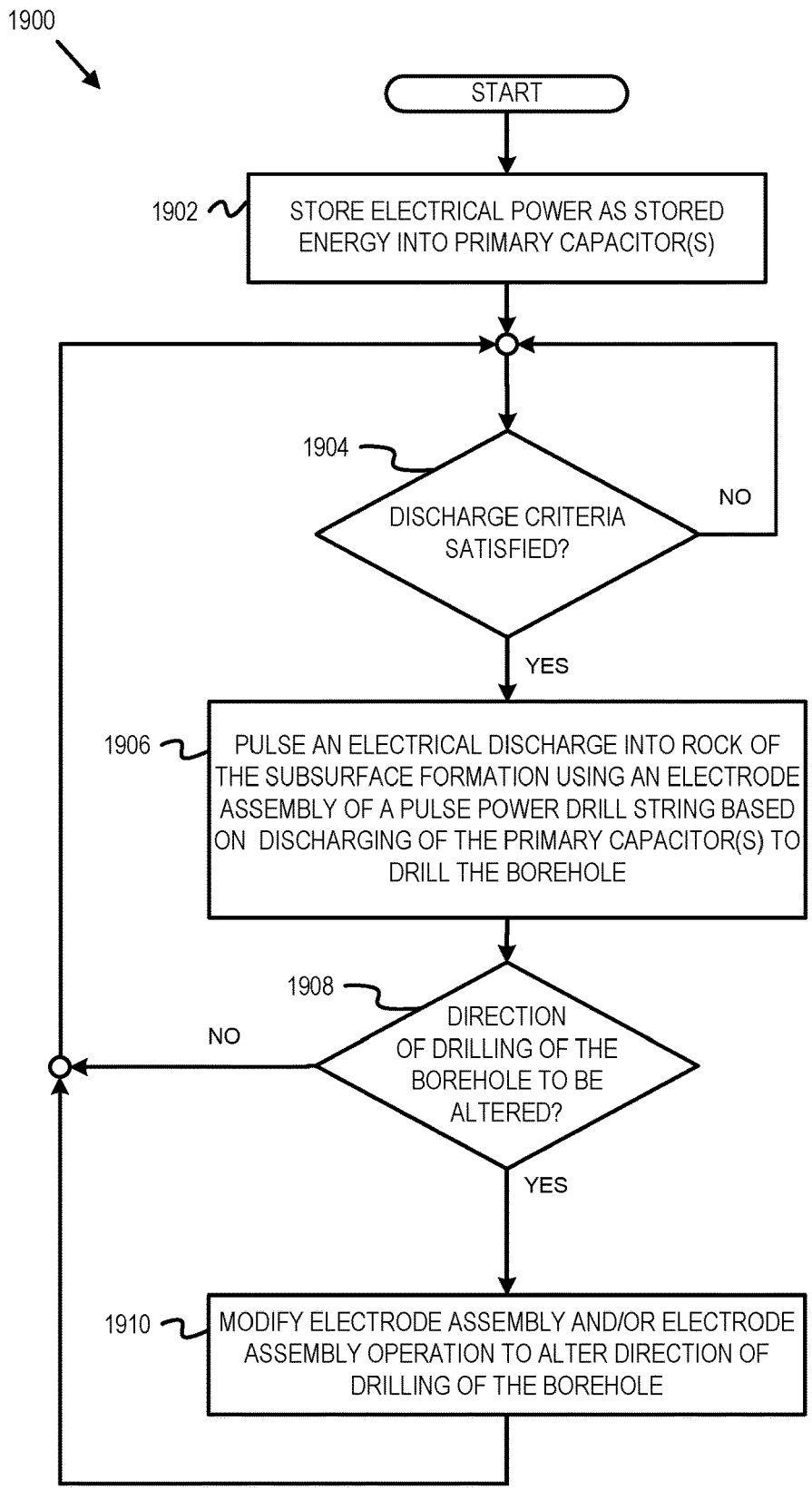
FIG. 19 depicts a flowchart of example operations for directional pulse power drilling, according to some embodiments.

Example operations for pulse power drilling are now described in reference to FIGS. 17-19. FIGS. 17-18 depict example operations for pulse power drilling based on power generated from a fluid flowing in the borehole (e.g., drilling mud). FIG. 19 depicts example operations for directional drilling for pulse power operations.

FIGS. 17-18 depict flowcharts of example operations for pulse power drilling, according to some embodiments. Operations of flowcharts 1700-1800 of FIGS. 17-18 continue between each other through transition point A. Operations of the flowcharts 1700-1800 can be performed by software, firmware, hardware, or a combination thereof. Operations of the flowcharts 1700-1800 are described in reference to the example drilling apparatus 100 of FIG. 1. However, other systems and components can be used to perform the operations now described. The operations of the flowchart 1700 start at block 1702.

At block 1702, drilling mud is delivered down the pulse power drill string in the borehole. For example, with reference to FIG. 1, the drilling mud can be delivered from the drilling platform 160 at the surface and down the drill pipe 102 positioned in the borehole 106. A pump at the drilling platform 160 can be used to deliver the drilling mud.

At block 1704, mechanical energy is generated from a flow of the drilling mud being delivered down the pulse power drill string in the borehole. For example, with reference to FIG. 1, the flow of the drilling mud through the downhole motor 116 can cause the downhole motor 116 to be mechanically rotated, thereby generating mechanical energy.

At block 1706, the mechanical energy is converted into an alternating current. For example, with reference to FIG. 1, the alternator 118 can convert the mechanical energy being generated by the downhole motor 116 into an alternating current.

At block 1708, the alternating current is rectified to create a rectified current. In some embodiments, the rectified current can be considered direct current, which may or may not include different conditioning (as described above). Alternatively, the rectified current can be a current based on different types of rectification (such as half-wave and full-wave). For example, with reference to FIG. 1, the rectifier 120 can convert the alternating current being output by the alternator 118 into a rectified current.

At block 1710, the rectified current is stored into a DC link capacitor and a primary capacitor. For example, with reference to FIG. 1, the DC link capacitor can include one or more DC link capacitors in the generator 152 (e.g., DC link capacitors in the DC link 124). The primary capacitor can include the primary capacitor(s) 136. A more detailed example electrical configuration is depicted in FIG. 4 (described above). From block 1710, operations continue at block 1712 and transition point A, which continues at transition point A of the flowchart 1700.

At block 1712, a determination is made of whether a discharge criteria is satisfied. For example, with reference to FIG. 1, the pulse power controller 130 can determine whether one or more discharge criteria is satisfied. For example, the discharge criteria can be a criteria that a defined amount of energy has been stored in the primary capacitor(s) 136. An example can be that the primary capacitor(s) 136 are fully charged, more than a defined percent (e.g., 99%, 95%, 90%, 50%, etc.), etc. Another example criteria can be that a bottom of the drill string is in contact with a bottom of the borehole. For example, the criteria can be that at least a minimum amount of surface area of the bottom of the drill string in in contact with a bottom of the borehole. Another example criteria can be that a defined amount of time has elapsed since a prior pulsing of the electrical discharge. This defined amount of time can help ensure that the bottom of the drill string is in contact with a bottom of the borehole prior to pulsing of the electrical discharge.

At block 1714, an electrical discharge is pulsed into rock of the subsurface formation based on discharging of the primary capacitor. For example, with reference to FIG. 1, in response to the discharge criteria being satisfied, the pulse power controller 130 can cause the primary capacitor(s) 136 to release the stored energy from the primary capacitor(s) 136 through the electrodes 144—resulting in the pulse of electrical discharge into the surrounding subsurface formation. This pulsing of the electrical discharge can continue to occur periodically in response to the discharge criteria being satisfied. Accordingly, operations of the flowchart 1700 can return to block 1712 to determine whether a discharge criteria is subsequently satisfied.

Operations of the flowchart 1800 are now described. From transition point A, operations continue at block 1802.

At block 1802, a determination is made of whether a defined amount of rectified current been stored in the primary capacitors. For example, with reference to FIG. 1, the pulse power controller 130 can make this determination whether a defined amount of rectified current is stored in the primary capacitor(s) 136. For example, the defined amount of rectified current can be that the primary capacitor(s) 136 are fully charged, more than a defined percent (e.g., 99%, 95%, 90%, 50%, etc.), etc. If the defined amount of rectified current has not been stored, operations of the flowchart 1800 remain at block 1802 to again determine whether a defined amount of rectified current has been stored. If the defined amount of rectified current has been stored, operations of the flowchart 1800 continue at block 1804.

At block 1804, the switch is opened to prevent storing rectified current in the primary capacitor. For example, with reference to FIG. 1, one or more switches in the switch bank 134 can be opened to prevent transmission of rectified current for storage in the primary capacitor(s) 136.

At block 1806, a determination is made of whether a pulse of electrical discharge has occurred. For example, with reference to FIG. 1, the pulse power controller 130 can make this determination because the pulse power controller 130 can control when a pulse of the electrical discharge happens. In particular, the pulse power controller 130 can enable the releasing of the stored energy from the primary capacitor(s) 136 through the electrodes 144—resulting in the pulse of electrical discharge into the surrounding subsurface formation. If the pulse of electrical discharge has not occurred, operations remain at block 1806 to continue to check. If the pulse of electrical discharge has occurred, operations continue at block 1808.

At block 1808, the switch is closed to recharge the primary capacitor from the rectified current stored in the DC link capacitor and from additional rectified current being derived from the mechanical energy being generated. For example, with reference to FIG. 1, the pulse power controller 130 can close a switch positioned between the rectifier 120 and the primary capacitor(s) 136. This closed position would again allow storing rectified current stored in a DC link capacitor in the DC link 124 and the rectified current being output from the rectifier 120 into the primary capacitor(s) 136. Operations return to block 1802, where a determination is made of whether the defined amount of rectified current has been stored.

Example operations for directional pulse power drilling are now described. In particular, FIG. 19 depict a flowchart of example operations for directional pulse power drilling, according to some embodiments. Operations of the flowchart 1900 can be performed by software, firmware, hardware, or a combination thereof. Operations of the flowchart 1900 are described in reference to the example drilling apparatus 100 of FIG. 1 and the various configurations of FIGS. 7-16. However, other systems and components can be used to perform the operations now described. The operations of the flowchart 1900 start at block 1902.

At block 1902, electrical power is stored into primary capacitor(s). For example, with reference to FIG. 1, electrical power can be stored in the primary capacitor(s) 136. In examples above, the electrical power was generated by the flow of drilling mud. However, in some other example, the electrical power can be generated from other sources. For example, an electrical source at the surface of the borehole can generate the electrical power. This electrical power can then be transmitted downhole to be stored in the primary capacitor(s) 136. As an example, the electrical power can be transmitted via a physical medium (such as a conductive wire or line) for storage in the primary capacitor(s) 136.

At block 1904, a determination is made of whether a discharge criteria is satisfied. For example, with reference to FIG. 1, the pulse power controller 130 can determine whether one or more discharge criteria is satisfied. For example, the discharge criteria can be a criteria that a defined amount of energy has been stored in the primary capacitor(s) 136. An example can be that the primary capacitor(s) 136 are fully charged, more than a defined percent (e.g., 99%, 95%, 90%, 50%, etc.), etc. Another example criteria can be that a bottom of the drill string is in contact with a bottom of the borehole. For example, the criteria can be that at least a minimum amount of surface area of the bottom of the drill string in in contact with a bottom of the borehole. Another example criteria can be that a defined amount of time has elapsed since a prior pulsing of the electrical discharge. This defined amount of time can help ensure that the bottom of the drill string is in contact with a bottom of the borehole prior to pulsing of the electrical discharge.

At block 1906, an electrical discharge is pulsed into rock of the subsurface formation using an electrode assembly of a pulse power drill string based on discharging of the primary capacitor(s). For example, with reference to FIG. 1, in response to the discharge criteria being satisfied, the pulse power controller 130 can cause the primary capacitor(s) 136 to release the stored energy from the primary capacitor(s) 136 through the electrodes 144—resulting in the pulse of electrical discharge into the surrounding subsurface formation. This pulsing of the electrical discharge can continue to occur periodically in response to the discharge criteria being satisfied. Additionally, one or more of the examples of the electrode assemblies depicted in FIGS. 7-13 can be used to output the electrical discharge.

At block 1908, a determination is made of whether direction of drilling of the borehole is to be altered. This determination can be based on drilling data for the borehole being drilled and can be made at the surface and/or downhole. For example, drilling of the borehole can be altered based on operational parameters. Operational parameters can include any adjustable parameter that may influence drilling. For example, drilling can be altered based on a rate of penetration (ROP) for the drilling operation. Alternatively or in addition, drilling can be altered based on a property of a drilling fluid. For example, drilling may be altered based on the presence of cuttings in a drilling fluid. In some embodiments, drilling data can include directional survey data and determining whether drilling of the borehole is to be altered can be based on directional survey data. For example, directional survey data may indicate that drilling of the borehole is proceeding in an undesired direction and it can be determined that drilling is to be altered in order to advance the borehole in a desired direction. Optionally, directional survey data can be compared to a wellbore trajectory model for the drilling operation to determine whether the trajectory of the borehole being drilled is desirable. Alternatively or in addition, directional survey data can be used to update a wellbore trajectory model and altering the drilling can be based on the updated wellbore trajectory model.

In some embodiments, determining whether drilling is to be altered can be based on optimizing an aspect of the drilling operation. For instance, drilling of the borehole can be altered to maximize recovery of hydrocarbons from the subsurface formation. In some embodiments, data collected during drilling can be used to evaluate the formation through which the borehole is being drilled. For example, a computer can execute instructions to perform a formation evaluation of the formations being drilled in real time to make this determination. Alternatively or in addition, determining whether drilling is to be altered can be based on drilling data from drilling of a previous borehole into a subsurface formation that is assumed to be similar to the subsurface formation into which the current borehole is being drilled. For example, the previous borehole can be proximate to the current borehole (i.e., in the same basin). Drilling data from a previous borehole can be used to identify which layers of the formation include recoverable hydrocarbons and their associated depths. Thus, direction of drilling of the current borehole can be altered so that the borehole is drilled through these layers identified as having recoverable hydrocarbons. If direction of the drilling of the borehole is not to be altered, operations of the flowchart 1900 can return to block 1904 to determine whether a discharge criteria is satisfied. If direction of the drilling of the borehole is to be altered, operations of the flowchart 1900 continue at block 1910.

At block 1910, the electrode assembly and/or the electrode assembly operation is modified to alter direction of drilling of the borehole. For example, one or more of the examples of modification of a pulse power drill string and/or its operation described above in reference to FIGS. 7-16 can be performed to alter direction of drilling of the borehole. For example, drilling direction can be altered by replacing a current electrode assembly (without a bent housing) by the electrode assembly having a bent housing (as described above in reference to FIG. 7). Alternatively or in addition, drilling direction can be altered by adjusting an adjustable ground ring of the electrode assembly (as described above in reference to FIG. 8). Alternatively or in addition, drilling direction can be altered by adjusting an adjustable electrode face (as described above in reference to FIGS. 9 and/or 10). Alternatively or in addition, drilling direction can be altered by selecting which electrodes are to be used for output of the electrical energy and/or amount of energy allocated to selected electrodes (as described above in reference to FIG. 11). Alternatively or in addition, drilling direction can be altered by selecting which segments of a multi-segmented ground ring are configured to provide an electrical return path (as described above in reference to FIG. 13). Accordingly, any combination of these modifications can be used to alter drilling direction. For example, an electrode assembly with a bent housing (FIG. 7) can also include selectable electrodes and/or amount of energy for each selected electrode (FIG. 11). Operations of the flowchart 1900 return to block 1904 to determine whether a discharge criteria is satisfied for the next pulse of electrical discharge. Operations of the flowchart 1900 can continue until drilling operations of the borehole are stopped and/or complete.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 1702-1710 can be performed at least partially in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

While the aspects of the disclosure are described with reference to various implementations and exploitations, it will be understood that these aspects are illustrative and that the scope of the claims is not limited to them. In general, techniques for pulse power drilling as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Example embodiments include the following:

Embodiment #1: A system to supply, via an electrical interface, an output electrical power to an electrical load that is downhole in a borehole formed in a subsurface formation, the system comprising: a downhole motor to be positioned in the borehole, the downhole motor to convert a hydraulic energy into a mechanical energy, wherein the hydraulic energy is to be produced from a fluid flowing from a surface of the borehole and into the borehole; a generator coupled to the downhole motor, the generator to convert the mechanical energy generated to an input electrical power; a primary capacitor electrically coupled to the generator to store the input electrical power having a variance that is greater than a variance threshold; the electrical load electrically coupled to the primary capacitor; a processor; and a machine-readable medium having program code executable by the processor to cause the processor to perform operations comprising: while continuing to generate the mechanical energy and in response to determining that at least one load criteria is satisfied, discharging the input electrical power from the primary capacitor as the output electrical power to the electrical load to power a downhole operation by the electrical load based on closing an electrical path between the primary capacitor and the electrical load, wherein the output electrical power has a peak that is greater than the input electrical power and has a rate of change that is greater than a rate threshold.

Embodiment #2: The system of Embodiment #1, wherein discharging the input electrical power comprises intermittently supplying the output electrical power to the electrical load to power the downhole operation.

Embodiment 3: The system of one or more of Embodiments #1-2, further comprising: a DC link capacitor electrically coupled to the generator and the primary capacitor, and wherein the operations comprise, in response to determining that the primary capacitor is charged, opening a switch to stop storage of the input electrical power into the primary capacitor and to store the input electrical power into the DC link capacitor.

Embodiment #4: The system of Embodiment #3, wherein the operations comprise, in response to discharging the primary capacitor, discharging the input electrical power stored in the DC link capacitor for storage of the input electrical power stored in the DC link capacitor into the primary capacitor; and closing the switch to enable storage of the input electrical power generated by the generator into the primary capacitor.

Embodiment #5: The system of Embodiment #4, further comprising a drill string to drill the borehole into the subsurface formation, wherein the drill string includes the downhole motor, the generator, the primary capacitor, and the electrical load.

Embodiment #6: The system of Embodiment #5, wherein the electrical load comprises at least one electrode, wherein the downhole operation comprises a pulse power operation to pulse an electrical discharge, from the at least one electrode, into the subsurface formation.

Embodiment #7: The system of Embodiment #6, wherein the at least one load criteria comprises that a defined amount of time has elapsed since a prior pulse of the electrical discharge.

Embodiment #8: The system of one or more of Embodiments #6-7, wherein the at least one load criteria comprises that a defined amount of the input electrical power has been stored in the primary capacitor.

Embodiment #9: The system of one or more of Embodiments #6-8, wherein the at least one electrode comprises an electrode face, wherein the at least one load criteria comprises that the electrode face is in contact with a bottom of the borehole.

Embodiment #10: The system of one or more of Embodiments #6-9, wherein the at least one electrode comprises an electrode face, wherein the at least one load criteria comprises that at least a minimum amount of surface area of the electrode face is in contact with a bottom of the borehole.

Embodiment #11: The system of one or more of Embodiments #1-10, wherein the electrical load comprises at least one of an actuator, an electric motor, a hammer, a sensor to measure a property of the subsurface formation, and a nuclear magnetic resonance device.

Embodiment #12: A system to supply, via an electrical interface, an output electrical power to an electrical load that is downhole in a borehole formed in a subsurface formation, the system comprising: a drill string to be positioned in the borehole, the drill string comprising: a downhole motor to generate a mechanical energy in response to rotation caused by a fluid flowing from a surface of the borehole and through the downhole motor; an alternator to convert the mechanical energy generated to an alternating current; a rectifier to convert the alternating current to a rectified current; a DC link capacitor electrically coupled to the rectifier; a primary capacitor electrically coupled to the rectifier and the DC link capacitor, wherein the primary capacitor is to store the rectified current as an input electrical power having a variance that is greater than a variance threshold; the electrical load electrically coupled to the primary capacitor; a processor; and a machine-readable medium having program code executable by the processor to cause the processor to perform operations comprising: while continuing to generate the mechanical energy and in response to determining that at least one load criteria is satisfied, discharging the input electrical power from the primary capacitor as the output electrical power to the electrical load to power a downhole operation by the electrical load based on closing an electrical path between the primary capacitor and the electrical load, wherein the output electrical power has a peak that is greater than the input electrical power and has a rate of change that is greater than a rate threshold.

Embodiment #13: The system of Embodiment #12, wherein discharging the input electrical power comprises intermittently supplying the output electrical power to the electrical load to power the downhole operation.

Embodiment #14: The system of one or more of Embodiments #12-13, wherein the operations comprise, in response to determining that the primary capacitor is charged, opening a switch to stop storage of the input electrical power into the primary capacitor and to store the input electrical power into the DC link capacitor.

Embodiment #15: The system of Embodiment #14, wherein the operations comprise, in response to discharging the primary capacitor, discharging the input electrical power stored in the DC link capacitor for storage of the input electrical power stored in the DC link capacitor into the primary capacitor; and closing the switch to enable storage of the input electrical power into the primary capacitor.

Embodiment #16: The system of one or more of Embodiments #12-15, wherein the electrical load comprises at least one electrode, wherein the downhole operation comprises a pulse power operation to pulse an electrical discharge, from the at least one electrode, into the subsurface formation.

Embodiment #17: The system of one or more of Embodiments #12-16, wherein the electrical load comprises at least one of an actuator, an electric motor, a hammer, a sensor to measure a property of the subsurface formation, and a nuclear magnetic resonance device.

Embodiment #18: A method for supplying, via an electrical interface, an output electrical power to an electrical load that is downhole in a borehole formed in a subsurface formation, the method comprising: generating mechanical energy from a flow of a fluid being delivered into the borehole; converting the mechanical energy into an input electrical power; storing the input electrical power into a primary capacitor, the input electrical power having a variance that is greater than a variance threshold; and performing the following operations while continuing to generate the mechanical energy generated from the flow of the fluid, in response to determining that at least one load criteria is satisfied, discharging the input electrical power from the primary capacitor to the electrical load to power a downhole operation by the electrical load based on closing an electrical path between the primary capacitor and the electrical load, wherein the output electrical power includes a peak that is greater than the input electrical power and with a rate of change that is greater than an output change threshold.

Embodiment #19: The method of Embodiment #18, wherein discharging the input electrical power comprises intermittently supplying the output electrical power to the electrical load to power the downhole operation.

Embodiment #20: The method of one or more of Embodiments #18-19, wherein the electrical load comprises at least one electrode, wherein the downhole operation comprises a pulse power operation to pulse an electrical discharge, from the at least one electrode, into the subsurface formation.

Embodiment #21: The method of one or more of Embodiments #18-20, wherein the at least one load criteria comprises at least one of, a defined amount of the input electrical power has been stored, a bottom of a drill string is in contact with a bottom of the borehole, at least a minimum amount of surface area of the bottom of the drill string is in contact with a bottom of the borehole, and a defined amount of time has elapsed since a prior pulsing of the electrical discharge.

Embodiment #22: The method of one or more of Embodiments #18-21, wherein the electrical load comprises at least one of an actuator, an electric motor, a hammer, a sensor to measure a property of the subsurface formation, and a nuclear magnetic resonance device.

Embodiment #23: A system to perform directional pulse power drilling, the system comprising: a pulse power drill string to be positioned in a borehole formed in a subsurface formation, the pulse power drill string to directionally drill the borehole at an angle that is offset from a longitudinal axis of the borehole and based on periodic pulses of an electrical discharge into the subsurface formation, the pulse power drill string comprising: an upper body having a longitudinal axis that is substantially coaxial with the longitudinal axis of the borehole, wherein the upper body comprises, an electrical source to generate an electrical energy; and a primary capacitor to store the electrical energy; a bent housing that is coupled to the upper body at a bent housing joint cause a lower body of the pulse power drill string below the bent housing to be positioned at an angle that is off axis relative to the longitudinal axis of the upper body, wherein an orientation of the bent housing is configurable to change to alter a direction of drilling of the borehole; and an electrode assembly of the lower body and at a bottom end of the pulse power drill string, the electrode assembly comprising at least one electrode to periodically emit a pulse of electrical discharge into the subsurface formation to drill the borehole.

Embodiment #24: The system of Embodiment #23, wherein the electrode assembly comprises multiple electrodes that includes the at least one electrode, wherein a subset of the multiple electrodes is selected to periodically emit the pulse of electrical discharge into the subsurface formation to drill the borehole, wherein selection of the subset is such that emission of the pulse of electrical discharge is to adjust a rate of change of direction of the borehole.

Embodiment #25: The system of Embodiment #24, wherein the pulse power drill string comprises an adjustable stabilizer positioned above the upper body to adjust the rate of change of the direction.

Embodiment #26: The system of one or more of Embodiments #23-25, wherein the electrode assembly comprises a ground ring encircling the at least one electrode, wherein the ground ring is to receive the pulse of the electrical discharge after traversal through the subsurface formation.

Embodiment #27: The system of one or more of Embodiments #23-26, wherein the electrode assembly comprises a compression joint that is to electrically couple the primary capacitor to the at least one electrode.

Embodiment #28: The system of Embodiment #27, wherein the at least one electrode includes an electrode face; and wherein the compression joint is to compress in response to the electrode face being in contact with the subsurface formation.

Embodiment #29: The system of one or more of Embodiments #23-28, wherein the pulse power drill string is to rotate around the longitudinal axis of the upper body.

Embodiment #30: An apparatus comprising: an electrode assembly positioned at a bottom end of a pulse power drill string to be positioned in a borehole formed in a subsurface formation, the electrode assembly comprising, at least one electrode having an electrode face, wherein the at least one electrode is to periodically emit a pulse of electrical discharge into the subsurface formation to drill the borehole; a ground ring surrounding the at least one electrode and separated into multiple segments, wherein the ground ring is to receive the pulse of electrical discharge after emission into the subsurface formation; and a first actuator coupled to at least one first segment of the multiple segments and not coupled to at least one other segment of the multiple segments, wherein the first actuator is to alter a direction of the drilling of the borehole based on moving the at least one first segment such that a distance between the at least one first segment and the electrode face is different than a distance between the at least one other segment and the electrode face.

Embodiment #31: The apparatus of Embodiment #30, further comprising an adjustable stabilizer positioned above the electrode assembly to adjust a rate of change of the direction.

Embodiment #32: The apparatus of one or more of Embodiments #30-31, wherein the first actuator is to raise and/or lower the at least one first segment that is positioned near a wall of the borehole in which the borehole is to be drilled.

Embodiment #33: The apparatus of one or more of Embodiments #30-32, wherein the first actuator is to raise and/or lower the at least one first segment that is positioned opposite of a wall of the borehole in which the borehole is to be drilled.

Embodiment #34: The apparatus of one or more of Embodiments #30-33, wherein the electrode assembly comprises a second actuator coupled to at least one second segment of the multiple segments that is different from the first segment, wherein the second actuator is to raise and/or lower the at least one second segment.

Embodiment #35: The apparatus of one or more of Embodiments #30-34, wherein the electrode assembly is to rotate within a plane that is perpendicular to a longitudinal axis of the pulse power drill string.

Embodiment #36: The apparatus of one or more of Embodiments #30-35, wherein the first actuator is to tilt the at least one first segment relative to a longitudinal axis of the electrode.

Embodiment #37: An apparatus comprising: an electrode assembly positioned at a bottom end of a pulse power drill string to be positioned in a borehole formed in a subsurface formation, the electrode assembly comprising, at least one electrode having an electrode face, wherein the at least one electrode is to periodically emit a pulse of electrical discharge into the subsurface formation to drill the borehole; a ground ring surrounding the at least one electrode, wherein the ground ring is to receive the pulse of electrical discharge after emission into the subsurface formation; and an actuator coupled to the electrode face, wherein the actuator is to move the electrode face to alter a direction of the drilling of the borehole.

Embodiment #38: The apparatus of Embodiment #37, further comprising an adjustable stabilizer positioned above the electrode assembly to adjust a rate of change of the direction.

Embodiment #39: The apparatus of one or more of Embodiments #37-38, wherein the actuator to move the electrode face comprises the actuator to rotate the electrode face such that a first part of the electrode face is farther from the ground ring than a second part of the electrode face.

Embodiment #40: The apparatus of Embodiment #39, wherein the electrode assembly comprises a rotary joint that is coupled to the actuator through a linkage, wherein the rotary joint is coupled to the at least one electrode, and wherein the actuator is to rotate the electrode face by rotation of the rotary joint by at least one of extension and retraction of the linkage.

Embodiment #41: The apparatus of Embodiment #39, wherein the actuator is to rotate the electrode face such that the first part is farther away from the ground ring in response a control signal to alter the direction of the drilling of the borehole in a direction of the first part of the electrode face.

Embodiment #42: The apparatus of one or more of Embodiments #37-41, wherein the actuator to move the at least one electrode comprises the actuator to slide the at least one electrode laterally such that a first part of the electrode face is farther from the ground ring that a second part of the electrode face.

Embodiment #43: The apparatus of Embodiment #42, wherein the actuator is to slide the at least one electrode such that the first part is farther away from the ground ring in response to a control signal to alter the direction of the drilling of the borehole in a direction of the first part of the electrode face.

Embodiment #44: The apparatus of one or more of Embodiments #37-44, wherein the electrode assembly comprises a sliding collar that is coupled to the actuator through a linkage, wherein the sliding collar is coupled to the at least one electrode, and wherein the actuator is to slide the at least one electrode laterally by at least one of extension and retraction of the linkage.

Embodiment #45: A system to perform directional pulse power drilling, the system comprising: a pulse power drill string to be positioned in a borehole formed in a subsurface formation, the pulse power drill string to directionally drill the borehole at an angle that is offset from a longitudinal axis of the borehole and based on periodic pulses of an electrical discharge into the subsurface formation, the pulse power drill string comprising: an upper body having a longitudinal axis that is substantially coaxial with the longitudinal axis of the borehole, wherein the upper body comprises, an electrical source to generate an electrical energy; and a primary capacitor to store the electrical energy; and an electrode assembly positioned below the upper body and at a bottom end of the pulse power drill string, the electrode assembly comprising, at least one electrode that is to periodically emit a pulse of the electrical discharge into the subsurface formation to drill the borehole; a ground ring divided into multiple segments; and a controller configured to select at least one selected segment of the ground ring that is to receive the pulse of the electrical discharge after emission into the subsurface formation, wherein the controller is to alter a direction of the drilling of the borehole based on creating an electrical return path from the at least one selected segment back to the electrical source and based on preventing an electrical path from other segments of the multiple segments of the ground ring not selected back to the electrical source.

Embodiment #46: The system of Embodiment #45, wherein the pulse power drill string comprises an adjustable stabilizer positioned above the upper body to adjust a rate of change of the directional drill.

Embodiment #47: The system of one or more of Embodiments #45-46, wherein the controller to select the at least one selected segment of the ground ring that is near the direction of the drilling of the borehole is to be altered.

Embodiment #48: The system of one or more of Embodiments #45-47, wherein the electrode assembly comprises multiple insulative dividers, wherein an insulative divider of the multiple insulative dividers is positioned between adjacent segments of the multiple segments of the ground ring.

Embodiment #49: A method to perform pulse power drilling of a borehole into a subsurface formation, the method comprising: altering drilling the borehole, based on the pulse power drilling, in a direction that is off-center from a center of the borehole, wherein the altering of the drilling of the borehole in the direction that is off-center comprises, articulating at least one element of a drill string having a drill bit; and periodically emitting a pulse of electrical discharge into the subsurface formation from at least one electrode of an electrode assembly that is part of the drill bit.

Embodiment #50: The method of Embodiment #49, wherein the electrode assembly comprises a number of electrodes including the at least one electrode and positioned on the electrode face, and wherein the method comprises selecting a subset from a number of electrodes positioned on an electrode face of an electrode assembly that is part of the drill bit, and wherein periodically emitting the pulse of electrical discharge comprises periodically emitting the pulse of electrical discharge from the selected subset.

Embodiment #51: The method of one or more of Embodiments #49-50, articulating the at least one element of the drill string comprises changing an orientation of a bent housing of the drill string.

Embodiment #52: The method of one or more of Embodiments #49-51, wherein articulating the at least one element of the drill string comprises adjusting an adjustable stabilizer of the drill string positioned above the drill bit.

Embodiment #53: The method of one or more of Embodiments #49-52, wherein the electrode assembly comprises a ground ring surrounding the at least one electrode and separated into multiple segments, wherein the ground ring is to receive the pulse of electrical discharge after emission into the subsurface formation, and wherein articulating the at least one element of the drill string comprises moving at least one segment of the multiple segments of the ground ring such that a distance between the at least one segment and the electrode face is different than a distance between at least one other segment of the multiple segments of the ground ring and the electrode face.

Embodiment #54: The method of one or more of Embodiments #49-53, wherein articulating the at least one element of the drill string comprises rotating the electrode face such that a first part of the electrode face is farther from a ground ring than a second part of the electrode face.

Embodiment #55: The method of one or more of Embodiments #49-55, wherein the periodically emitting of the pulse of electrical discharge is based on an electrical energy from an electrical source of the drill string, wherein the electrode assembly comprises a ground ring surrounding the at least one electrode and separated into multiple segments, wherein the ground ring is to receive the pulse of electrical discharge after emission into the subsurface formation, and wherein articulating the at least one element of the drill string comprises selecting a subset of the multiple segments of the ground ring that is to receive the pulse of electrical discharge after emission into the subsurface formation.

Embodiment #56: An apparatus comprising: an electrode assembly positioned at a bottom end of a pulse power drill string to be positioned in a borehole formed in a subsurface formation, the electrode assembly comprising, multiple electrodes, wherein at least a subset of the multiple electrodes is to periodically emit a pulse of an electrical discharge into the subsurface formation to drill the borehole; and a controller configured to alter a direction of drilling of the borehole based on selection of the subset from the multiple electrodes, wherein an effective attribute of at least one electrode of the multiple electrodes is different than the effective attribute of other electrodes of the multiple electrodes, wherein the effective attribute comprises at least one of a shape and a size.

Embodiment #57: The apparatus of Embodiment #56, wherein the effective attribute is altered while the electrode assembly is operational during drilling of the borehole.

Embodiment #58: The apparatus of one or more Embodiments #56-57, further comprising at least one adjustable stabilizer coupled to the electrode assembly.

Embodiment #59: The apparatus of Embodiment #58, wherein the subset of electrodes is selected in coordination with an adjusting of the at least one adjustable stabilizer to alter the direction of the drilling.

Embodiment #60: The apparatus of Embodiment #58, wherein the subset of electrodes is selected independent of an adjusting of the at least one adjustable stabilizer to alter the direction of the drilling.

Embodiment #61: The apparatus of one or more Embodiments #56-60, wherein the electrode assembly comprises a ground ring surrounding the multiple electrodes, wherein the ground ring is to receive the pulse of the electrical discharge after emission into the subsurface formation.

Embodiment #62: The apparatus of one or more Embodiments #56-61, wherein the subset of the multiple electrodes comprises at least one electrode that is nearest the direction of the drilling of the borehole is to be altered.

Embodiment #63: The apparatus of one or more Embodiments #56-62, wherein the electrode assembly comprises multiple insulative dividers, wherein an insulative divider of the multiple insulative dividers is positioned between adjacent electrodes of the multiple electrodes.

Embodiment #64: The apparatus of one or more Embodiments #56-63, wherein a primary discharge capacitor is to store an electrical energy that is used to generate the pulse of the electrical discharge, wherein the electrode assembly comprises a compression joint that is to electrically couple the primary discharge capacitor to the multiple electrodes.

Embodiment #65: The apparatus of Embodiment #64, wherein the multiple electrodes include an electrode face; and wherein the compression joint is to compress in response to the electrode face being in contact with the subsurface formation.

Embodiment #66: The apparatus of one or more Embodiments #56-65, wherein the electrode assembly is to rotate around a longitudinal axis of the electrode assembly.

Embodiment #67: A system comprising: a pulse power drill string to be positioned in a borehole formed in a subsurface formation, the pulse power drill string to directionally drill the borehole at an angle that is offset from a longitudinal axis of the borehole and based on periodic pulses of an electrical discharge into the subsurface formation, the pulse power drill string comprising: an upper body having a longitudinal axis that is substantially the same as the longitudinal axis of the borehole, wherein the upper body comprises, an electrical source to generate an electrical energy; and a primary discharge capacitor to store the electrical energy; and an electrode assembly positioned below the upper body and at a bottom end of the pulse power drill string, the electrode assembly comprising, multiple electrodes, wherein at least a subset of the multiple electrodes is to periodically emit a pulse of the electrical discharge into the subsurface formation to drill the borehole, wherein an effective attribute of at least one electrode of the multiple electrodes is different than the effective attribute of other electrodes of the multiple electrodes, wherein the effective attribute comprises at least one of a shape and a size; a ground ring surrounding the multiple electrodes, wherein the ground ring is to receive the pulse of the electrical discharge after emission into the subsurface formation; and a controller configured to alter a direction of drilling of the borehole based on selection at least one emitting electrode of the multiple electrodes that is to emit the pulse of the electrical discharge and selection of at least one non-emitting electrode of the multiple electrodes that is to not emit the pulse of the electrical discharge.

Embodiment #68: The system of Embodiment #67, wherein the effective attribute is altered while the electrode assembly is operational during drilling of the borehole.

Embodiment #69: The system of one or more of Embodiments #67-68, further comprising at least one adjustable stabilizer coupled to the electrode assembly.

Embodiment #70: The system of Embodiment #69, wherein the subset of electrodes is selected in coordination with an adjusting of the at least one adjustable stabilizer to alter the direction of the drilling.

Embodiment #71: The system of Embodiment #69, wherein the subset of electrodes is selected independent of an adjusting of the at least one adjustable stabilizer to alter the direction of the drilling.

Embodiment #72: The system of one or more of Embodiments #67-71, wherein the subset of the multiple electrodes comprises at least one electrode that is nearest the direction of the drilling of the borehole is to be altered.

Embodiment #73: The system of one or more of Embodiments #67-72, wherein the electrode assembly comprises multiple insulative dividers, wherein an insulative divider of the multiple insulative dividers is positioned between adjacent electrodes of the multiple electrodes.

Embodiment #74: The system of one or more of Embodiments #67-73, wherein the electrode assembly comprises a compression joint that is to electrically couple the primary discharge capacitor to the multiple electrodes.

Embodiment #75: The system of Embodiment #74, wherein the multiple electrodes include an electrode face; and wherein the compression joint is to compress in response to the electrode face being in contact with the subsurface formation.

Embodiment #76: The system of one or more of Embodiments #67-75, wherein the pulse power drill string is to rotate around the longitudinal axis of the upper body.

Embodiment #77: A method comprising: performing a pulse power drilling operation, with a drill string positioned in a borehole formed in a subsurface formation, based on an electrical discharge periodically emitted into rock of the subsurface formation and from a subset of electrodes selected from among multiple electrodes of an electrode assembly, wherein an effective attribute of at least one electrode of the multiple electrodes is different than the effective attribute of other electrodes of the multiple electrodes, wherein the effective attribute comprises at least one of a shape and a size, wherein performing the pulse power drilling operation comprises, storing an electrical power as stored energy in a primary discharge capacitor of the drill string; in response to determining that a direction of the borehole is to be altered, selecting the subset of electrodes based on the direction of the borehole is to be altered; and in response to determining that at least one discharge criteria is satisfied, pulsing the electrical discharge from the subset of electrodes into the rock in the subsurface formation.

Embodiment #78: The method of Embodiment #77, wherein performing the pulse power drilling operation comprises altering the effective attribute of the at least one electrode.

Embodiment #79: The method of one or more of Embodiments #77-78, wherein performing the pulse power drilling operation comprises adjusting at least one adjustable stabilizer coupled to the electrode assembly.

Embodiment #80: The method of Embodiment #79, wherein adjusting the at least one adjustable stabilizer comprises adjusting the at least one adjustable stabilizer in coordination with the selection of the subset of electrodes.

Embodiment #81: The method of Embodiment #79, wherein adjusting the at least one adjustable stabilizer comprises adjusting the at least one adjustable stabilizer independent of the selection of the subset of electrodes.

Embodiment #82: A system to perform directional pulse power drilling, the system comprising: a pulse power drill string to be positioned in a borehole formed in a subsurface formation, the pulse power drill string to directionally drill the borehole at an angle that is offset from a longitudinal axis of the borehole and based on periodic pulses of an electrical discharge into the subsurface formation, the pulse power drill string comprising: an upper body having a longitudinal axis that is substantially coaxial with the longitudinal axis of the borehole, wherein the upper body comprises, an electrical source to generate an electrical energy; and a primary capacitor to store the electrical energy, wherein the electrical energy stored in the primary capacitor is to be periodically discharged; and an electrode assembly positioned below the upper body and at a bottom end of the pulse power drill string, the electrode assembly comprising, a switching device having an input and a number of outputs, wherein the input is electrically coupled to receive the electrical energy periodically discharged from the primary capacitor; and a number of electrodes, wherein each output of the number of outputs of the switching device is electrically coupled to an electrode of the number of electrodes, wherein the switching device is to select a subset of the number of electrodes to receive the electrical energy to alter a direction of the drilling of the borehole based on emitting the electrical energy by the selected subset of the number of electrodes into the subsurface formation.

Embodiment #83: The system of Embodiment #82, wherein the electrode assembly comprises a ground ring surrounding the number of electrodes, wherein the ground ring is to receive the pulse of the electrical discharge after emission into the subsurface formation.

Embodiment #84: The system of Embodiment #82, wherein the pulse power drill string comprises an adjustable stabilizer positioned above the upper body to adjust a rate of change of the direction.

Embodiment #85: The system of Embodiment #82, wherein the switching device is to distribute more of the electrical energy to the selected subset of the number of electrodes that are nearest the direction of the drilling of the borehole.

Embodiment #86: The system of Embodiment #82, wherein the electrode assembly comprises multiple insulative dividers, wherein an insulative divider of the multiple insulative dividers is positioned between adjacent electrodes of the number of electrodes.

Embodiment #87: The system of Embodiment #82, wherein the electrode assembly comprises a compression joint that is to electrically couple the primary capacitor to the switching device.

Embodiment #88: The system of Embodiment #87, wherein the number of electrodes include an electrode face; and wherein the compression joint is to compress in response to the electrode face being in contact with the subsurface formation.

Embodiment #89: The system of Embodiment #82, wherein the pulse power drill string is to rotate around the longitudinal axis of the upper body.

Embodiment #90: The system of Embodiment #82, wherein the switching device comprises a solid-state switch.

Embodiment #91: The system of Embodiment #82, wherein the switching device is to output to a first electrode of the number of electrodes at a first level of the electrical energy and to output to a second electrode of the number of electrodes at a second level of the electrical energy, wherein the first level is different from the second level.

Embodiment #92: A method for performing directional pulse power drilling, the method comprising: directionally drilling, with a pulse power drill string, of a borehole into a subsurface formation using pulse power, wherein the directionally drilling comprises, generating, by an electrical source, an electrical energy; storing, by a primary capacitor, the electrical energy; periodically discharging the electrical energy from the primary capacitor to be received by a switching device having a number of outputs, wherein each output of the number of outputs is electrically coupled to an electrode of a number of electrodes positioned on an electrode assembly; and unevenly distributing, by the switching device, the electrical energy across the number of electrodes based on selecting a subset of the number of electrodes to receive the electrical energy to alter a direction of the drilling of the borehole based on emitting of the electrical energy by the selected subset of the number of electrodes into the subsurface formation.

Embodiment #93: The method of Embodiment #92, wherein the electrode assembly comprises a ground ring surrounding the number of electrodes, wherein the ground ring is to receive the pulse of the electrical discharge after emission into the subsurface formation.

Embodiment #94: The method of one or more of Embodiments #92-93, wherein an upper body is positioned above the electrode assembly and wherein directionally drilling comprises adjusting an adjustable stabilizer that is positioned above the upper body to adjust a rate of change of the direction.

Embodiment #95: The method of one or more of Embodiments #92-94, wherein unevenly distributing comprises distributing, by the switching device, more of the electrical energy to the selected subset of the number of electrodes that are nearest the direction of the drilling of the borehole.

Embodiment #96: The method of one or more of Embodiments #92-95, wherein the electrode assembly comprises multiple insulative dividers, wherein an insulative divider of the multiple insulative dividers is positioned between adjacent electrodes of the number of electrodes.

Embodiment #97: The method of one or more of Embodiments #92-96, wherein the electrode assembly comprises a compression joint that is to electrically couple the primary capacitor to the switching device.

Embodiment #98: The method of Embodiment #97, wherein the number of electrodes include an electrode face; and wherein the compression joint is to compress in response to the electrode face being in contact with the subsurface formation.

Embodiment #99: The method of one or more of Embodiments #92-98, wherein an upper body is positioned above the electrode assembly and wherein directionally drilling comprises rotating the pulse power drill string around the longitudinal axis of the upper body.

Embodiment #100: The method of one or more of Embodiments #92-99, wherein the switching device comprises a solid-state switch.

Embodiment #101: The method of one or more of Embodiments #92-100, wherein unevenly distributing comprises outputting, by the switching device and to a first electrode of the number of electrodes, the electrical energy at a first level; and outputting, by the switching device and to a second electrode of the number of electrodes, the electrical energy at a second level, wherein the first level is different from the second level.

What is claimed is:

1. An apparatus comprising:
an electrode assembly positioned at a bottom end of a pulse power drill string to be positioned in a borehole formed in a subsurface formation, the electrode assembly comprising,
multiple electrodes, wherein at least a subset of the multiple electrodes is to periodically emit a pulse of an electrical discharge into the subsurface formation to drill the borehole; and
a controller configured to alter a direction of drilling of the borehole based on selection of the subset from the multiple electrodes, wherein an effective attribute of at least one electrode of the multiple electrodes is different than the effective attribute of other electrodes of the multiple electrodes, wherein the effective attribute comprises at least one of a shape and a size.

2. The apparatus of claim 1, wherein the effective attribute is altered while the electrode assembly is operational during drilling of the borehole.

3. The apparatus of claim 1, further comprising at least one adjustable stabilizer coupled to the electrode assembly.

4. The apparatus of claim 3, wherein the subset of electrodes is selected in coordination with an adjusting of the at least one adjustable stabilizer to alter the direction of the drilling.

5. The apparatus of claim 3, wherein the subset of electrodes is selected independent of an adjusting of the at least one adjustable stabilizer to alter the direction of the drilling.

6. The apparatus of claim 1, wherein the electrode assembly comprises a ground ring surrounding the multiple electrodes, wherein the ground ring is to receive the pulse of the electrical discharge after emission into the subsurface formation.

7. The apparatus of claim 1, wherein the subset of the multiple electrodes comprises at least one electrode that is nearest the direction of the drilling of the borehole is to be altered.

8. The apparatus of claim 1, wherein the electrode assembly comprises multiple insulative dividers, wherein an insulative divider of the multiple insulative dividers is positioned between adjacent electrodes of the multiple electrodes.

9. The apparatus of claim 1, wherein a primary discharge capacitor is to store an electrical energy that is used to generate the pulse of the electrical discharge, wherein the electrode assembly comprises a compression joint that is to electrically couple the primary discharge capacitor to the multiple electrodes.

10. The apparatus of claim 9,
wherein the multiple electrodes include an electrode face; and
wherein the compression joint is to compress in response to the electrode face being in contact with the subsurface formation.

11. The apparatus of claim 1, wherein the electrode assembly is to rotate around a longitudinal axis of the electrode assembly.

12. A system comprising:
a pulse power drill string to be positioned in a borehole formed in a subsurface formation, the pulse power drill string to directionally drill the borehole at an angle that is offset from a longitudinal axis of the borehole and based on periodic pulses of an electrical discharge into the subsurface formation, the pulse power drill string comprising:
an upper body having a longitudinal axis that is substantially the same as the longitudinal axis of the borehole, wherein the upper body comprises,
an electrical source to generate an electrical energy; and
a primary discharge capacitor to store the electrical energy; and
an electrode assembly positioned below the upper body and at a bottom end of the pulse power drill string, the electrode assembly comprising,
multiple electrodes, wherein at least a subset of the multiple electrodes is to periodically emit a pulse of the electrical discharge into the subsurface formation to drill the borehole, wherein an effective attribute of at least one electrode of the multiple electrodes is different than the effective attribute of other electrodes of the multiple electrodes, wherein the effective attribute comprises at least one of a shape and a size;
a ground ring surrounding the multiple electrodes, wherein the ground ring is to receive the pulse of the electrical discharge after emission into the subsurface formation; and
a controller configured to alter a direction of drilling of the borehole based on selection at least one emitting electrode of the multiple electrodes that is to emit the pulse of the electrical discharge and selection of at least one non-emitting electrode of the multiple electrodes that is to not emit the pulse of the electrical discharge.

13. The system of claim 12, wherein the effective attribute is altered while the electrode assembly is operational during drilling of the borehole.

14. The system of claim 12, further comprising at least one adjustable stabilizer coupled to the electrode assembly.

15. The system of claim 14, wherein the subset of electrodes is selected in coordination with an adjusting of the at least one adjustable stabilizer to alter the direction of the drilling.

16. The system of claim 14, wherein the subset of electrodes is selected independent of an adjusting of the at least one adjustable stabilizer to alter the direction of the drilling.

17. The system of claim 12, wherein the subset of the multiple electrodes comprises at least one electrode that is nearest the direction of the drilling of the borehole is to be altered.

18. The system of claim 12, wherein the electrode assembly comprises multiple insulative dividers, wherein an insulative divider of the multiple insulative dividers is positioned between adjacent electrodes of the multiple electrodes.

19. The system of claim 12, wherein the electrode assembly comprises a compression joint that is to electrically couple the primary discharge capacitor to the multiple electrodes.

20. The system of claim 19,
wherein the multiple electrodes include an electrode face; and
wherein the compression joint is to compress in response to the electrode face being in contact with the subsurface formation.

21. The system of claim 12, wherein the pulse power drill string is to rotate around the longitudinal axis of the upper body.

22. A method comprising:
performing a pulse power drilling operation, with a drill string positioned in a borehole formed in a subsurface formation, based on an electrical discharge periodically emitted into rock of the subsurface formation and from a subset of electrodes selected from among multiple electrodes of an electrode assembly, wherein an effective attribute of at least one electrode of the multiple electrodes is different than the effective attribute of other electrodes of the multiple electrodes, wherein the effective attribute comprises at least one of a shape and a size, wherein performing the pulse power drilling operation comprises,
storing an electrical power as stored energy in a primary discharge capacitor of the drill string;
in response to determining that a direction of the borehole is to be altered, selecting the subset of electrodes based on the direction of the borehole is to be altered; and
in response to determining that at least one discharge criteria is satisfied, pulsing the electrical discharge from the subset of electrodes into the rock in the subsurface formation.

23. The method of claim 22, wherein performing the pulse power drilling operation comprises altering the effective attribute of the at least one electrode.

24. The method of claim 22, wherein performing the pulse power drilling operation comprises adjusting at least one adjustable stabilizer coupled to the electrode assembly.

25. The method of claim 24, wherein adjusting the at least one adjustable stabilizer comprises adjusting the at least one adjustable stabilizer in coordination with the selection of the subset of electrodes.

26. The method of claim 24, wherein adjusting the at least one adjustable stabilizer comprises adjusting the at least one adjustable stabilizer independent of the selection of the subset of electrodes.

* * * * *